(12) United States Patent
Amini et al.

(10) Patent No.: US 9,906,278 B2
(45) Date of Patent: *Feb. 27, 2018

(54) MIXED MODE OPERATIONS WITHIN MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Peiman Amini, Mountain View, CA (US); Matthew James Fischer, Mountain View, CA (US); Vinko Erceg, Cardiff by the Sea, CA (US); Joonsuk Kim, Saratoga, CA (US); Joseph Paul Lauer, Vienna, VA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,858

(22) Filed: Apr. 28, 2016

(65) Prior Publication Data
US 2016/0241312 A1    Aug. 18, 2016

Related U.S. Application Data

(63) Continuation of application No. 12/854,457, filed on Aug. 11, 2010, now abandoned, which is a
(Continued)

(51) Int. Cl.
*H04B 7/00* (2006.01)
*H04B 7/0413* (2017.01)
(Continued)

(52) U.S. Cl.
CPC ......... *H04B 7/0413* (2013.01); *H04L 5/0007* (2013.01); *H04W 74/02* (2013.01);
(Continued)

(58) Field of Classification Search
CPC ..... H04B 7/0697; H04B 7/12; H04L 27/2634; H04L 27/01; H04L 27/2618; H04L 27/2601; H04W 88/06
(Continued)

(56) References Cited

U.S. PATENT DOCUMENTS

| | | | | |
|---|---|---|---|---|
| 7,356,343 B2 * | 4/2008 | Feher | ................... | H04M 11/04 370/206 |
| 7,450,628 B2 * | 11/2008 | Feher | ................... | H04B 1/69 375/146 |

(Continued)

FOREIGN PATENT DOCUMENTS

WO    WO 2006039008 A1 *    4/2006    ........... H04L 25/022

*Primary Examiner* — Daniel Washburn
*Assistant Examiner* — Berhanu Tadese
(74) *Attorney, Agent, or Firm* — Garlick & Markison; Shayne X. Short

(57) ABSTRACT

Mixed mode operations within multiple user, multiple access, and/or MIMO wireless communications. Certain communication systems can include wireless communication devices of various capabilities therein (e.g., IEEE Task Group ac (TGac VHT), IEEE 802.11 amendment TGn, IEEE 802.11 amendment TGa, and/or other capabilities, etc.). In one manner of classification, wireless communication devices having legacy and newer/updated capabilities may inter-operate with one another, operate within a common region, and/or communicate via a common access point (AP). Coordination of such wireless communication devices (e.g., legacy and newer/updated) provides for their respective operation on a same set of clusters in accordance with various operational modes including: (1) time dividing medium access between the wireless communication devices of various capabilities, (2) assigning primary cluster(s) for a first capability set and assigning non-primary cluster(s) for a second capability set, etc., and/or (3) any combination of operational modes (1) and (2).

19 Claims, 42 Drawing Sheets

Related U.S. Application Data continuation-in-part of application No. 12/794,712, filed on Jun. 4, 2010, now Pat. No. 9,379,858, said application No. 12/854,457 is a continuation-in-part of application No. 12/817,118, filed on Jun. 16, 2010, now Pat. No. 8,582,485, which is a continuation-in-part of application No. 12/796,654, filed on Jun. 8, 2010, now Pat. No. 8,526,351, which is a continuation-in-part of application No. 12/794,707, filed on Jun. 4, 2010, now abandoned, and a continuation-in-part of application No. 12/794,711, filed on Jun. 4, 2010, now Pat. No. 8,498,359.

(60) Provisional application No. 61/184,431, filed on Jun. 5, 2009, provisional application No. 61/219,540, filed on Jun. 23, 2009, provisional application No. 61/187,326, filed on Jun. 16, 2009, provisional application No. 61/185,153, filed on Jun. 8, 2009, provisional application No. 61/185,161, filed on Jun. 8, 2009, provisional application No. 61/186,119, filed on Jun. 11, 2009, provisional application No. 61/311,480, filed on Mar. 8, 2010, provisional application No. 61/250,491, filed on Oct. 9, 2009, provisional application No. 61/255,690, filed on Oct. 28, 2009, provisional application No. 61/257,323, filed on Nov. 2, 2009, provisional application No. 61/321,430, filed on Apr. 6, 2010, provisional application No. 61/184,420, filed on Jun. 5, 2009.

(51) Int. Cl.
*H04W 74/02* (2009.01)
*H04L 5/00* (2006.01)
*H04W 74/08* (2009.01)
*H04L 27/26* (2006.01)
*H04W 28/06* (2009.01)
*H04W 84/12* (2009.01)
*H04W 88/06* (2009.01)

(52) U.S. Cl.
CPC ..... *H04W 74/0816* (2013.01); *H04L 27/2601* (2013.01); *H04W 28/06* (2013.01); *H04W 84/12* (2013.01); *H04W 88/06* (2013.01)

(58) Field of Classification Search
USPC .......................................................... 375/267
See application file for complete search history.

(56) References Cited

U.S. PATENT DOCUMENTS

| | | | | |
|---|---|---|---|---|
| 7,855,995 | B1* | 12/2010 | von der Embse | H04L 25/03203 370/335 |
| 8,306,010 | B2* | 11/2012 | Gong | H04L 1/1685 370/346 |
| 9,049,736 | B2* | 6/2015 | Agarwal | H04W 72/1252 |
| 9,451,542 | B2* | 9/2016 | Park | H04W 52/0216 |
| 2002/0080735 | A1* | 6/2002 | Heath | H04L 1/0025 370/328 |
| 2005/0135318 | A1* | 6/2005 | Walton | H04L 12/66 370/338 |
| 2006/0092892 | A1* | 5/2006 | Trachewsky | H04B 7/0697 370/338 |
| 2006/0274852 | A1* | 12/2006 | Trachewsky | H04L 1/0002 375/295 |
| 2007/0002749 | A1* | 1/2007 | Sondur | H04L 27/2662 370/238 |
| 2007/0004347 | A1* | 1/2007 | Sondur | H04L 1/1614 455/101 |
| 2007/0110197 | A1* | 5/2007 | Bagchi | H04B 1/406 375/349 |
| 2007/0183383 | A1* | 8/2007 | Bitran | H04W 88/06 370/338 |
| 2008/0310405 | A1* | 12/2008 | Cox | H04B 7/026 370/354 |
| 2009/0034432 | A1* | 2/2009 | Bonta | H04W 74/02 370/255 |
| 2009/0041144 | A1* | 2/2009 | Biswas | H04L 25/0204 375/260 |
| 2009/0232229 | A1* | 9/2009 | Sandhu | H04L 5/0037 375/260 |
| 2009/0285109 | A1* | 11/2009 | Chin | H04L 1/0026 370/252 |
| 2009/0310692 | A1* | 12/2009 | Kafle | H04L 5/0007 375/260 |
| 2010/0290449 | A1* | 11/2010 | van Nee | H04B 7/0452 370/338 |
| 2010/0309779 | A1* | 12/2010 | Amini | H04H 20/61 370/221 |
| 2010/0309834 | A1* | 12/2010 | Fischer | H04B 7/0452 370/312 |
| 2010/0309848 | A1* | 12/2010 | Erceg | H04L 5/0023 370/328 |
| 2010/0309871 | A1* | 12/2010 | Fischer | H04L 5/0023 370/329 |
| 2010/0309872 | A1* | 12/2010 | Amini | H04L 12/413 370/329 |
| 2010/0311432 | A1* | 12/2010 | Lauer | H04L 1/0065 455/450 |
| 2010/0315952 | A1* | 12/2010 | Pare, Jr. | H04L 1/0091 370/241 |
| 2010/0315953 | A1* | 12/2010 | Pare, Jr. | H04L 27/0012 370/241 |
| 2010/0316150 | A1* | 12/2010 | Amini | H04W 74/02 375/260 |
| 2010/0322219 | A1* | 12/2010 | Fischer | H04B 7/0452 370/338 |
| 2011/0002219 | A1* | 1/2011 | Kim | H04B 7/0417 370/203 |
| 2011/0013616 | A1* | 1/2011 | Fischer | H04B 7/0669 370/344 |
| 2011/0032875 | A1* | 2/2011 | Erceg | H04B 7/0452 370/328 |
| 2011/0064040 | A1* | 3/2011 | Kim | H04L 1/0631 370/329 |
| 2011/0075607 | A1* | 3/2011 | Kim | H04B 7/0417 370/328 |
| 2011/0075642 | A1* | 3/2011 | Cordeiro | H04W 74/0816 370/338 |
| 2011/0110454 | A1* | 5/2011 | Sampath | H04L 1/0028 375/295 |
| 2011/0149927 | A1* | 6/2011 | Stacey | H04L 1/0046 370/338 |
| 2011/0150004 | A1* | 6/2011 | Denteneer | H04L 5/0023 370/476 |
| 2011/0164597 | A1* | 7/2011 | Amini | H04L 1/0041 370/338 |
| 2011/0194475 | A1* | 8/2011 | Kim | H04L 1/0053 370/311 |
| 2011/0222490 | A1* | 9/2011 | Fischer | H04L 5/0007 370/329 |
| 2011/0305178 | A1* | 12/2011 | Zheng | H04B 7/0671 370/311 |
| 2011/0305194 | A1* | 12/2011 | Zheng | H04B 7/0452 370/328 |
| 2013/0100893 | A1* | 4/2013 | Sawai | H04W 16/14 370/328 |
| 2014/0016607 | A1* | 1/2014 | Hart | H04L 5/001 370/329 |

* cited by examiner

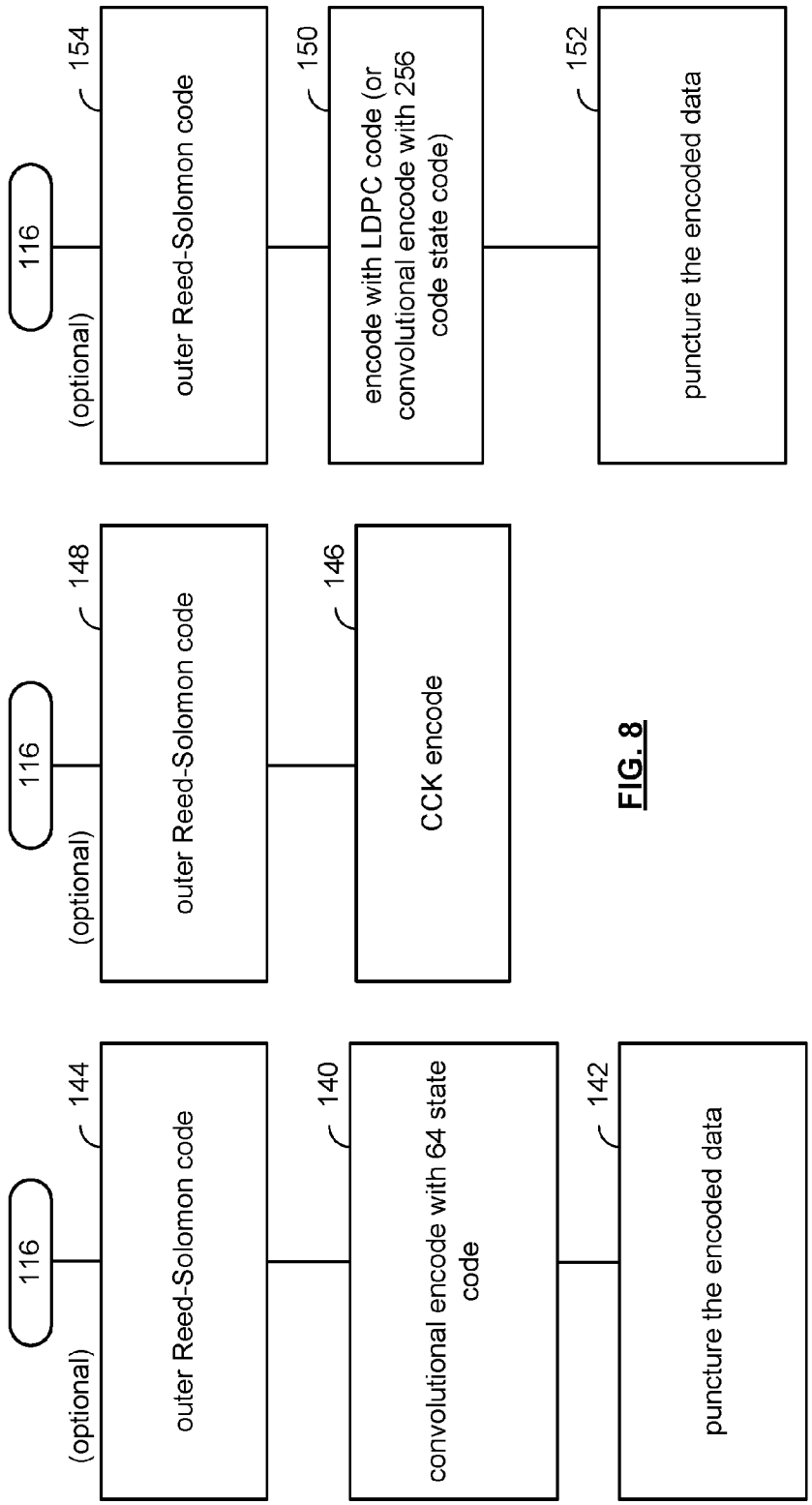

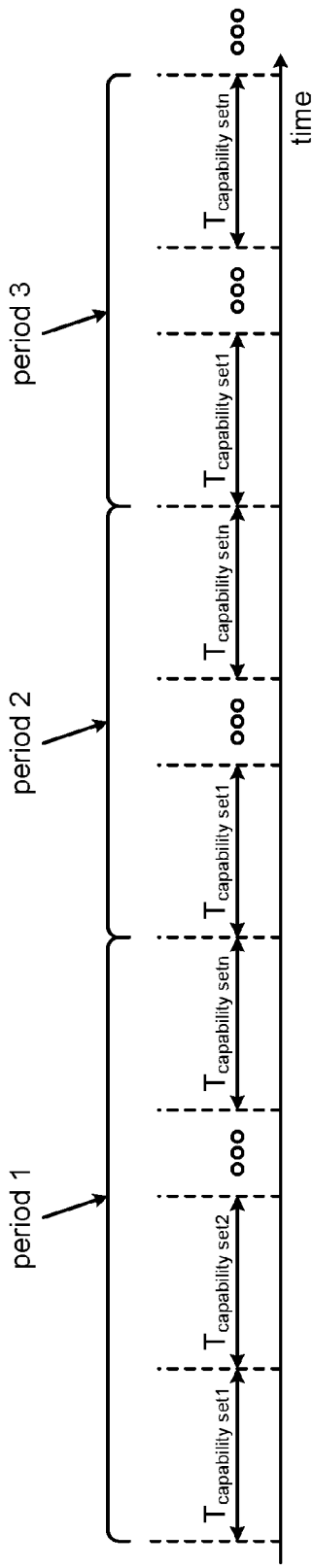
FIG. 14A • each period same, each duration therein same
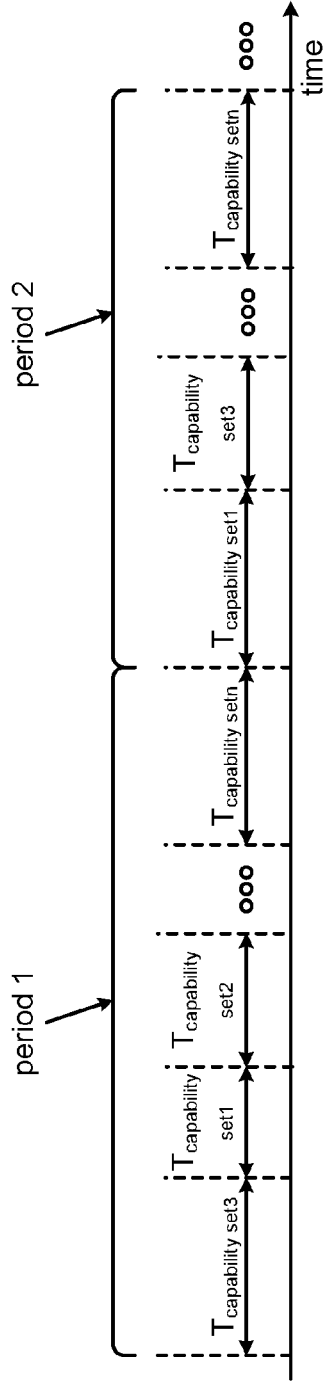
FIG. 14B • different order within periods, different durations

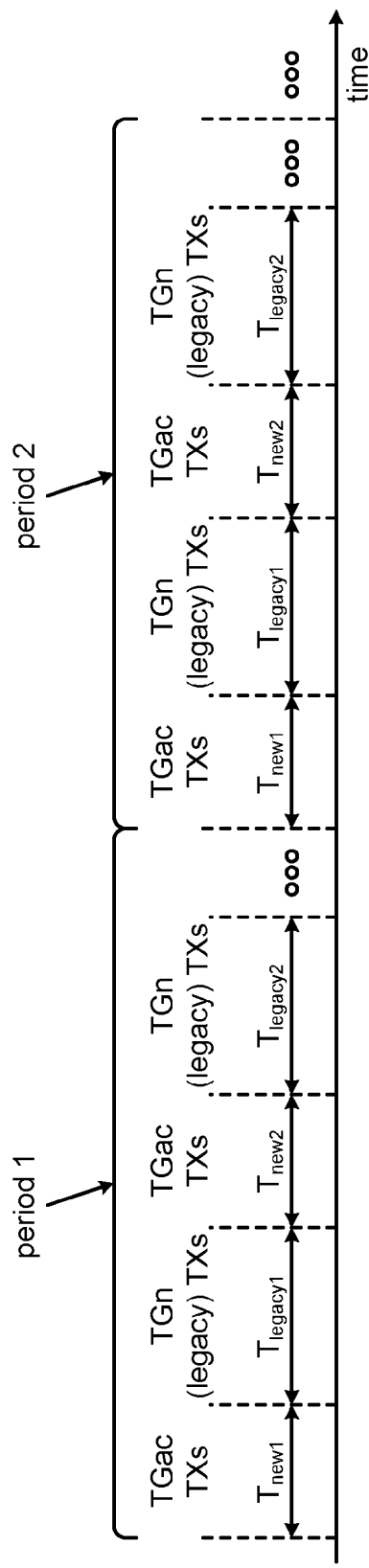
FIG. 15   Time division for medium access (between new and legacy) (6)

FIG. 21  CTS to SELF (CTS2SELF) (15)

FIG. 32    Combination A (27)

FIG. 33    Combination B (28)

FIG. 34  Combination C (29)

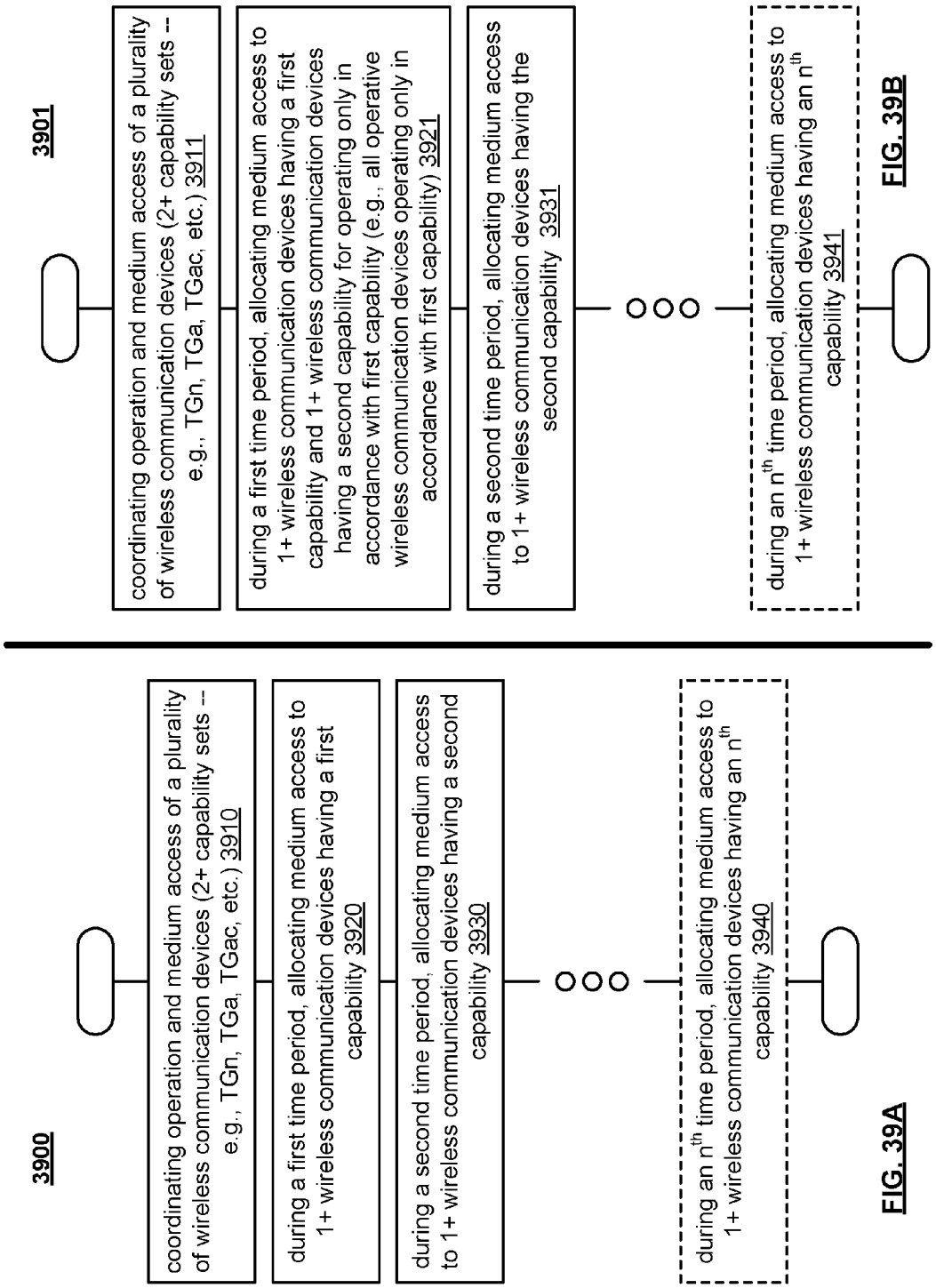

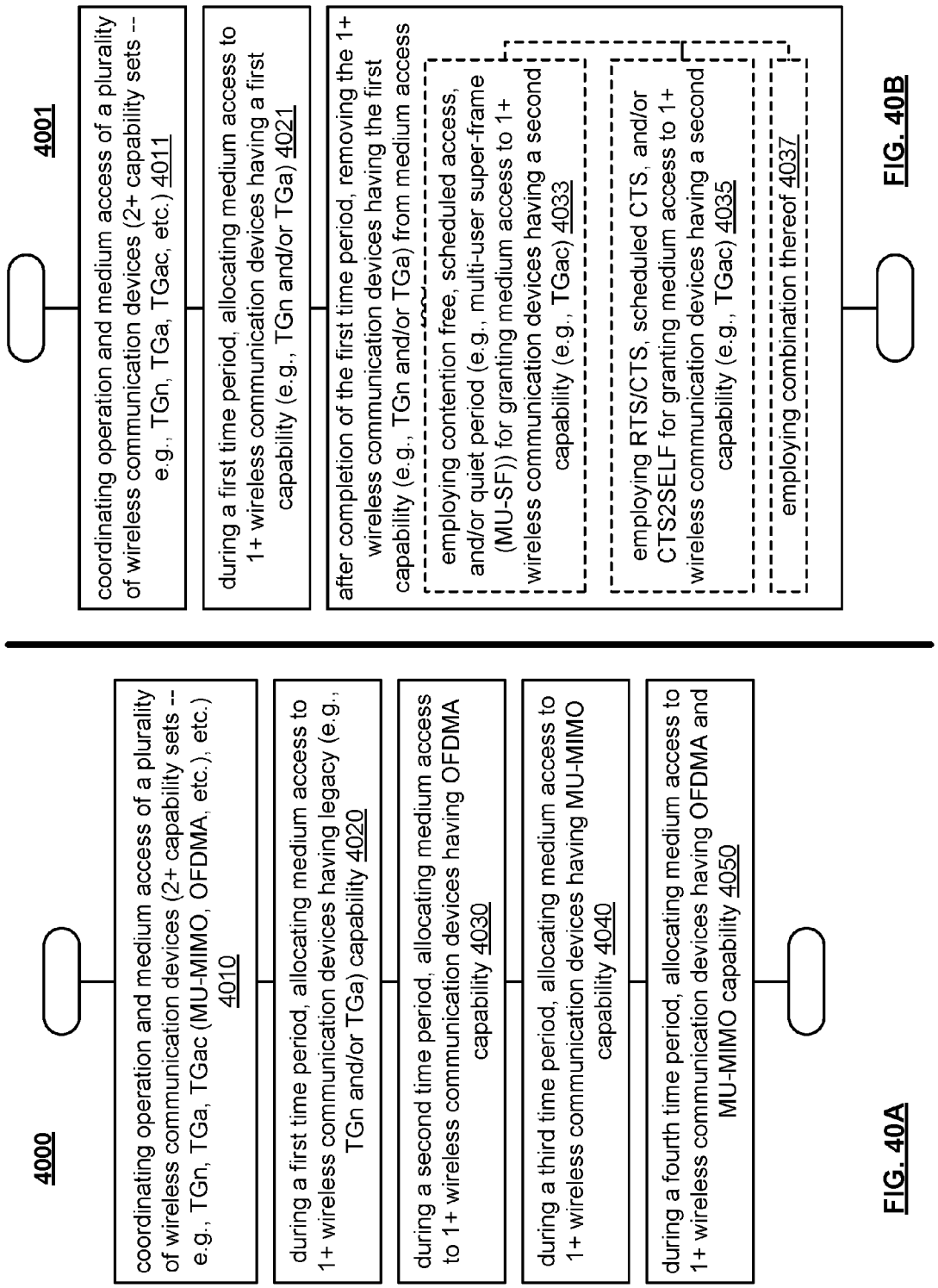

MIXED MODE OPERATIONS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility patent application claims priority pursuant to 35 U.S.C. § 120 as a continuation of U.S. Utility application Ser. No. 12/854,457, entitled "Mixed mode operations within multiple user, multiple access, and/or MIMO wireless communications," filed Aug. 11, 2010, pending, which claims priority pursuant to 35 U.S.C. § 120 as a continuation-in-part of U.S. Utility application Ser. No. 12/794,712, entitled "Transmission coordination within multiple user, multiple access, and/or MIMO wireless communications," filed Jun. 4, 2010, which claims priority pursuant to 35 U.S.C. § 119(e) to U.S. Provisional Application No. 61/184,431, entitled "WLAN resource allocation using long term feedback for simultaneous/nonsimultaneous transmissions," filed Jun. 5, 2009; and U.S. Provisional Application No. 61/219,540, entitled "WLAN scheduling and mixed mode operations in OFDMA and/or MU-MIMO transmissions," filed Jun. 23, 2009, all of which are hereby incorporated herein by reference in their entirety and made part of the present U.S. Utility patent application for all purposes.

U.S. Utility application Ser. No. 12/854,457 also claims priority pursuant to 35 U.S.C. § 120, as a continuation-in-part of U.S. Utility application Ser. No. 12/817,118, entitled "Scheduled clear to send (CTS) for multiple user, multiple access, and/or MIMO wireless communications," filed Jun. 16, 2010, now U.S. Pat. No. 8,582,485 on Nov. 12, 2013, which claims priority pursuant to 35 U.S.C. § 119(e) to U.S. Provisional Application No. 61/187,326, entitled "Scheduled clear to send for OFDMA multiple access and/or multi-user MIMO WLAN transmissions," filed Jun. 16, 2009, all of which are hereby incorporated herein by reference in their entirety and made part of the present U.S. Utility patent application for all purposes.

U.S. Utility application Ser. No. 12/817,118 also claims priority pursuant to 35 U.S.C. § 120, as a continuation-in-part of U.S. Utility application Ser. No. 12/796,654, entitled "Channel characterization and training within multiple user, multiple access, and/or MIMO wireless communications," filed Jun. 8, 2010, now U.S. Pat. No. 8,526,351 on Sep. 3, 2013, which claims priority pursuant to 35 U.S.C. § 119(e) to U.S. Provisional Application No. 61/185,153, entitled "OFDMA cluster parsing and acknowledgement to OFDMA/MU-MIMO transmissions in WLAN device," filed Jun. 8, 2009; U.S. Provisional Application No. 61/185,161, entitled "WLAN Multi-user/OFDM multiple access training," filed Jun. 8, 2009; U.S. Provisional Application No. 61/186,119, entitled "WLAN Multi-user/OFDM multiple access training," filed Jun. 11, 2009; U.S. Provisional Application No. 61/311,480, entitled "Next generation WLAN backwards compatible sounding frame," filed Mar. 8, 2010; U.S. Provisional Application No. 61/250,491, entitled "Multi-user multiple input multiple output preamble," filed Oct. 9, 2009; U.S. Provisional Application No. 61/255,690, entitled "Multi-user multiple input multiple output preamble," filed Oct. 28, 2009; U.S. Provisional Application No. 61/257,323, entitled "Multi-user multiple input multiple output preamble," filed Nov. 2, 2009; U.S. Provisional Application No. 61/321,430, entitled "Multi-user multiple input multiple output preamble," filed Apr. 6, 2010; all of which are hereby incorporated herein by reference in their entirety and made part of the present U.S. Utility patent application for all purposes.

U.S. Utility application Ser. No. 12/796,654 also claims priority pursuant to 35 U.S.C. § 120, as a continuation-in-part of U.S. Utility application Ser. No. 12/794,707, entitled "Cluster parsing for signaling within multiple user, multiple access, and/or MIMO wireless communications," filed Jun. 4, 2010, which claims priority pursuant to 35 U.S.C. § 119(e) to U.S. Provisional Application No. 61/184,420, entitled "OFDMA cluster parsing and acknowledgement to OFDMA/MU-MIMO transmissions in WLAN device," filed Jun. 5, 2009; and U.S. Provisional Application No. 61/185,153, entitled "OFDMA cluster parsing and acknowledgement to OFDMA/MU-MIMO transmissions in WLAN device," filed Jun. 8, 2009, all of which are hereby incorporated herein by reference in their entirety and made part of the present U.S. Utility patent application for all purposes.

U.S. Utility application Ser. No. 12/796,654 also claims priority pursuant to 35 U.S.C. § 120, as a continuation-in-part of U.S. Utility application Ser. No. 12/794,711, entitled "Transmission acknowledgement within multiple user, multiple access, and/or MIMO wireless communications," filed Jun. 4, 2010, now U.S. Pat. No. 8,498,359 on Jul. 30, 2013, which claims priority pursuant to 35 U.S.C. § 119(e) to U.S. Provisional Application No. 61/184,420, entitled "OFDMA cluster parsing and acknowledgement to OFDMA/MU-MIMO transmissions in WLAN device," filed Jun. 5, 2009; and U.S. Provisional Application No. 61/185,153, entitled "OFDMA cluster parsing and acknowledgement to OFDMA/MU-MIMO transmissions in WLAN device," filed Jun. 8, 2009, all of which are hereby incorporated herein by reference in their entirety and made part of the present U.S. Utility patent application for all purposes.

INCORPORATION BY REFERENCE

The following U.S. Utility patent applications are hereby incorporated herein by reference in their entirety and are made part of the present U.S. Utility patent application for all purposes:

1. U.S. Utility patent application Ser. No. 12/796,655, entitled "Group identification and definition within multiple user, multiple access, and/or MIMO wireless communications," filed Jun. 8, 2010, now U.S. Pat. No. 9,197,298 on Nov. 24, 2015.

2. U.S. Utility patent application Ser. No. 12/821,094, entitled "Medium accessing mechanisms within multiple user, multiple access, and/or MIMO wireless communications," filed on Jun. 22, 2010, now U.S. Pat. No. 8,441,975 on May 14, 2013.

The following IEEE standard is hereby incorporated herein by reference in its entirety and is made part of the present U.S. Utility patent application for all purposes:

1. IEEE 802.11—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

Technical Field of the Invention

The invention relates generally to communication systems; and, more particularly, it relates to mixed mode operations within multiple user, multiple access, and/or MIMO wireless communication systems.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7-9 are diagrams illustrating various embodiments for encoding the scrambled data.

FIG. 14A, FIG. 14B, and FIG. 15 are diagrams illustrating embodiments of time division of medium access for various wireless communication devices corresponding to various capabilities.

FIG. 39A, FIG. 39B, FIG. 40A, FIG. 40B, FIG. 41A, FIG. 41B, and FIG. 42 are diagrams illustrating various embodiments of methods for operating one or more wireless communication devices.

DETAILED DESCRIPTION OF THE INVENTION

Figure 1:
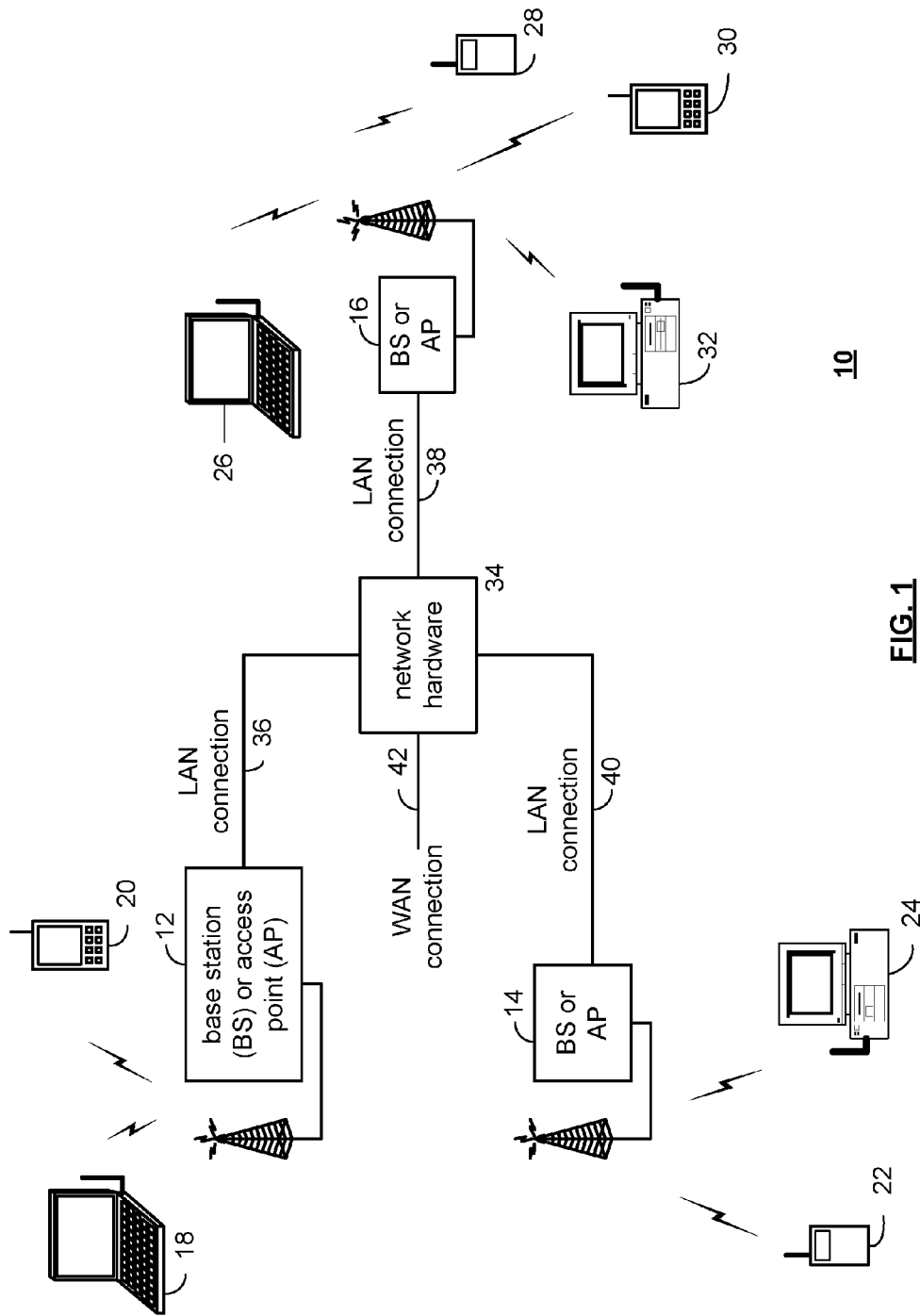
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSDPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
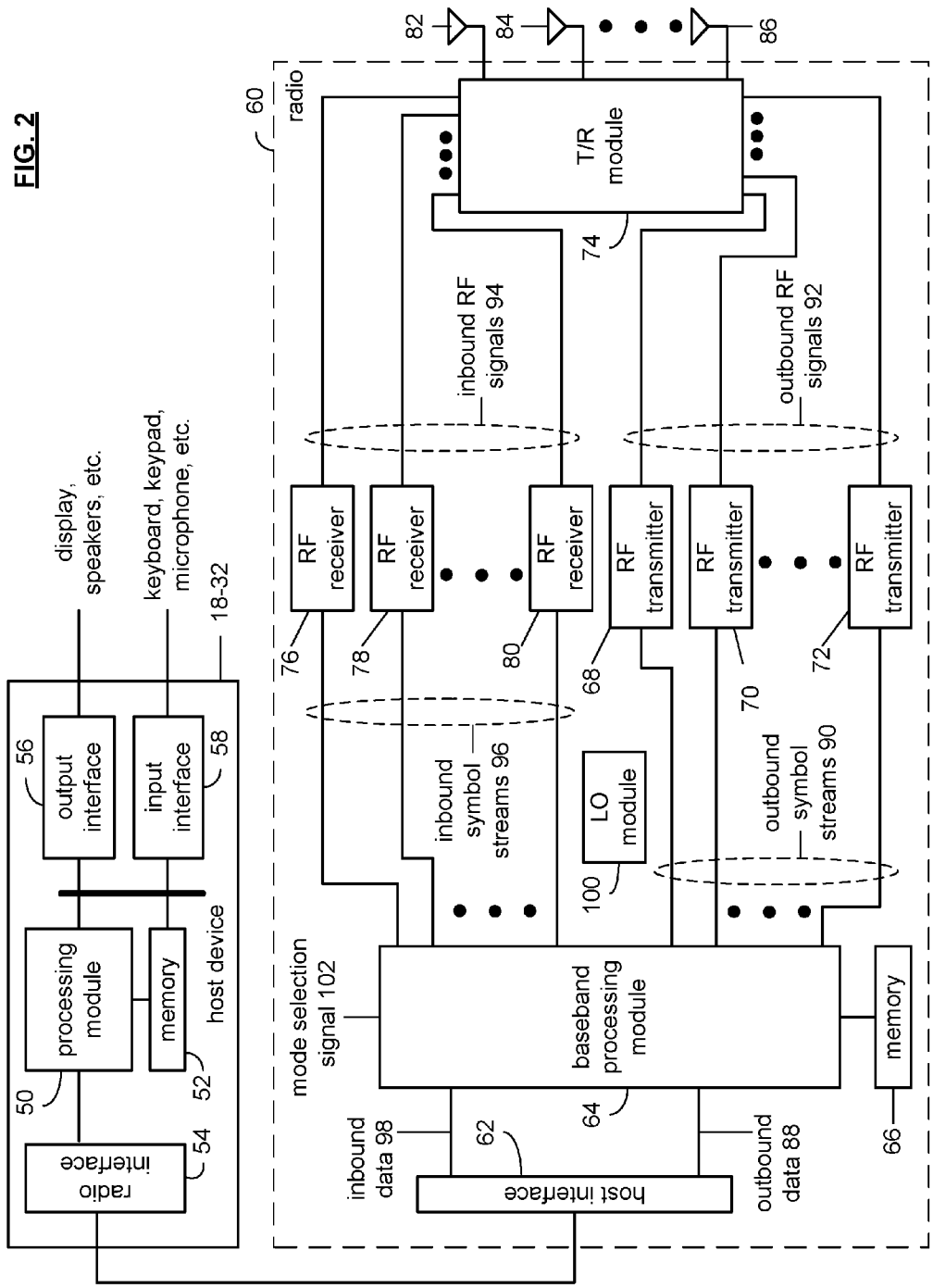
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHT).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
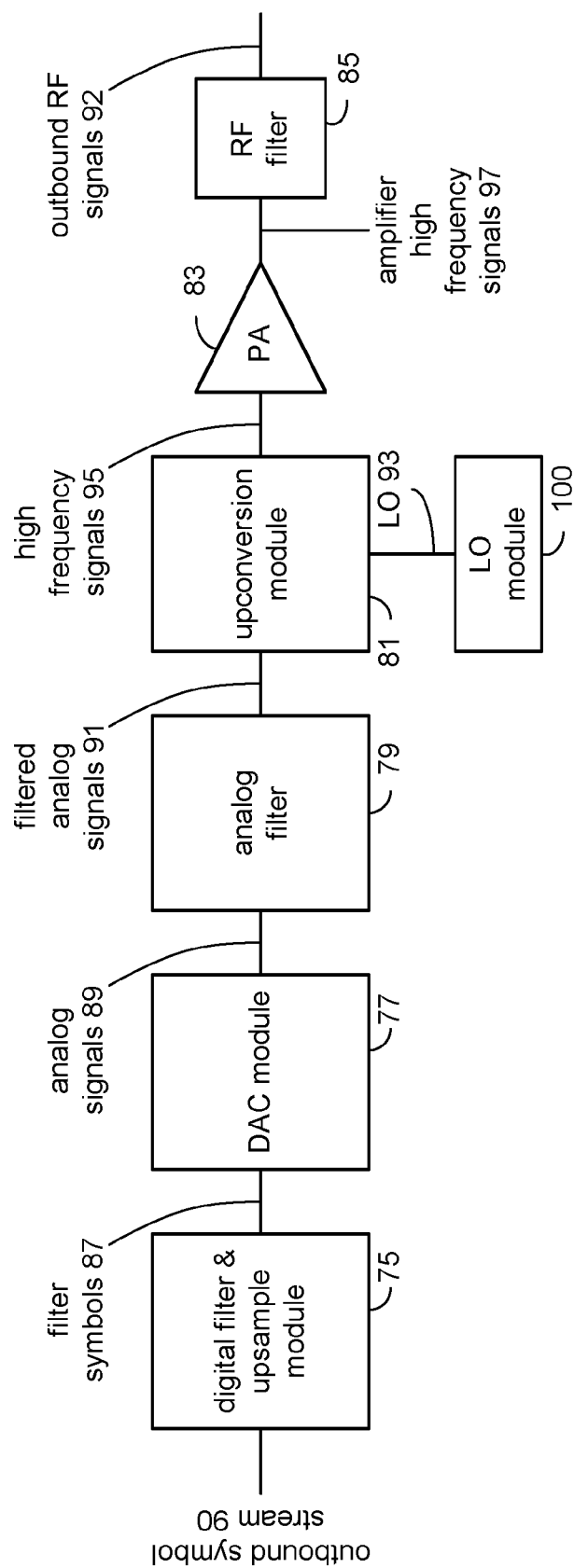
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
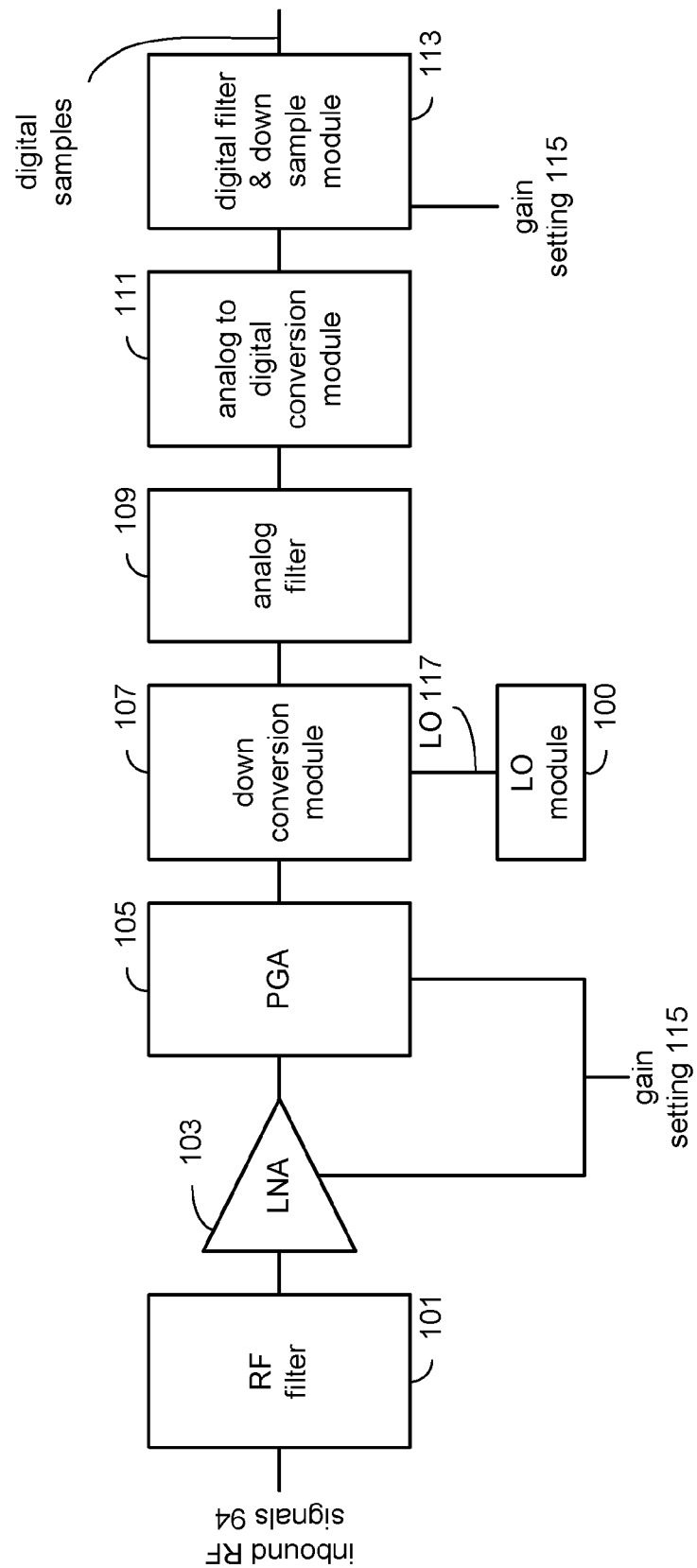
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
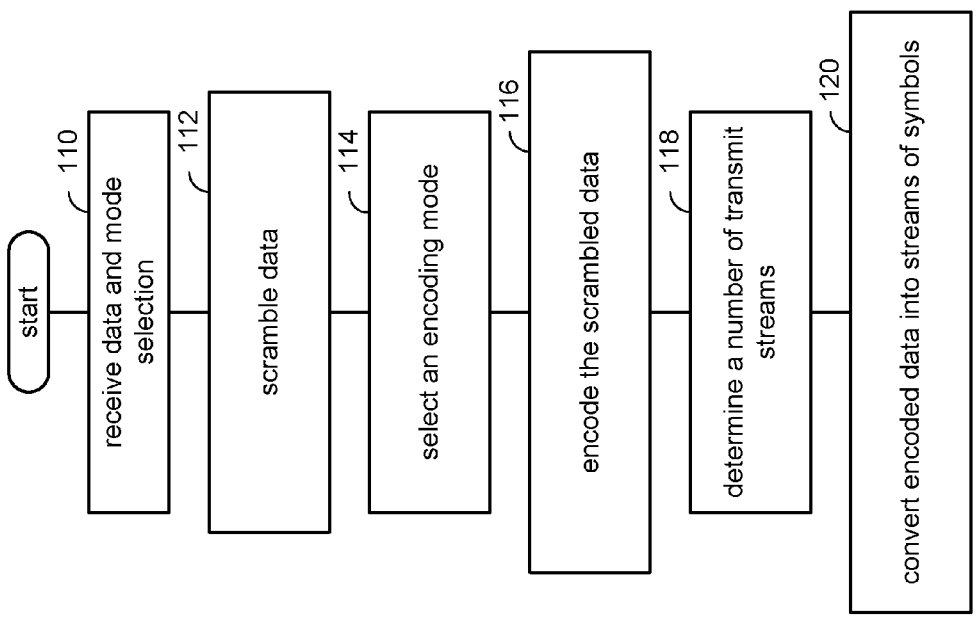
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more of a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
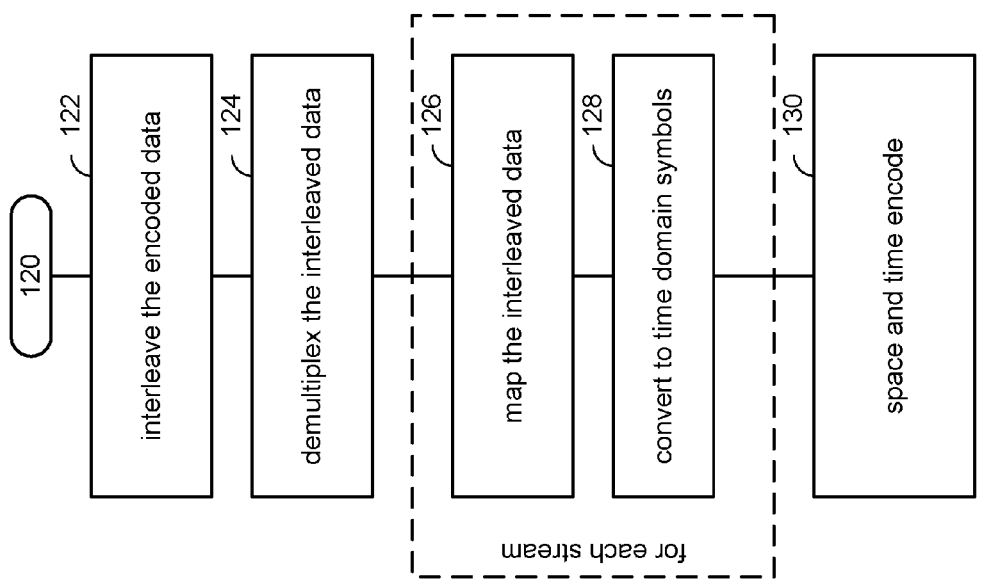
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include 1/2, 2/3 and/or 3/4, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
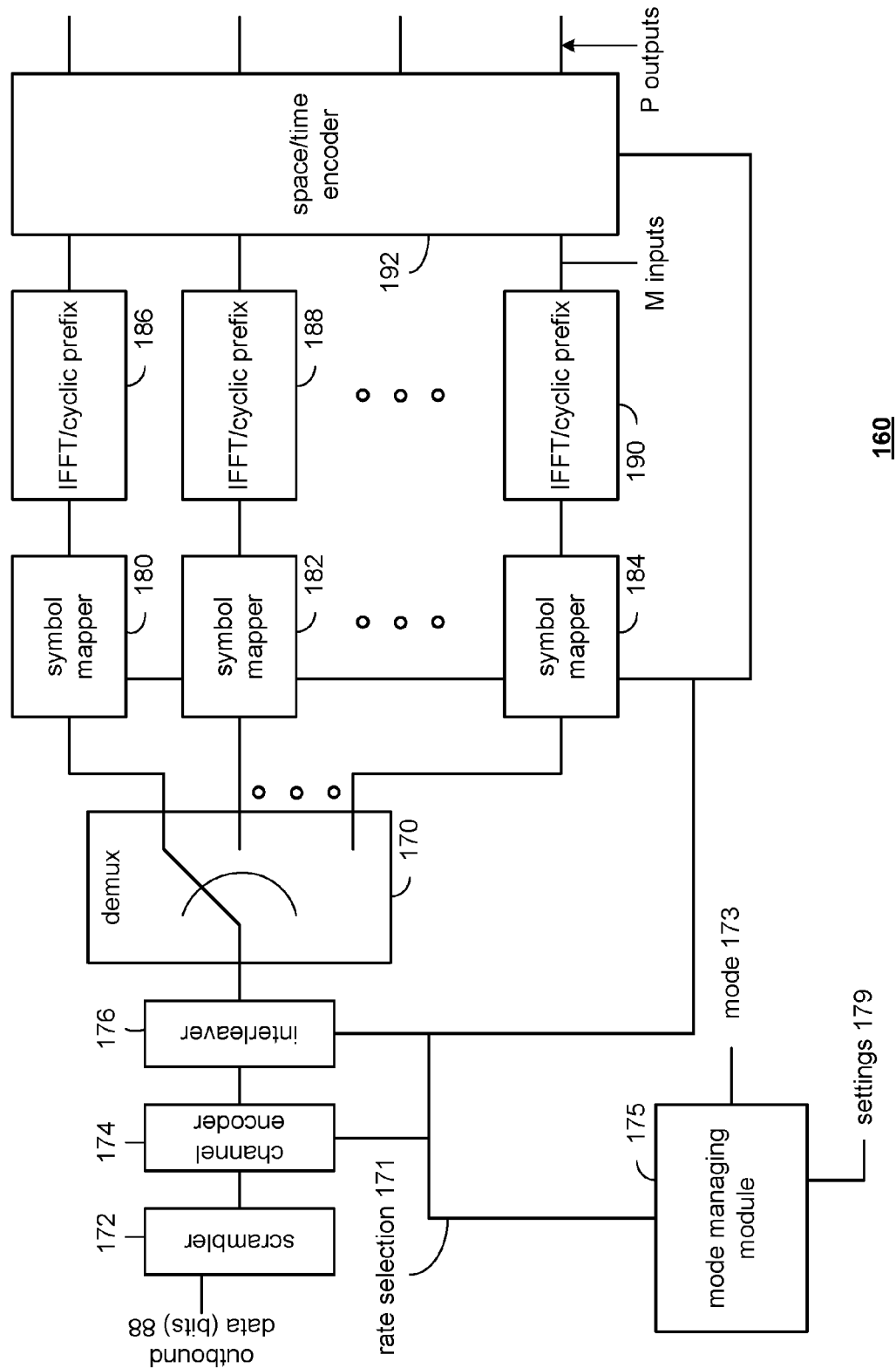
FIGS. 10A and 10B are diagrams illustrating embodiments of a radio transmitter.
Figure 10B:
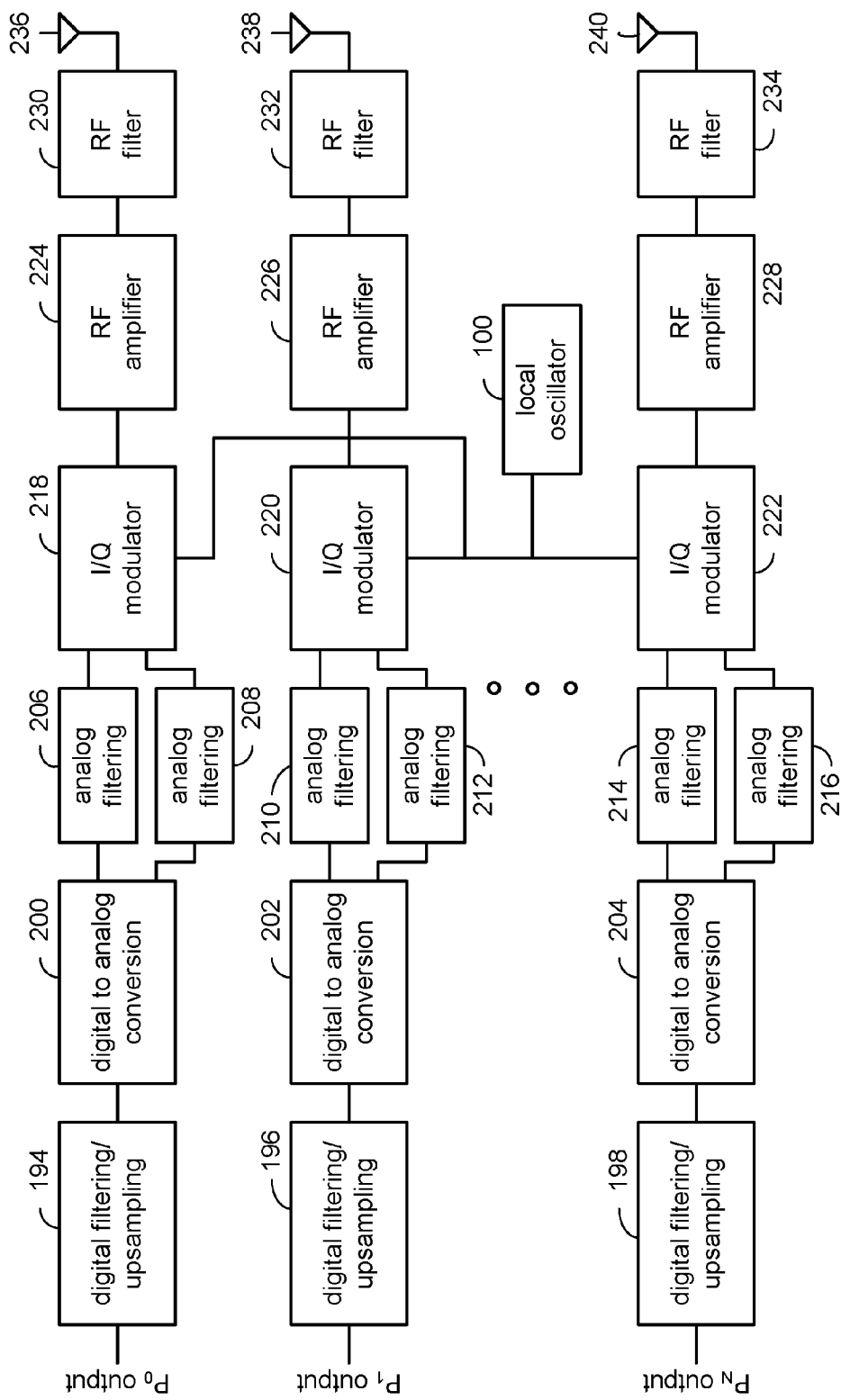

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate 1/2convolutional encoder with 64 states and a generator polynomials of $G_0=133_8$ and $G_1=171_8$. The output of the convolutional encoder may be punctured to rates of 1/2, 2/3, and 3/4 according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
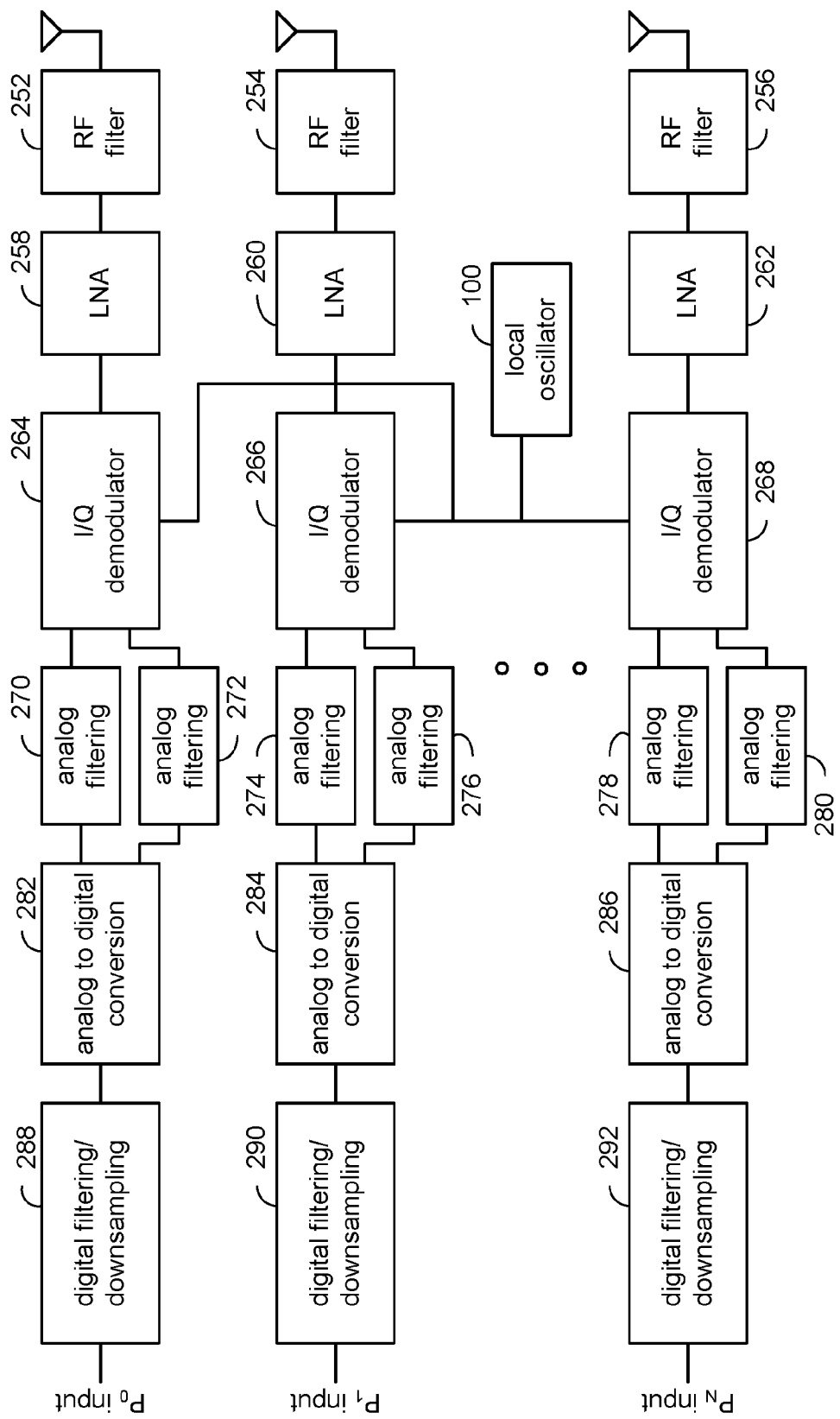
FIGS. 11A and 11B are diagrams illustrating embodiments of a radio receiver.
Figure 11B:
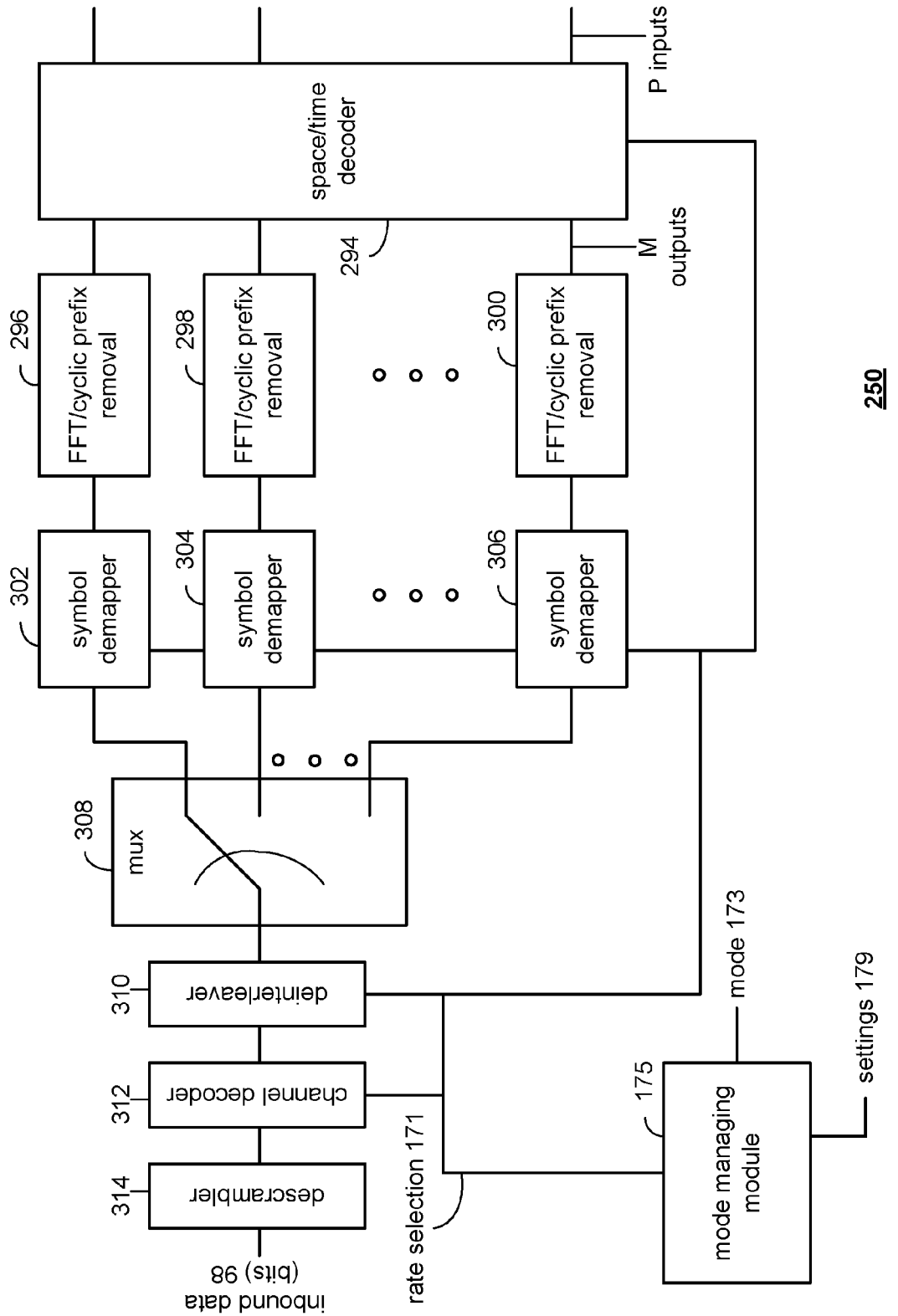

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
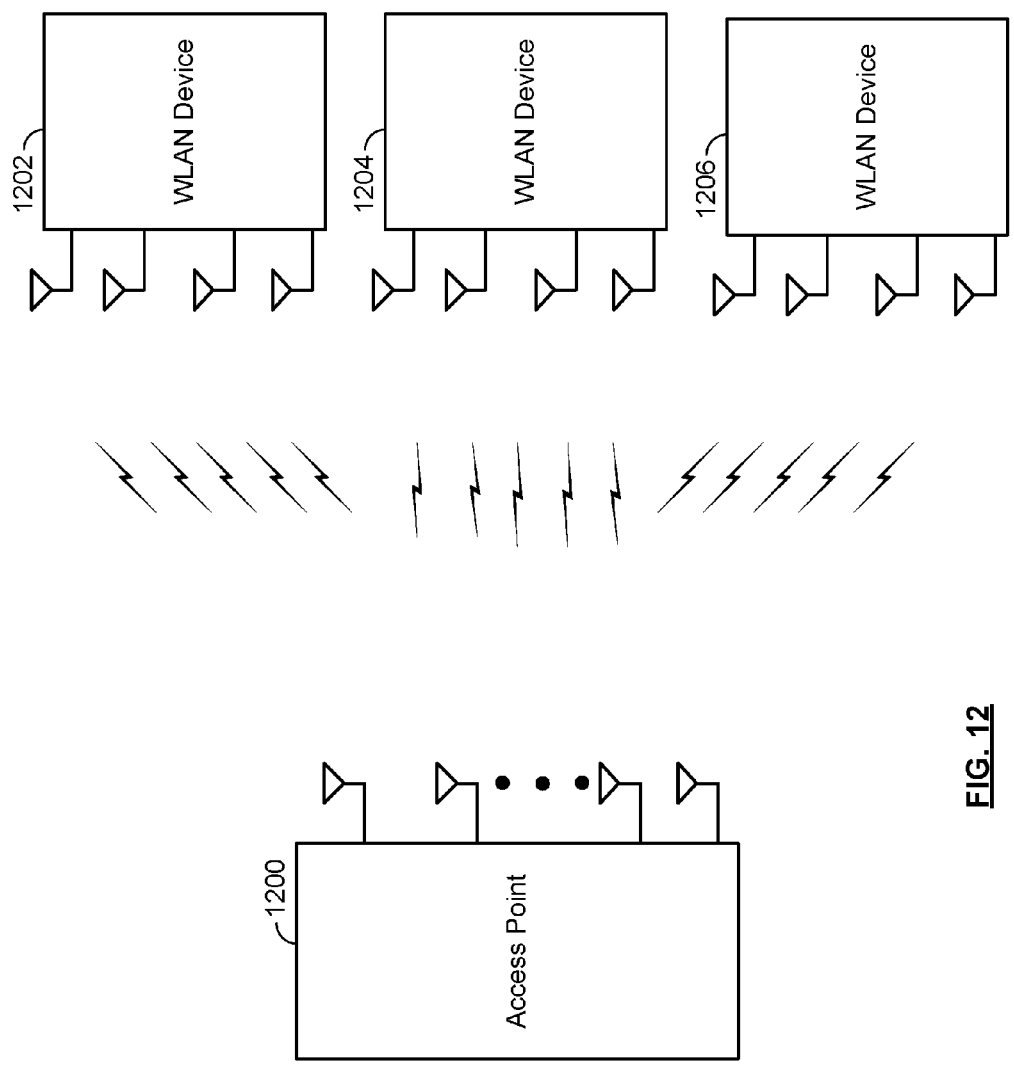
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
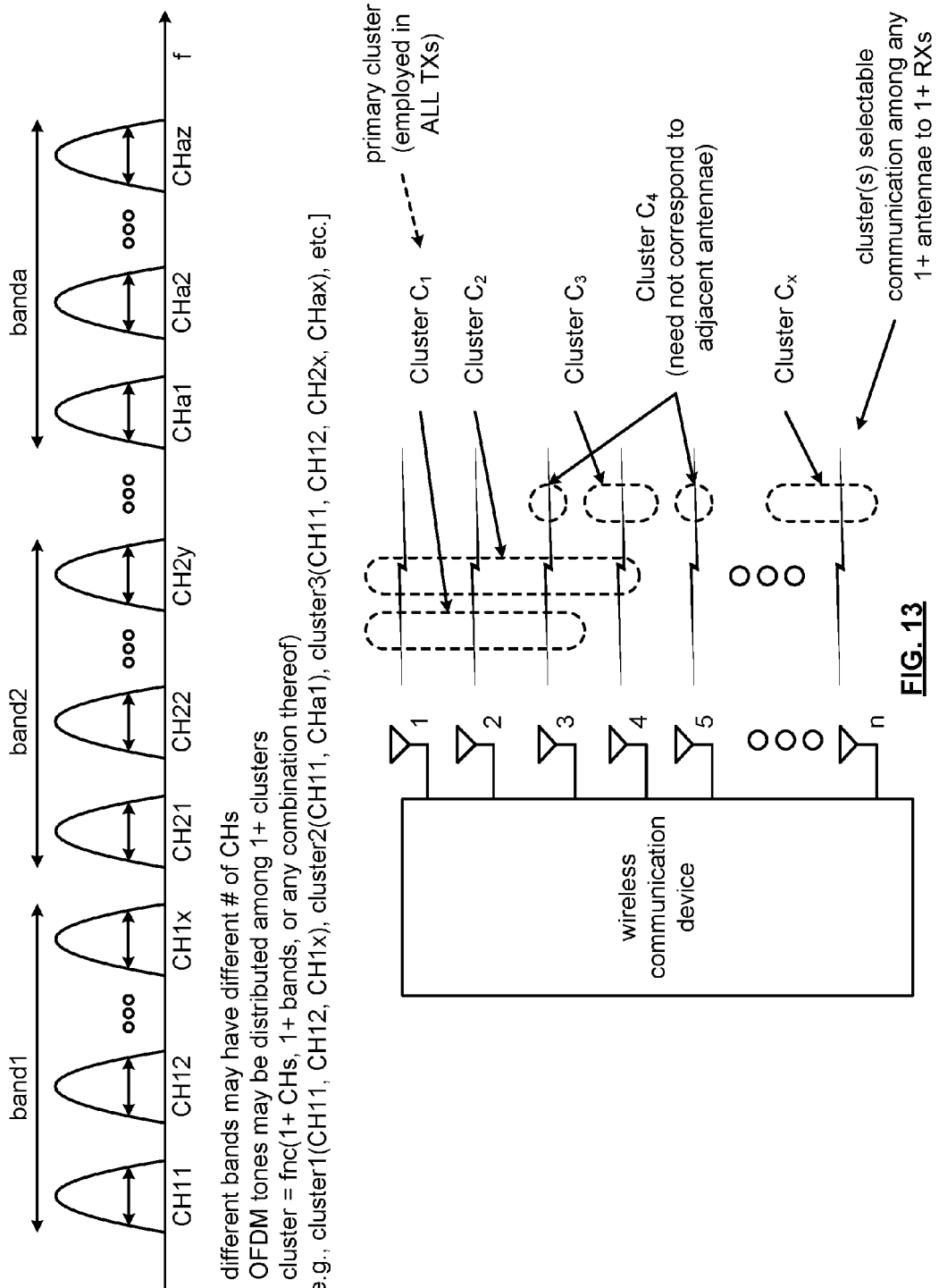
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

"When operating certain wireless communication systems, sometimes the wireless communication devices therein may have different capabilities. For example, certain wireless communication devices having a first capability (e.g., TGn, such as those operative in compliance with the recommended practices and/or standards IEEE amendment TGn) and other wireless communication devices having a second capability (e.g., TGac, such as those operative in compliance with the recommended practices and/or standards of the IEEE Task Group ac (TGac VHT)) may be operative within a common vicinity. In such instances, coordination must be made to ensure proper operation of the different types of wireless communication devices and the protocols, standards, and manner of operation of them all. Such operation of a wireless communication system, including various wireless communication devices of various capabilities, may generally be referred to as being a mixed mode wireless communication system. Such mixed operation may generally be referred to as a condition where wireless communication devices having capability associated with MU-MIMO/OFDMA, MU-MIMO, OFDMA, etc. are operating on the same set of clusters (e.g., channels within one or more bands) as wireless communication devices that do not have such multi-user related capability (e.g., legacy devices, such as TGn and/or TGa wireless communication devices)."

Various novel means of operational and associated mechanisms are presented herein by which such mixed mode operation may be made. In a first embodiment (case 1), access to the medium (e.g., access to one or more clusters employed) may be effectuated using time division in which medium access is time divided among the various types of wireless communication devices. For example, those wireless communication devices having a first capability (e.g., TGac) may be granted medium access at different times than other of the wireless communication devices that do not have such first capability (e.g., legacy, TGn and/or TGa), but instead have a second (or third) capability. Those wireless communication devices not having such first capability are ensured to be accessing the medium when those wireless communication devices having the first capability are accessing the medium. From certain perspectives, the air time may be generally viewed as being divided being legacy and TGac devices such that the legacy and MU-MIMO/OFDMA enabled wireless communication devices are scheduled access to the medium at different time instances.

In another embodiment (case 2), both wireless communication devices having each of a first capability and a second capability (and/or third capability, etc.) are granted access to the medium simultaneously or at the same time. Certain aspects of such an operational mode involve assigning at least one primary cluster for use by wireless communication devices having such first capability (e.g., legacy, TGn and/or TGa), and then assigning at least one other cluster (e.g., at least one non-primary cluster) for use by wireless communication devices having such a second capability (e.g., TGac). As such, the at least one primary cluster may be used for legacy recipients while the non-primary channels may be designated for use by the TGac recipients. In certain embodiments, the transmitting wireless communication device (e.g., a MU-MIMO/OFDMA transmitter such as an access point (AP)), may choose one or more of the clusters as being the at least one primary channel (e.g., designate which cluster(s) is/are the primary clusters). When the transmitting wireless communication device performs the designation/assignment of which of the clusters is/are primary, then if and when an interferer blocks the primary cluster, then the transmitting wireless communication device may adaptively change which of the clusters are designated as primary.

Also, consideration of which or how many of the clusters are designated as primary (e.g., for use by the legacy, TGn and/or TGa wireless communication devices) and non-primary may be dependent upon or a function of the number of devices within the communication system respectively having the different capabilities (e.g., how many wireless communication devices have the first capability, how many wireless communication devices have the second capability, etc.). Also, consideration may be made with respect to the traffic associated with each of the wireless communication devices having the different capabilities. Such consideration of such parameters (e.g., number of wireless communication devices of each type, traffic associated with each, and/or other parameters, etc.) may be effectuated by a transmitting wireless communication device (e.g., a MU-MIMO/OFDMA transmitter such as an access point (AP)) within such a wireless communication system. In some embodiments, those wireless communication devices having a first capability (e.g., legacy, TGn and/or TGa) may use a lower set of clusters and those wireless communication devices having a second capability (e.g., TGac) may use a higher set of clusters channels in accordance with a division of clusters embodiment.

In yet another embodiment (case 3), wireless communication devices having each of a first capability and a second capability (and/or third capability, etc.) are granted medium access in accordance with any combination of the case 1 and case 2 described herein. For example, the air time or medium access may be divided into a mixed device interval and one or more other intervals operable respectively for only those wireless communication devices having a first capability (e.g., legacy, TGn and/or TGa) and for only those wireless communication devices having a second capability (e.g., TGac). For example, a first interval may be for operation in accordance with mixed mode operation such that wireless communication devices having both a first capability (e.g., legacy, TGn and/or TGa) and a second capability (e.g., TGac) (and/or additional capabilities) may be concurrently operational. A second interval may be for operation in accordance with only those wireless communication devices having a first capability (e.g., legacy, TGn and/or TGa) or only those wireless communication devices having a second capability (e.g., TGac), and/or one other type of capability.

In some instances, one or more wireless communication devices having such a first capability (e.g., legacy, TGn and/or TGa) and one or more wireless communication devices having such a second capability (e.g., TGac) may both be assigned to at least one primary cluster. In such instances, the one or more wireless communication devices having such a first capability (e.g., legacy, TGn and/or TGa) typically is given access to the communication medium firstly; then, after a period of time (e.g., predetermined or adaptively determined period of time), the one or more wireless communication devices having such a second capability (e.g., TGac) is given access to the communication medium secondly. This way, the activity of the one or more wireless communication devices having such a first capability (e.g., legacy, TGn and/or TGa) is essentially invisible to the one or more wireless communication devices having such a first capability (e.g., legacy, TGn and/or TGa).

Such an operational mode may be performed as assigning at least one primary cluster for use by both the one or more wireless communication devices having such a first capability (e.g., legacy, TGn and/or TGa) and the one or more wireless communication devices having such a second capability (e.g., TGac), and then time dividing medium access such that the one or more wireless communication devices having such a second capability (e.g., TGac) have medium access after a period of time that the one or more wireless communication devices have such a first capability (e.g., legacy, TGn and/or TGa) having medium access.

In a preferred embodiment, a transmission from a transmitting wireless communication device (e.g., a MU-MIMO/OFDMA transmission) and the associated responses send from the receiving wireless communication devices back to the transmitting wireless communication device is ideally invisible, on the primary one or more clusters, to those wireless communication devices that are not capable or operable in accordance with such newer communication standards and protocols (e.g., those wireless communication devices having such a capability (e.g., legacy, TGn and/or TGa)). Moreover, the responses transmitted to the transmitting wireless communication device (e.g., from the receiving wireless communication devices) should also be sent in a way that does not interfere with operational standards, procedure, recommended practices, etc. used by those wireless communication devices having such a capability (e.g., legacy, TGn and/or TGa)).

In some embodiments, for complexity considerations, performance reasons, and/or other combinations of pooling, mixing or separation (in time or frequency) of devices may be preferable for some applications.

When operating in accordance with the time division functionality as described herein, the intervals employed for non-legacy wireless communication devices (e.g., TGac), may themselves be divided into one or more types of intervals. For example, the intervals corresponding to such non-legacy wireless communication devices (e.g., TGac) may be operative in accordance with a MU-MIMO only time interval (e.g., in which OFDMA is not used), an OFDMA only time interval (e.g., in which MU-MIMO is not used), and/or a MU-MIMO/OFDMA time interval (e.g., in which both MU-MIMO and OFDMA are used simultaneously).

For such time intervals (e.g., for non-legacy wireless communication devices (e.g., TGac)), the entirety of a given time interval may be MU-MIMO only, OFDMA only, or MU-MIMO/OFDMA only. Alternatively, a given time interval may subdivided into any combination of MU-MIMO only, OFDMA only, or MU-MIMO/OFDMA only. For example, a first portion of a given time interval may be for MU-MIMO only, a second portion of that given time interval may be for OFDMA only, and a third portion of that given time interval may be for MU-MIMO/OFDMA only, etc. Any combination of such MU-MIMO only, OFDMA only, or MU-MIMO/OFDMA only may be employed among any one or more time intervals for non-legacy wireless communication devices (e.g., TGac).

Moreover, it is also noted that simultaneous MU-MIMO transmission to wireless communication devices having both the first and the second capabilities (e.g., TGac and TGn and/or TGa) devices may be possible. For example, such wireless communication devices having both the first and the second capabilities (e.g., TGac and TGn and/or TGa) devices may operate in Greenfield mode. Such operation may also involve applying beamforming from a beginning of the packet, such as the beamforming from beginning of the packet as defined in the IEEE 802.11 amendment TGn for Greenfield transmissions.

Referring again to the first embodiment operational mode (case 1) referenced above that operates in accordance with using time division in which medium access is time divided among the various types of wireless communication devices, the medium access time may be divided between those wireless communication devices having a first capability (e.g., legacy, TGn and/or TGa) and those wireless communication devices having a second capability (e.g., TGac, MU-MIMO/OFDMA).

The transmitting wireless communication device (e.g., MU-MIMO/OFDMA transmitter and/or AP) may use a mechanism to take those wireless communication devices not having such capability (e.g., the legacy, TGn and/or TGa wireless communication devices) off of the air and deny them medium access during certain periods. For example, such a contention free period may be used for MU-MIMO/OFDMA transmissions, and may be implemented by employing the transmission of a multi-user super-frame (MU-SF) from the transmitting wireless communication device to the receiving wireless communication devices. In other embodiments, quiet periods (e.g., such as may be effectuated using a MU-SF) may be used by a transmitting wireless communication device (e.g., MU-MIMO/OFDMA transmitter) to take those wireless communication devices not having such capability (e.g., the legacy, TGn and/or TGa wireless communication devices) off of the air and deny them medium access during certain periods such as when MU-MIMO/OFDMA forward and reverse transmissions are happening; such functionality may also be effectuated using a MU-SF from the transmitting wireless communication device to the receiving wireless communication devices.

Yet another manner by which those wireless communication devices not having such capability (e.g., the legacy, TGn and/or TGa wireless communication devices) may be taken off of the air and denied medium access during certain periods involves employing request to send (RTS) and clear to send (CTS) exchanges (including scheduled CTS transmissions), and/or clear to send to self (CTS2SELF) may be used. Alternatively, other channel reservations may be employed (e.g., performing medium reservation by performing handshakes between various wireless communication devices) without departing from the scope and spirit of the invention. Moreover, any such combination of operation employing such a MU-SF, quiet period, RTS/CTS exchanges, scheduled CTS, CTS2SELF, etc. may be employed to take those wireless communication devices not having such capability (e.g., the legacy, TGn and/or TGa wireless communication devices) off of the air.

The transmitting wireless communication device (e.g., MU-MIMO/OFDMA transmitter and/or AP) may also use different cluster accessing mechanisms during those time intervals used for non-legacy wireless communication devices (e.g., TGac). As some examples, scheduled access may be used during any one or more of such time intervals for non-legacy wireless communication devices (e.g., TGac). Alternatively, carrier sense multiple access (CSMA) (or a variant thereof, such as carrier sense multiple access (CSMA)/collision avoidance (CA)) may also be employed during any one or more of such time intervals for non-legacy wireless communication devices (e.g., TGac).

Moreover, any such combination of scheduled access, a variant of CSMA, etc. may be employed during those time intervals used for non-legacy wireless communication devices (e.g., TGac).

FIG. 14A, FIG. 14B, and FIG. 15 are diagrams illustrating embodiments of time division of medium access for various wireless communication devices corresponding to various capabilities.

Referring to FIG. 14A, various periods of time are divided into intervals for supporting wireless communication devices of various capabilities. For example, during a first period (e.g., period 1), a first time interval ($T_{capability\ set1}$) therein coordinates operations and allows medium access for those wireless communication devices having a first capability. During this same period (e.g., period 1), a second time interval ($T_{capability\ set2}$) therein coordinates operations and allows medium access for those wireless communication devices having a second capability. Other intervals of time may be implemented therein to accommodate other wireless communication devices having other capabilities as well. Additional periods (e.g., period 2, period 3, etc.) may be employed that are similar to the first period. In this embodiment, the various periods include respective intervals therein in the same order as one another, they are of the same length, and essentially identical to one another.

Referring to FIG. 14B, this embodiment shows various periods having respective intervals therein that not necessarily identical to one other or in the same order within each respective period. In addition, an interval in one period that allows medium access for those wireless communication devices having a particular capability (e.g., $T_{capability\ set1}$ in period 1) is not necessarily in the same location at such an interval in another period (e.g., $T_{capability\ set1}$ in period 2), and such intervals in different periods need not be of the same duration in each respective period. A great degree of flexibility is provided in which any of the period durations, the order of intervals within respective periods, the duration of respective intervals within respective periods, etc. may be modified as desired in various applications.

Referring to FIG. 15, there are various wireless communication devices such that some of the wireless communication devices therein have a first capability (e.g., legacy, TGn and/or TGa) and other of wireless communication devices therein have a second capability (e.g., new, TGac).

For example, during a first period (e.g., period 1), a first time interval ($T_{new1}$) therein coordinates operations and allows medium access for those wireless communication devices having a second capability. During this same period (e.g., period 1), a second time interval ($T_{legacy\ 1}$) therein coordinates operations and allows medium access for those wireless communication devices having the first capability. During this same period (e.g., period 1), a third time interval ($T_{new2}$) therein coordinates operations and allows medium access for those wireless communication devices having the second capability, and fourth time interval ($T_{legacy2}$) therein coordinates operations and allows medium access for those wireless communication devices having the first capability, and so on until the end of the period.

Other intervals of time may be implemented therein to accommodate other wireless communication devices having other capabilities as well. Additional periods (e.g., period 2, period 3, etc.) may be employed that are similar to the first period. In this embodiment shown in the diagram, the various periods include respective intervals therein in the same order as one another, they are of the same length, and essentially identical to one another. However, it is of course noted that such intervals in different periods need not be of the same duration in each respective period. A great degree of flexibility is provided in which any of the period durations, the order of intervals within respective periods, the duration of respective intervals within respective periods, etc. may be modified as desired in various applications. Such time intervals can be ordered in any fashion, the period durations need not be the same among various periods, and so on.

In certain embodiments, the time intervals $T_{new1}$, $T_{new2}$, etc. are the time durations for MU-MIMO/OFDMA transmissions, such that wireless communication devices not having such capability (e.g., legacy users) do not transmit during these time intervals, $T_{new1}$, $T_{new2}$, etc. The time intervals, $T_{legacy1}$, $T_{legacy2}$, etc. are used for legacy transmissions, such that wireless communication devices that have MU-MIMO and/or OFDMA capability (e.g., $TG_{ac}$ wireless communication devices) may not transmit in accordance with any new TGac formats (e.g., non-legacy or non-TGn, non-TGa formats) during these time intervals, $T_{legacy1}$, $T_{legacy2}$, etc.

When operating in accordance with a mixed device modem, wireless communication devices corresponding to at least two different capabilities operate concurrently and may use the same at least one cluster at the same time. For example, wireless communication devices operable in accordance with each of TGac and legacy (e.g., TGn and/or TGa) may share the channel at the same time.

The acknowledgments and the other response frames provide between the various legacy wireless communication devices should be transmitted according to the respective legacy protocol corresponding. For example, the legacy wireless communication device may transmit the ACK back to the transmitting wireless communication device (e.g., MU-MIMO/OFDMA transmitter, AP), $D_{ACK}$, after the transmission is over. The transmission, $D_{ACK}$, is determined based on the protocol used by the legacy wireless communication device.

Various cluster reservation mechanisms may also be employed to avoid interference between the wireless communication devices corresponding to the various capabilities (e.g., avoid interference between the legacy (TGn and/or TGa) and TGac wireless communication devices). Some examples of such cluster reservation mechanism may include RTS/CTS exchanges, scheduled CTS, CTS2SELF, etc. as have been referenced above as well with respect to taking certain wireless communication devices off of the air.

Channel occupancy indication and channel reservation, when operating a communication system having various wireless communication devices corresponding to at least two different capabilities, may be communicated among the various wireless communication devices in a number of different ways.

In one embodiment, the transmitting wireless communication device (e.g., The MU-MIMO/OFDMA transmitter or AP) may send beacons on all of the clusters being used for transmission so that the receiving wireless communication devices of a particular capability (e.g., legacy, TGn and/or TGa) can recognize the presence of an active basic service set (BSS) on certain clusters. In another embodiment, the transmitting wireless communication device (e.g., the MU-MIMO/OFDMA transmitter or AP) may use CTS to self (CTS2SELF) to adjust the network allocation vector (NAV) for the receiving wireless communication devices of a particular capability (e.g., legacy, TGn and/or TGa) during MU-MIMO transmissions and the corresponding subsequent responses. Moreover, another embodiment could operate such that RTS/CTS or CTS2SELF are used in combination with transmitting beacons on some or all of the clusters.

In yet another embodiment, RTS/CTS exchanges may be transmitted using frame formats of that format (e.g., legacy, TGn and/or TGa) to protect the duration of the MU-MIMO/OFDMA transmission and the corresponding subsequent responses. The duration field on a MU-MIMO/OFDMA transmission may be used to cover the duration of the MU-MIMO/OFDMA transmission and the corresponding subsequent responses.

A transmitting wireless communication device (e.g., The MU-MIMO/OFDMA transmitter or AP) may start transmitting if a given number of clusters (e.g., M clusters, where M is an integer) are available. Various options may be employed for cluster reservation such as described below. For example, a transmitting wireless communication device (e.g., The MU-MIMO/OFDMA transmitter or AP) may reserve the clusters (e.g., M clusters), when they are available. Alternatively, the transmitting wireless communication device may begin reserving the clusters when X (e.g., X≤M, where X is also an integer) channels are available.

In even another embodiment, the transmitting wireless communication device may use the NAV information on the busy clusters to decide if it should start reserving the IDLE clusters before M clusters are IDLE. For instance, if the NAV information (e.g., as has been set based on the previous packet receptions) indicates that the required M clusters will be (or are expected to be) IDLE within some period of time (e.g., $T_1$ milli-seconds (ms), then the transmitting wireless communication device may start reserving the currently IDLE channels. Such determinations (e.g., the numbers for M and X, the duration or time period of T1, etc.) may be made by the transmitting wireless communication device.

Certain of the following diagrams describe various embodiments by which coordination and operation of the wireless communication devices within the communication system having such capability to be able to operate in accordance with newer protocols, standards, and recommended practices (e.g., TGac, MU-MIMO, OFDMA, OFDMA/MU-MIMO/etc.). In a mixed mode environment, not all of the wireless communication devices have the same capability (e.g., some have legacy, TGn and/or TGa capability and others have TGac capability). As can be seen in many of the embodiments, at least one primary cluster may be employed in accordance with such operation so that those wireless communication devices not having capability (e.g., legacy, TGn and/or TGa) may be made aware of such operations.

Figure 16:
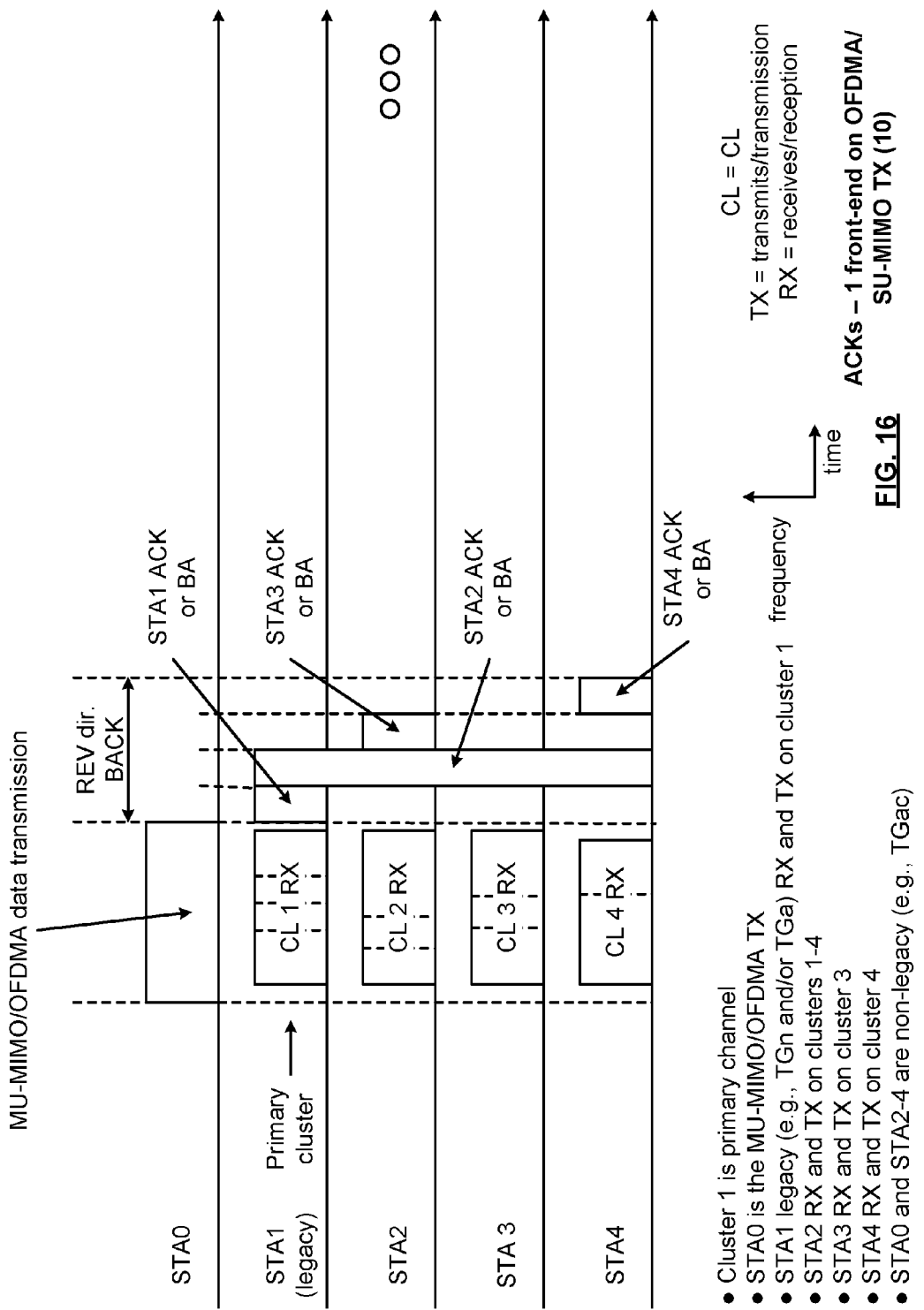
FIG. 16 is a diagram illustrating an embodiment of acknowledgements (ACKs) being provided to a transmitting wireless communication device (e.g., an access point (AP)), having at least one (1) front end, and being operable in accordance with orthogonal frequency division multiple access (OFDMA)/single-user multiple input multiple output (SU-MIMO).

FIG. 16 is a diagram illustrating an embodiment of acknowledgements (ACKs) being provided to a transmitting wireless communication device (e.g., an access point (AP)), having at least one (1) front end, and being operable in accordance with orthogonal frequency division multiple access (OFDMA)/single-user multiple input multiple output (SU-MIMO). The transmitting wireless communication device of FIG. 16 may be operative with as few as one (1) front end.

It is noted that while many of the embodiments presented herein describe wireless communication devices that include more than one front end to facilitate simultaneous reception of signals, alternative embodiments may include a single front end with certain additional radio features and corresponding analog to digital converter (ADC) structure such that the single front end could operate analogously to multiple front ends for performing simultaneous reception of signals. For example, a single front end could scan across multiple signals on various clusters (e.g., spending a certain amount of time on each cluster), and effectively perform simultaneous reception of signals.

Referring to FIG. 16, while the embodiment of FIG. 16 includes two front ends, the functionality described in this embodiment does not necessarily require two front ends. Also, with respect to FIG. 16, the wireless communication device operating on the primary cluster (e.g., STA 1) does not have such a capability as to operate in accordance with newer protocols, standards, and recommended practices (e.g., TGac), and may generally be referred to as a legacy type wireless communication device (e.g., legacy, TGn and/or TGa). Alternatively, such a STA 1 may be a more capable wireless communication device (e.g., TGac), yet operates only in accordance with such a prior operational mode (e.g., legacy, TGn and/or TGa). In this diagram, the STA 1 (e.g., operating as legacy, TGn and/or TGa) employs the primary cluster 1, and therefore it transmits its acknowledgement (ACK, which may be a single ACK or a block ACK) after the reception on the primary cluster is over.

Also, the transmitting wireless communication device is STA0, and it is a MU-MIMO/OFDMA transmitter. The STA1 receives and transmits on the primary cluster, cluster 1. The STA2 receives on cluster 2, and transmits on the clusters 1-4. The STA3 receives and transmits on the cluster 3. The STA4 receives and transmits on the cluster 4. Also, the STA0 and the STA2, STA3, and STA4 all have capability to operate in accordance with newer protocols, standards, and recommended practices (e.g., TGac). In this embodiment, because the transmitting wireless communication device (STA0) includes two separate radio front-ends, it can receive two signals simultaneously (e.g., from STA1 and STA4 at one time, and from STA2 and STA3 at another time).

Figure 17:
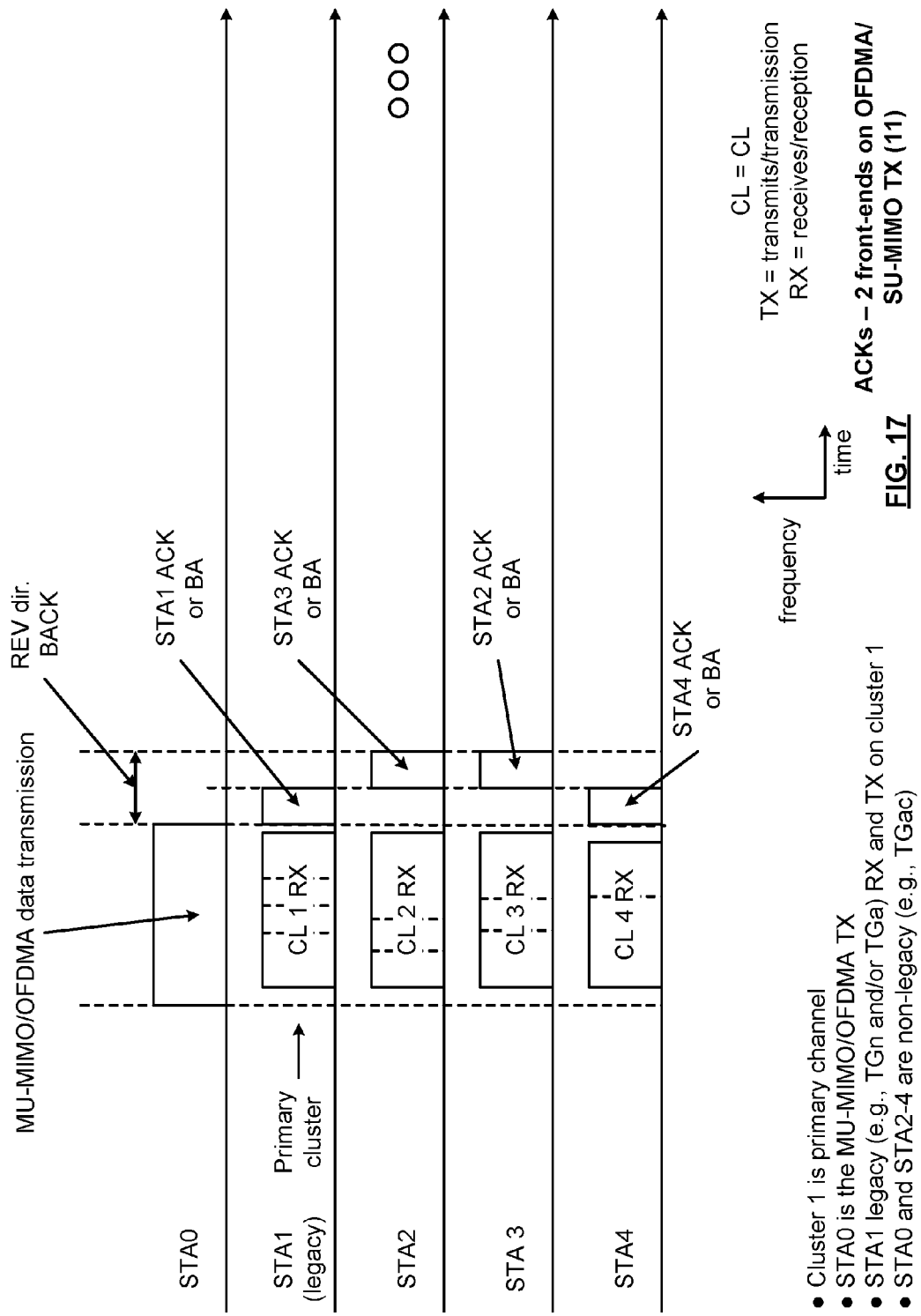
FIG. 17 is a diagram illustrating an embodiment of acknowledgements (ACKs) being provided to a transmitting wireless communication device (e.g., an access point (AP)), having at least two (2) front ends, and being operable in accordance with orthogonal frequency division multiple access (OFDMA)/single-user multiple input multiple output (SU-MIMO).

FIG. 17 is a diagram illustrating an embodiment of acknowledgements (ACKs) being provided to a transmitting wireless communication device (e.g., an access point (AP)), having at least two (2) front ends, and being operable in accordance with orthogonal frequency division multiple access (OFDMA)/single-user multiple input multiple output (SU-MIMO). The transmitting wireless communication device of FIG. 16 may be operative with as few as two (2) front ends.

Referring to FIG. 17, this diagram is somewhat similar to the previous embodiment with at least one difference being that the ACKs or block ACKs are sent back to the transmitting wireless communication device (STA0) from the STA1 and STA4 on clusters 1 and 4 simultaneously, followed by the ACKs or block ACKs are sent back to the transmitting wireless communication device (STA0) from the STA2 and STA3 on clusters 2 and 3 simultaneously. Also, as can be seen, because the transmitting wireless communication device (STA0) includes two separate radio front-ends, it can receive two signals simultaneously (e.g., from STA1 and STA4 at one time, and from STA2 and STA3 at another time).

Figure 18:
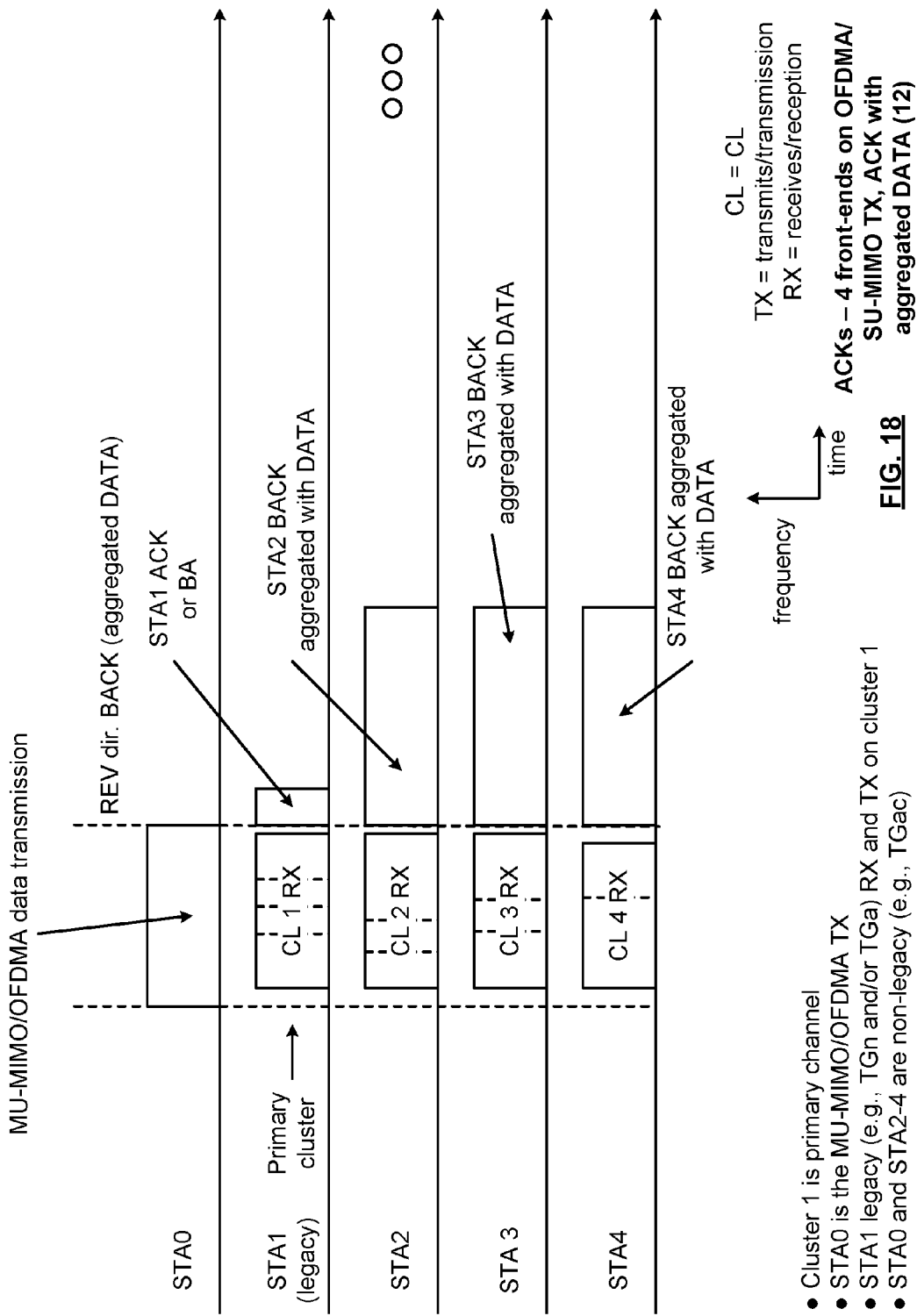
FIG. 18 is a diagram illustrating an embodiment of ACKs (some of which being aggregated with data) being provided to a transmitting wireless communication device (e.g., an AP), having four (4) front ends, and being operable in accordance with OFDMA/SU-MIMO.

FIG. 18 is a diagram illustrating an embodiment of ACKs (some of which being aggregated with data) being provided to a transmitting wireless communication device (e.g., an AP), having four (4) front ends, and being operable in accordance with OFDMA/SU-MIMO. This diagram is somewhat similar to the previous embodiment with at least one difference being that data is aggregated with the ACK or block ACKs that are sent back to the transmitting wireless communication device (STA0). Also, in this embodiment, the transmitting wireless communication device (STA0) includes four separate radio front-ends, so it can receive four signals simultaneously (e.g., from STA1, STA2, STA3, and STA4 at the same time).

Figure 19:
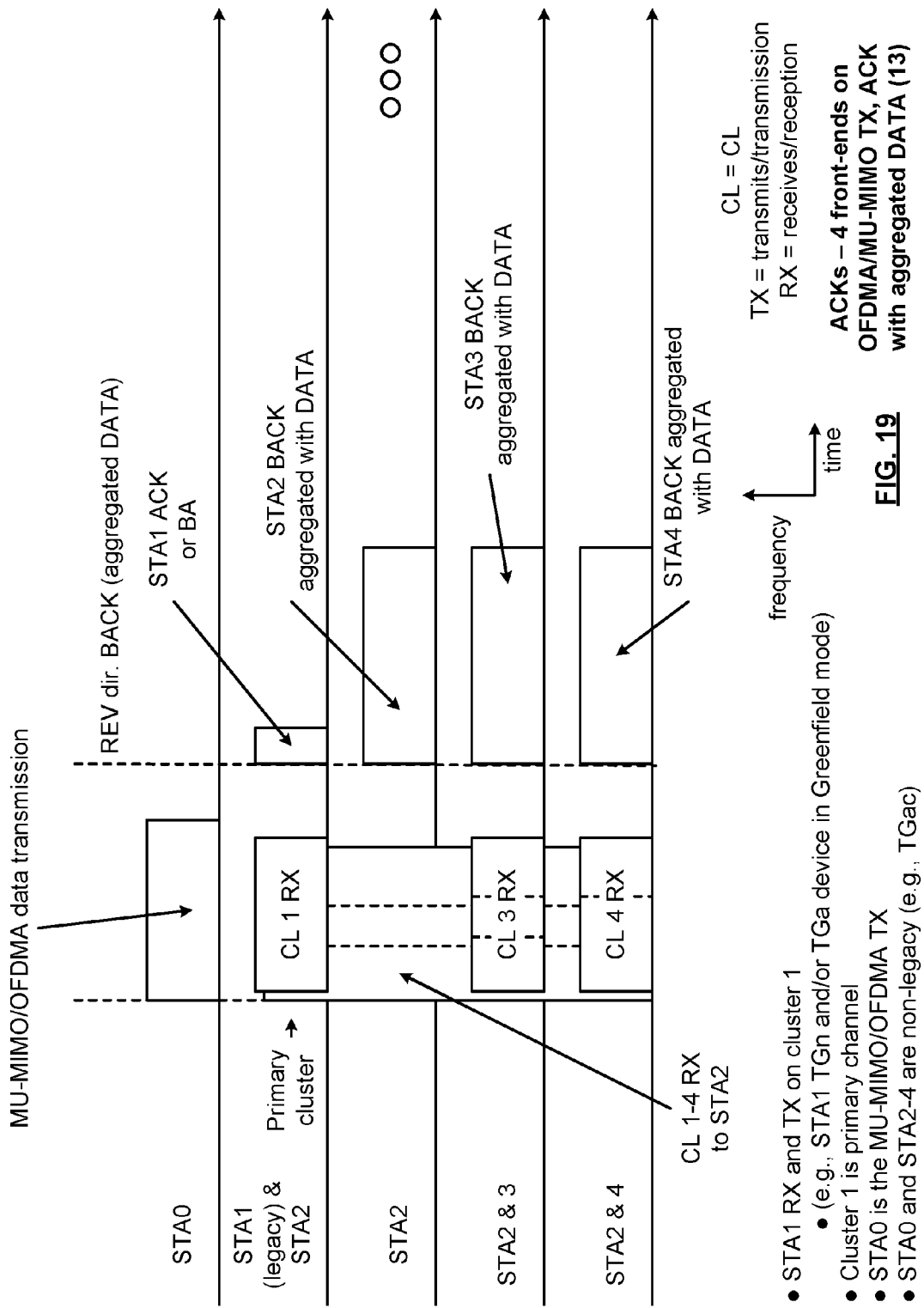
FIG. 19 is a diagram illustrating an embodiment of ACKs (some of which being aggregated with data) being provided to a transmitting wireless communication device (e.g., an AP), having four (4) front ends, and being operable in accordance with OFDMA/multi-user multiple input multiple output (MU-MIMO).

FIG. 19 is a diagram illustrating an embodiment of ACKs (some of which being aggregated with data) being provided to a transmitting wireless communication device (e.g., an AP), having four (4) front ends, and being operable in accordance with OFDMA/multi-user multiple input multiple output (MU-MIMO). This diagram is somewhat similar to the previous embodiment (e.g., data is aggregated with the ACK or block ACKs that are sent back to the transmitting wireless communication device (STA0), and the transmitting wireless communication device (STA0) includes four separate radio front-ends, so it can receive four signals simultaneously). At least some differences in this embodiment are that the STA1 is a legacy, TGn and/or TGa wireless communication device operating in Greenfield mode, and the STA2 receives on clusters 1-4, and transmits on cluster 2. The STA3 receives and transmits on the cluster 3, and STA4 receives and transmits on the cluster 4.

As described above, the use of clear to send to self (CTS2SELF) may be employed in accordance with and performing various functions (e.g., taking certain wireless communication devices off of the air such as in accordance with cluster reservation mechanisms, adjusting the network allocation vector (NAV) for the receiving wireless communication devices of a particular capability (e.g., legacy, TGn and/or TGa) during MU-MIMO and/or OFDMA transmissions and the corresponding subsequent responses, etc.). In some of the following diagrams, CTS2SELF may be employed to provide more explicit direction in dealing with those wireless communication devices not operating in accordance with MU-MIMO and/or OFDMA (e.g., legacy, TGn and/or TGa) in a mixed mode environment. From certain perspectives, the use of CTS2SELF particularly has a format that may be understood by those wireless communication devices (e.g., legacy, TGn and/or TGa).

FIG. 20, FIG. 21, FIG. 22, FIG. 23, FIG. 24, and FIG. 25 are diagrams illustrating embodiments of a transmitting wireless communication device using clear to send to self (CTS2 SELF) for adjusting the network allocation vector (NAV) for various wireless communication devices corresponding to various capabilities, and in some instances, when one or more clusters are busy at certain times.

Figure 20:
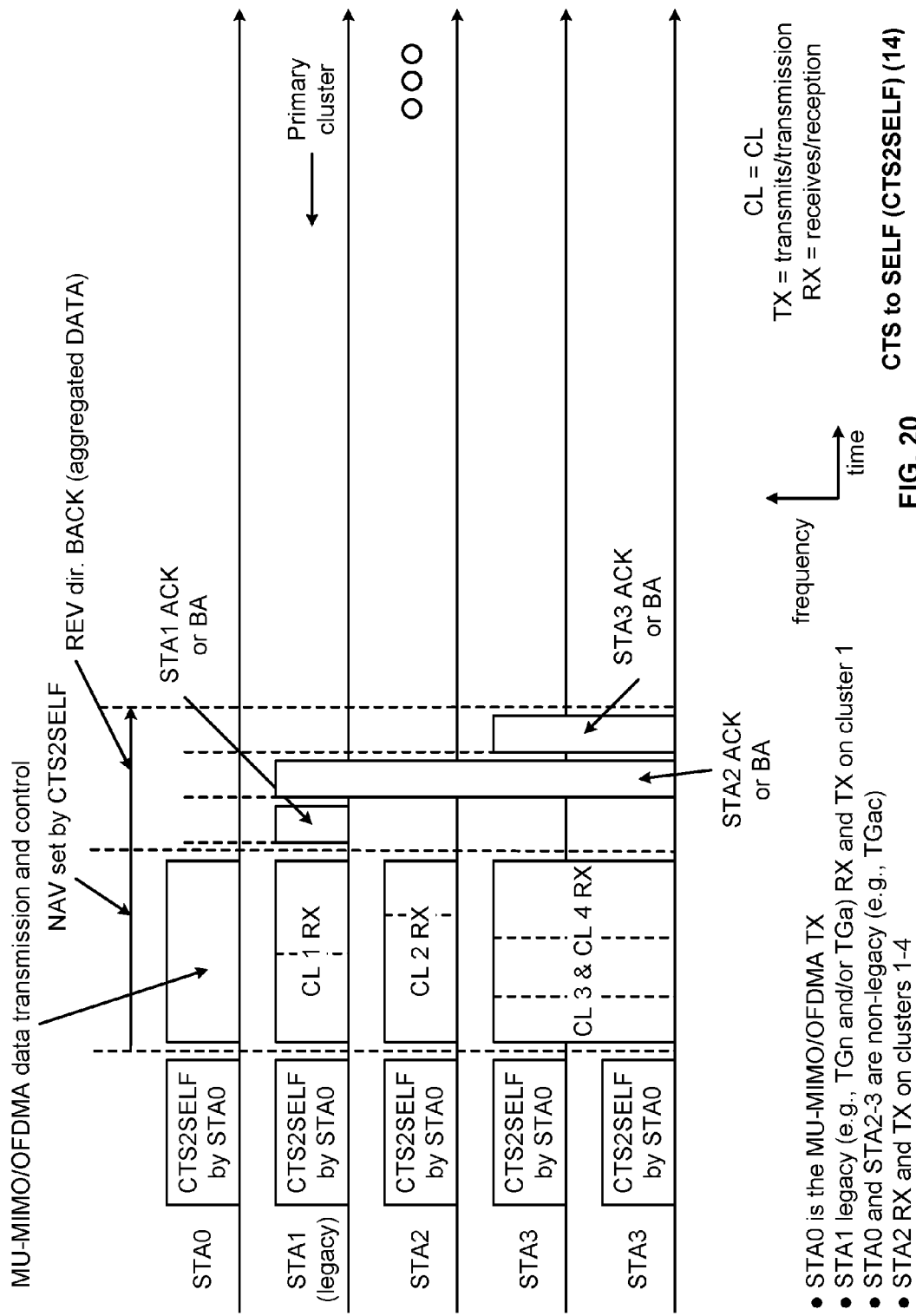
FIG. 20, FIG. 21, FIG. 22, FIG. 23, FIG. 24, and FIG. 25 are diagrams illustrating embodiments of a transmitting wireless communication device using clear to send to self (CTS2SELF) for adjusting the network allocation vector (NAV) for various wireless communication devices corresponding to various capabilities, and in some instances, when one or more clusters are busy at certain times.

Referring to FIG. 20, in this diagram, the STA0 (e.g., a MU-MIMO/OFDMA transmitter) performs the CTS2SELF on all clusters before transmitting a MU-MIMO/OFDMA data transmission and control signal. The STA1 (e.g., legacy, TGn and/or TGa) wireless communication device operates on the primary cluster; STA1 receives and transmits on the primary cluster, cluster 1. The STA2 receives on cluster 2, and transmits on the clusters 1-4. The STA3 and the STA4 transmits and receives on the clusters 3-4. Also, the STA0 and the STA2, STA3, and STA4 all have capability to operate in accordance with newer protocols, standards, and recommended practices (e.g., TGac).

Figure 21:
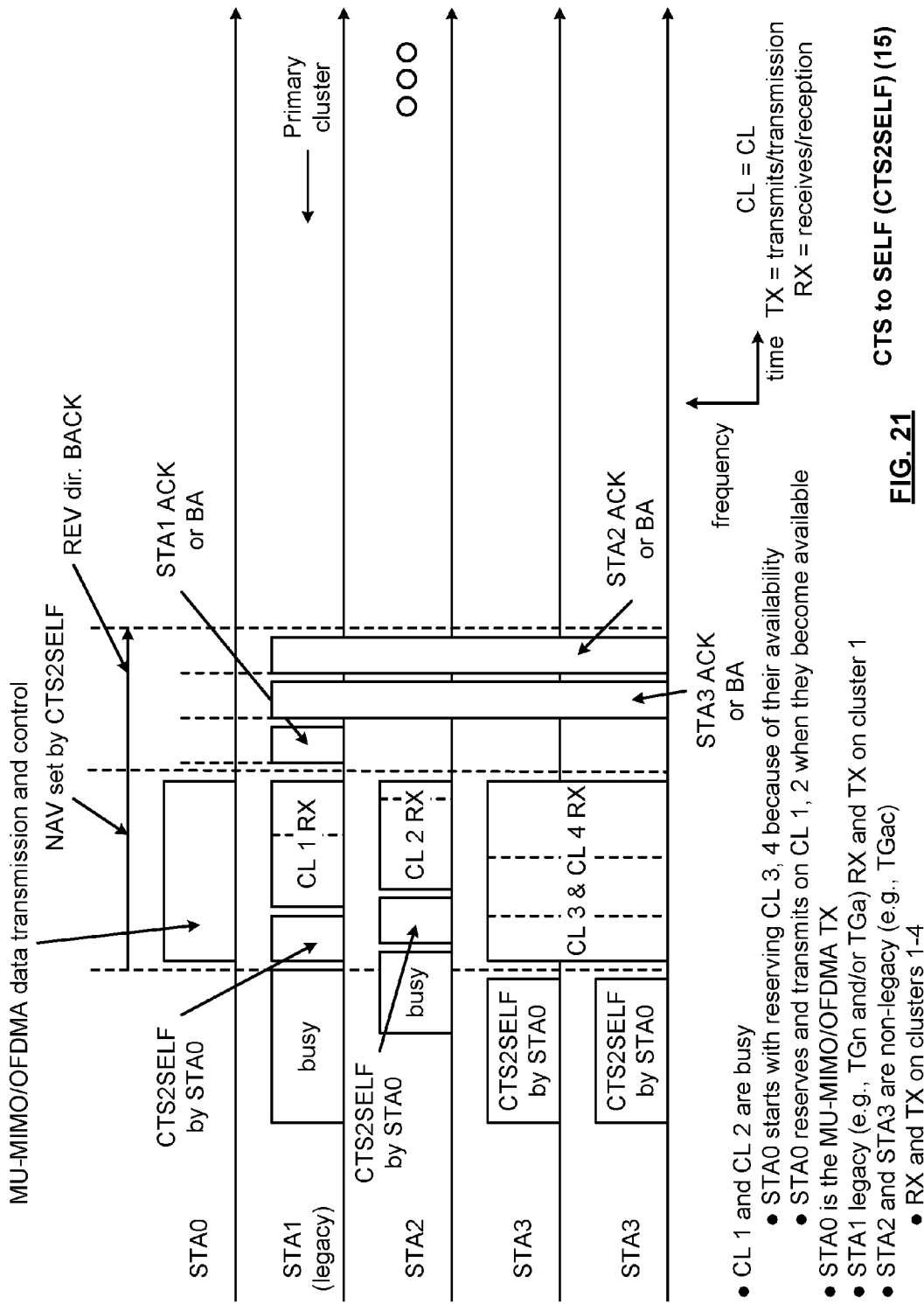

Referring to FIG. 21, this diagram is somewhat similar to the previous embodiment with at least one difference being that certain of the clusters are busy (not idle) and cannot be immediately used. In the diagram, the clusters 1 and 2 are busy, so the STA0 (i.e., the transmitting wireless communication device, which is a MU-MIMO/OFDMA transmitter or AP) begins reserving the clusters 3 and 4 because they are available. When clusters 1 and 2 then become available, the STA0 reserves and transmits using those clusters. Such operation may generally be described as successive cluster reservation and use. STA3 is able to receive on clusters 3-4, and STA3 transmits on clusters 1-4. STA1 receives and transmits on cluster 1. The STA2 receives on cluster 2 and transmits on clusters 1-4.

Figure 22:
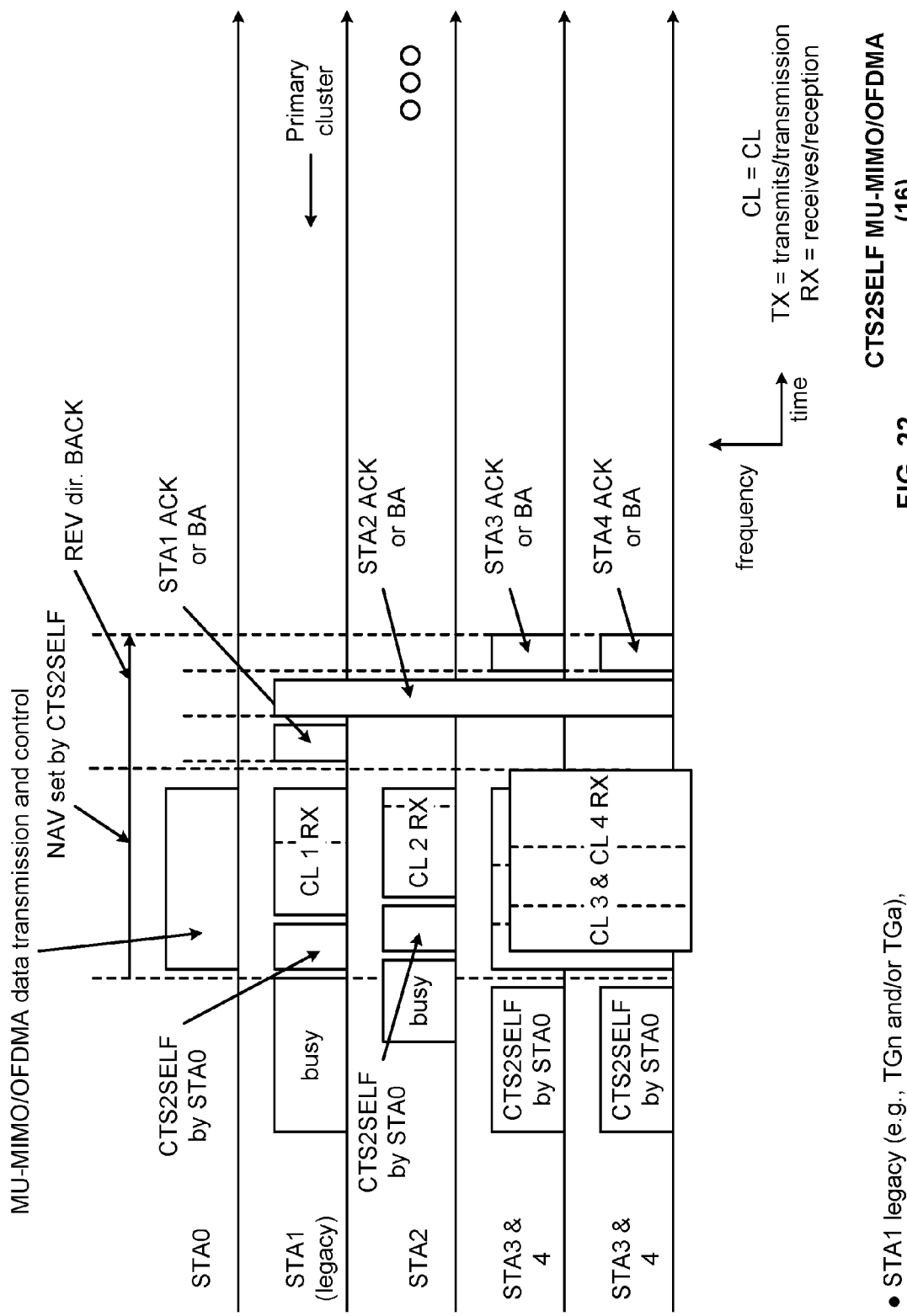

Referring to FIG. 22, this diagram is somewhat similar to the previous embodiment. At least one difference in this embodiment is that the STA3 and STA4 are able to receive on clusters 3-4; the STA3 transmits on cluster 3, and STA4 transmits on cluster 4. The STA2 receives on cluster 2 and transmits on clusters 1-4.

Figure 23:
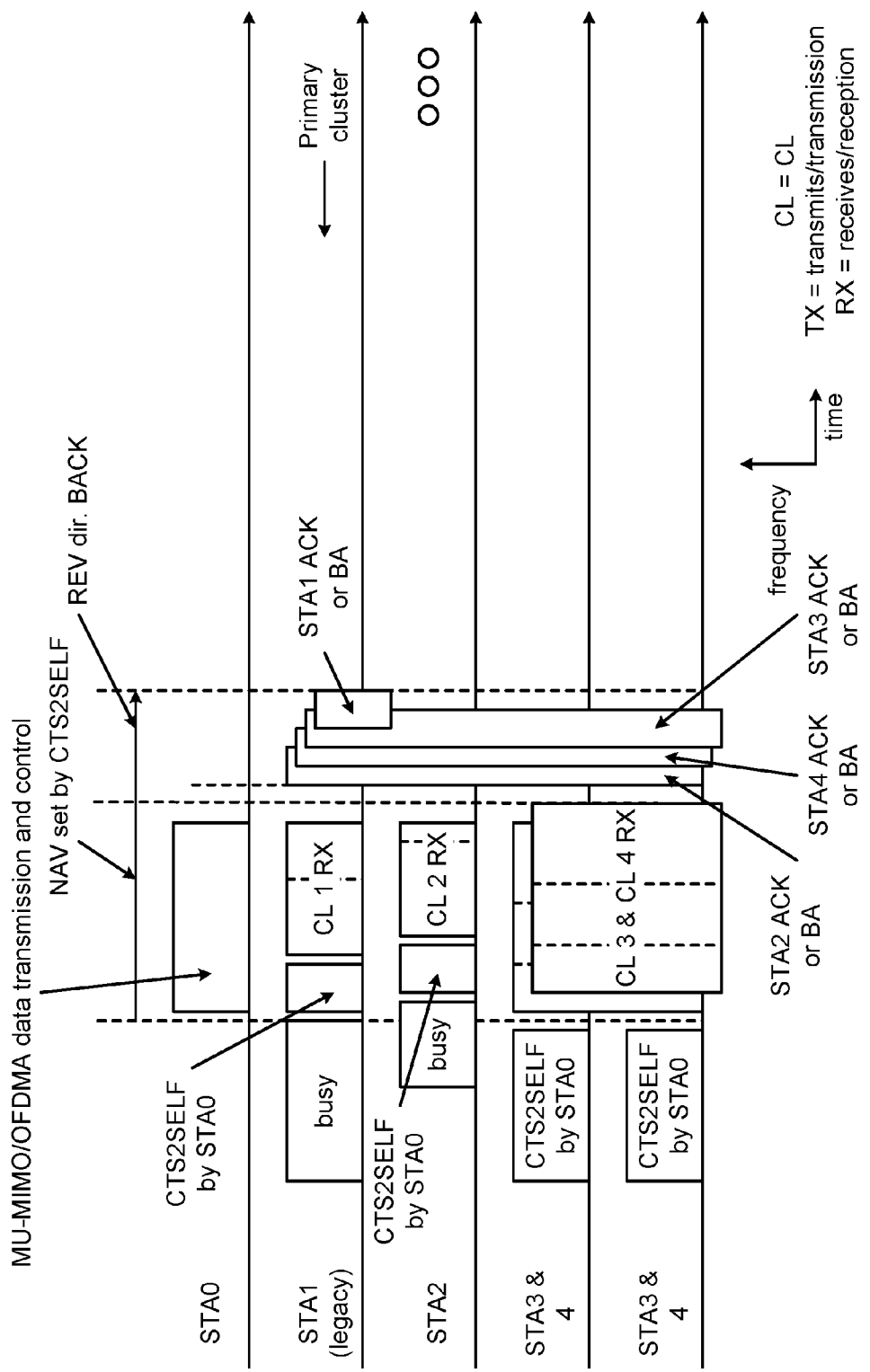

Referring to FIG. 23, this diagram is somewhat similar to the previous embodiment with at least one difference being that the transmitting wireless communication device, STA0 (e.g., a MU-MIMO/OFDMA transmitter), has multi-user receive capability, in that, it can simultaneously receive transmissions on clusters 1-4, and particularly from STA1, STA2, STA3, and STA4.

Figure 24:
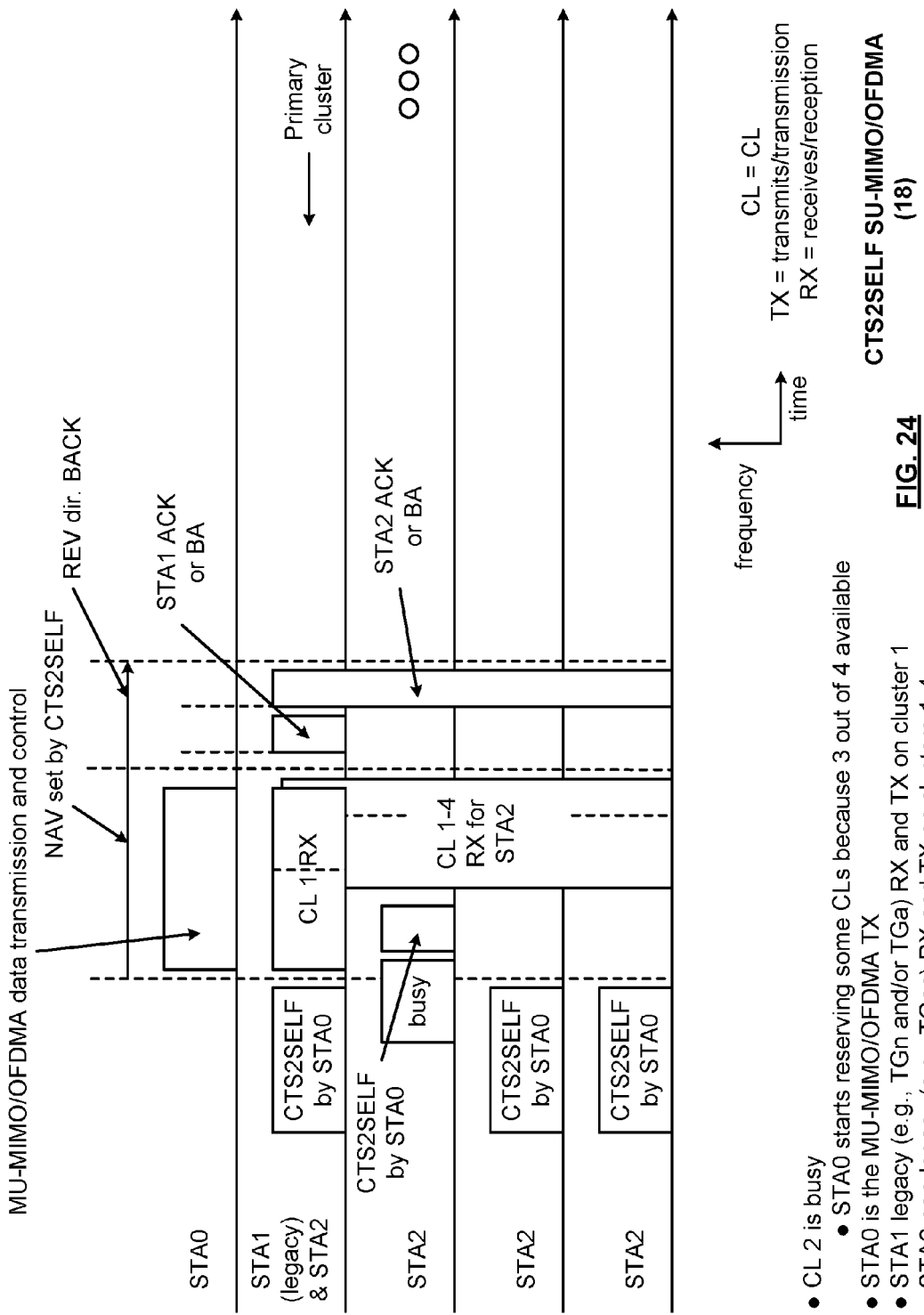

Referring to FIG. 24, this diagram shows an embodiment that allows the use of clusters 1-4 together. For example, cluster 3 and 4 need to wait for a period of time after the cluster reservations is made because of the unavailability of cluster 2 (being busy) using a CTS2SELF by STA0 on that cluster. By the CTS2SELF by STA0 on cluster 2, the cluster 2 is then unavailable for a period of time as set by the CTS2SELF, and the CTS2SELF reserves the clusters 3 and 4 until a period of time at which it is expected that cluster 2 is available.

Figure 25:
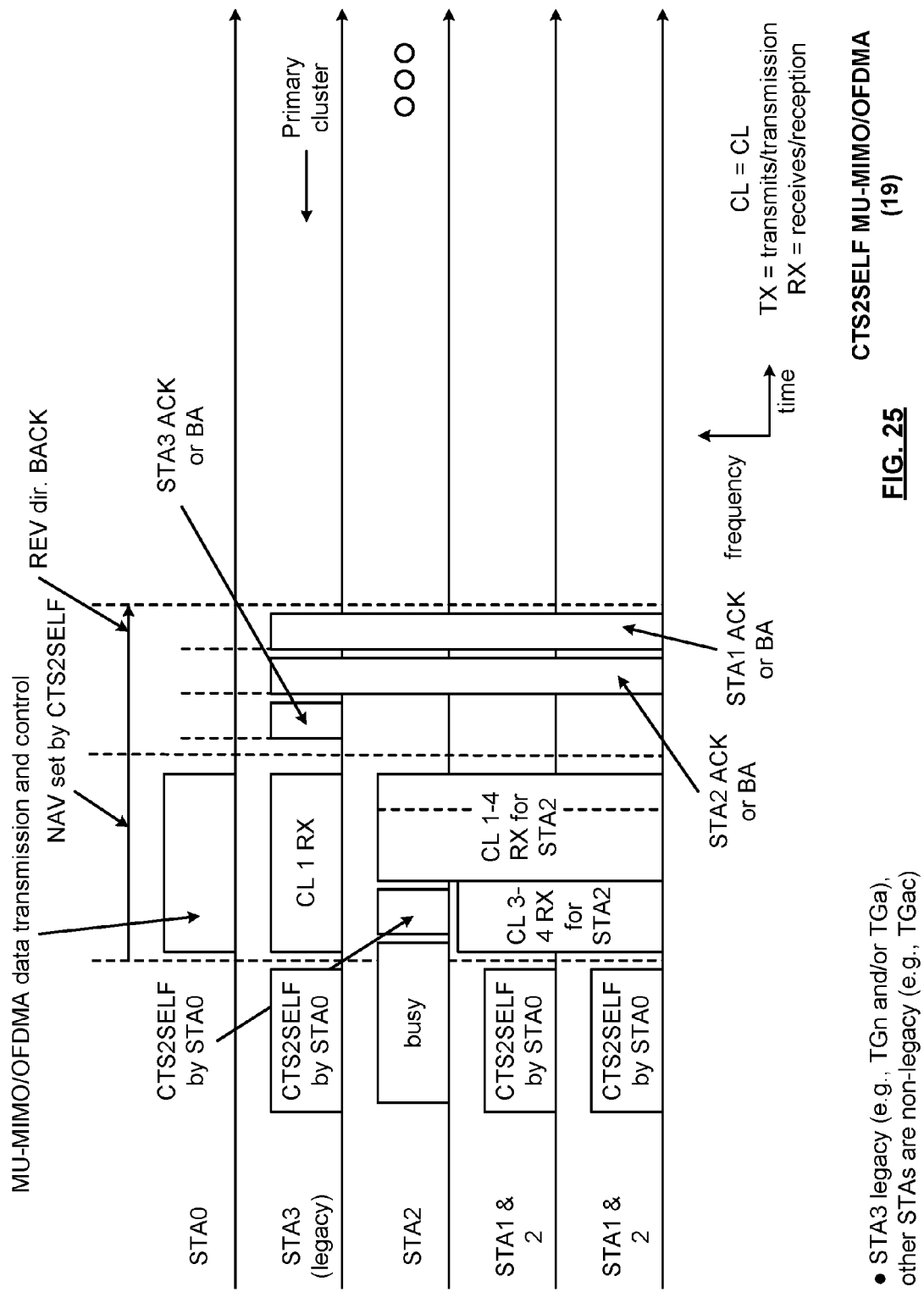

Referring to FIG. 25, this diagram is somewhat similar to the previous embodiment with at least one difference being that clusters 3 and 4 are in fact employed during the time period of which the cluster 2 is reserved by the CTS2SELF on cluster 2. For example, rather than not employ the available bandwidth of the clusters 3 and 4 during that time, they are employed for reception by STA2 during and up until the reservation of cluster 2 is completed.

Figure 26:
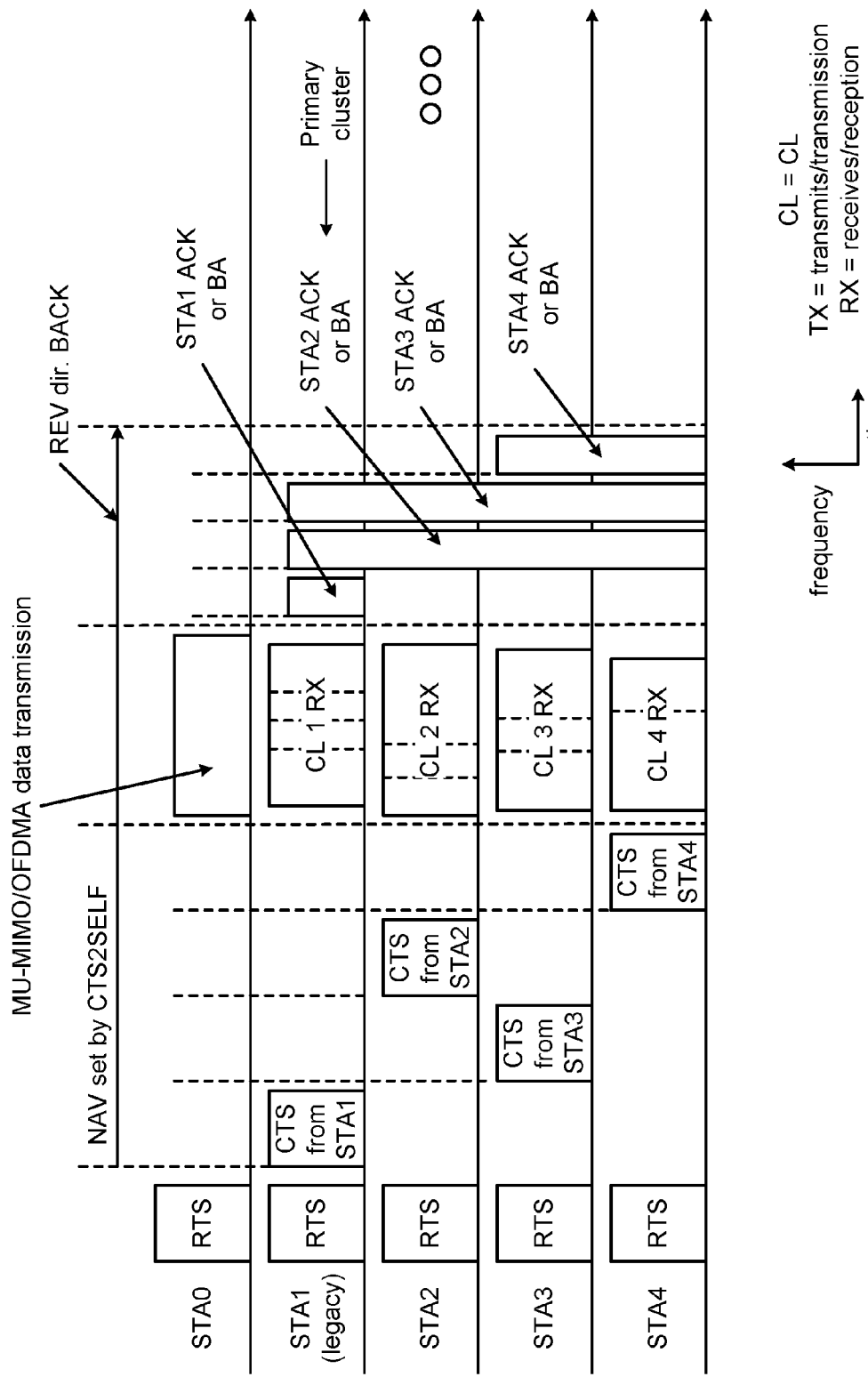
FIG. 26, FIG. 27, and FIG. 28 are diagrams illustrating embodiments of request to send (RTS) and clear to send (CTS) exchanges between a transmitting wireless communication device (e.g., an AP), being operable in accordance with OFDMA/SU-MIMO, and various wireless communication devices corresponding to various capabilities.
Figure 27:
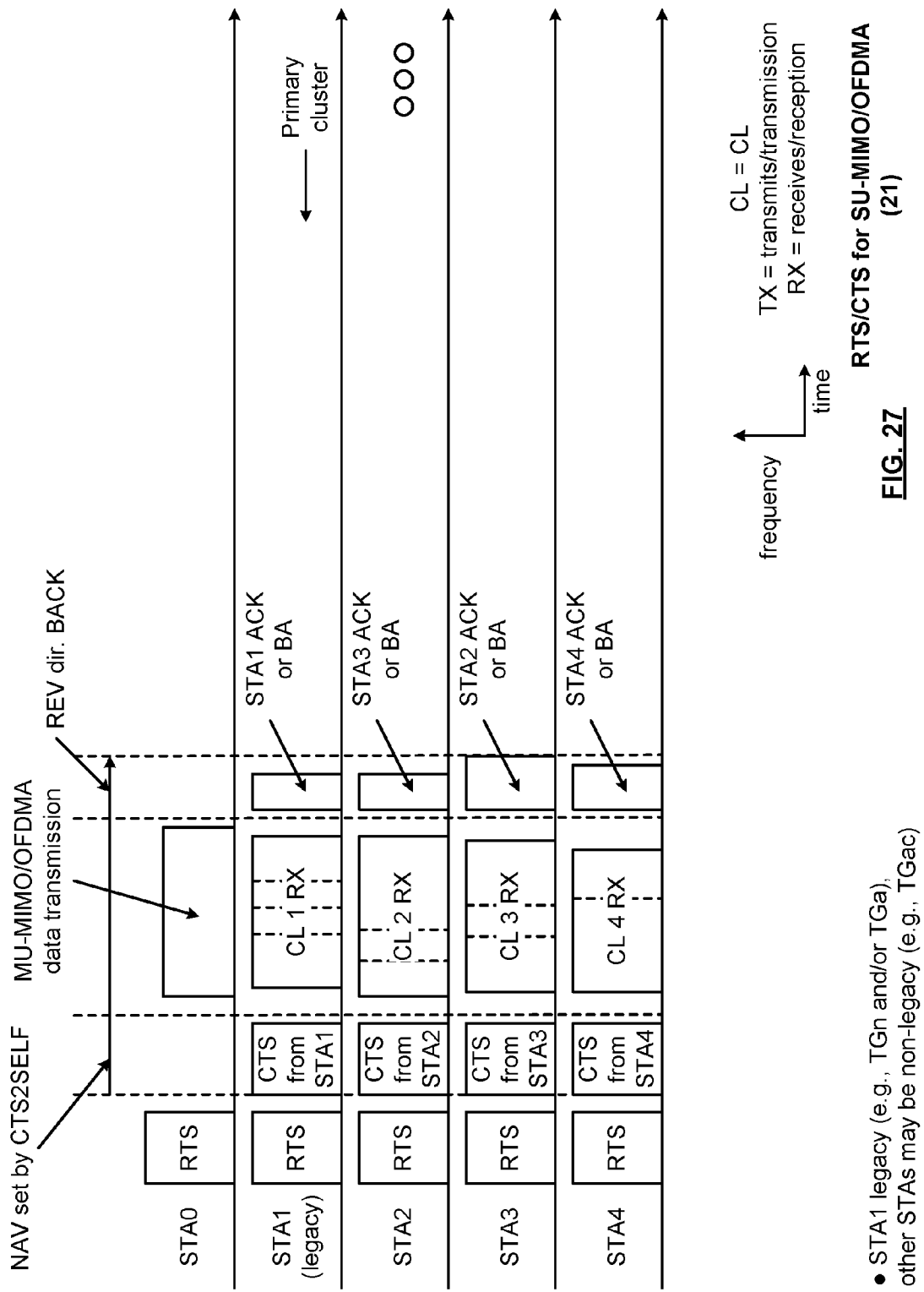
Figure 28:
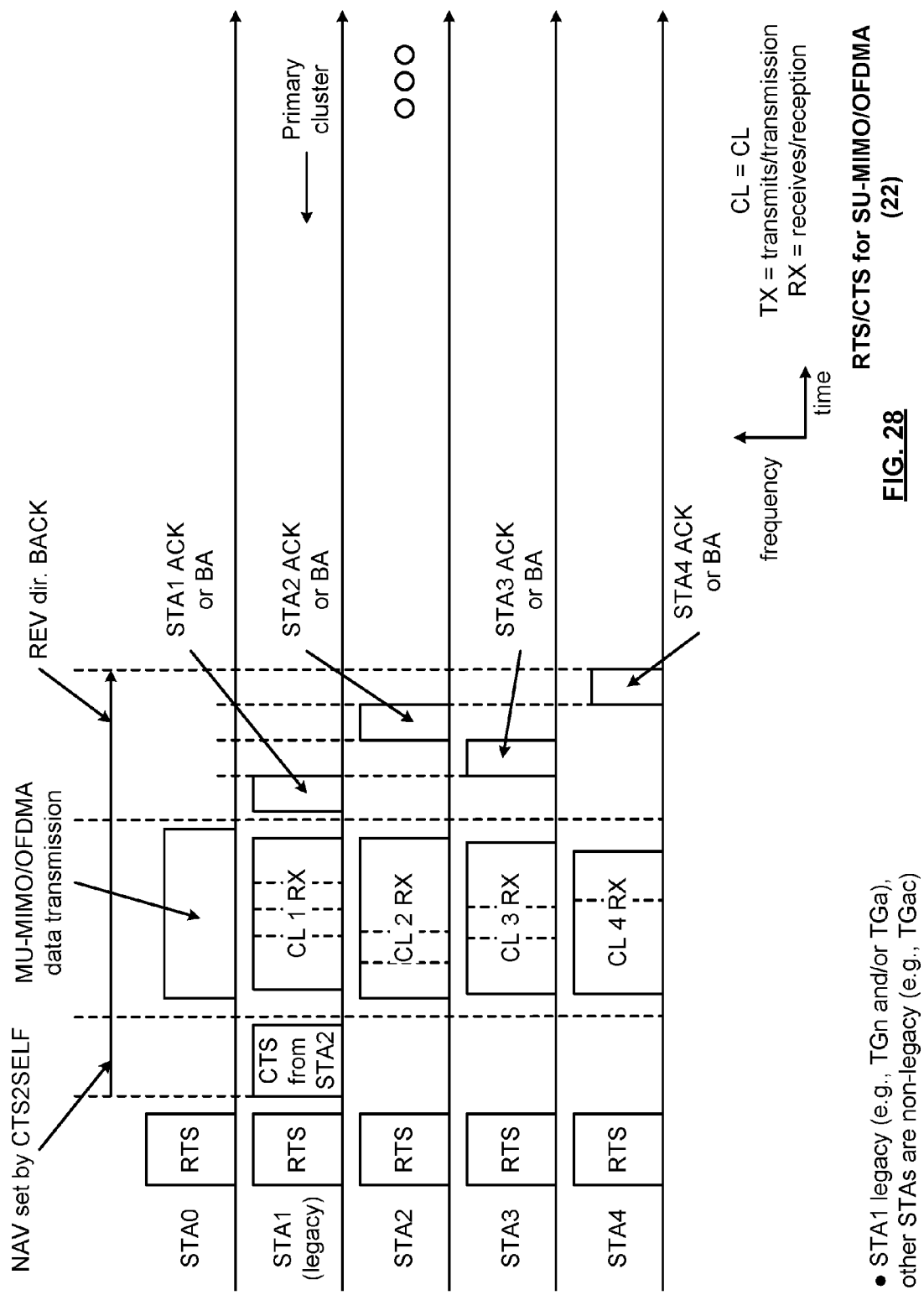

FIG. 26, FIG. 27, and FIG. 28 are diagrams illustrating embodiments of request to send (RTS) and clear to send (CTS) exchanges between a transmitting wireless communication device (e.g., an AP), being operable in accordance with OFDMA/SU-MIMO, and various wireless communication devices corresponding to various capabilities.

Referring to FIG. 26, this diagram shows an RTS being provided to all STA1, STA2, STA3, and STA4 on all clusters 1-4. Each of the STAs1-4 respectively transmit a CTS on a respective cluster (e.g., STA1 on cluster 1, STA3 on cluster 3, STA2 on cluster 2, and STA4 on cluster 4). After completion of the RTS/CTS exchanges, a MU-MIMO/OFDMA data transmission is sent from the transmitting wireless communication device, STA0 (e.g., a MU-MIMO/OFDMA transmitter) to the various STAs1-4. STA1 receives on cluster 1 and transmits on cluster 1. STA1 receives on cluster 1 and transmits on cluster 1. STA2 receives on cluster 2 and transmits on clusters 1-4. STA3 receives on cluster 3 and transmits on clusters 1-4. STA4 receives on cluster 4 and transmits on clusters 3-4.

Referring to FIG. 27, this diagram is somewhat similar to the previous embodiment with at least one difference being that the CTSs from the various STAs 1-4 are provided simultaneously to the transmitting wireless communication device, STA0 (e.g., a MU-MIMO/OFDMA transmitter) on the clusters 1-4, respectively. After completion of the RTS/CTS exchanges, a MU-MIMO/OFDMA data transmission is sent from the transmitting wireless communication device, STA0 (e.g., a MU-MIMO/OFDMA transmitter) to the various STAs1-4. Also, there are other differences between this embodiment and the previous embodiment. STA1 receives on cluster 1 and transmits on cluster 1. STA1 receives on cluster 1 and transmits on cluster 1. STA2 receives on cluster 2 and transmits on cluster 3. STA3 receives on cluster 3 and transmits on cluster 2. STA4 receives on cluster 4 and transmits on cluster 4.

Referring to FIG. 28, this diagram also shows an RTS being provided to all STA1, STA2, STA3, and STA4 on all clusters 1-4. In this diagram, STA2 is selected as being the one that sends the CTS back to the transmitting wireless communication device, STA0 (e.g., a MU-MIMO/OFDMA transmitter) on the cluster 1. After completion of the RTS/CTS exchanges, a MU-MIMO/OFDMA data transmission is sent from the transmitting wireless communication device, STA0 (e.g., a MU-MIMO/OFDMA transmitter) to the various STAs1-4. Each of the STAs1-4 respectively transmit an ACK or BACK on a respective cluster (e.g., STA1 on cluster 1, STA3 on cluster 3, STA2 on cluster 2, and STA4 on cluster 4).

Figure 29:
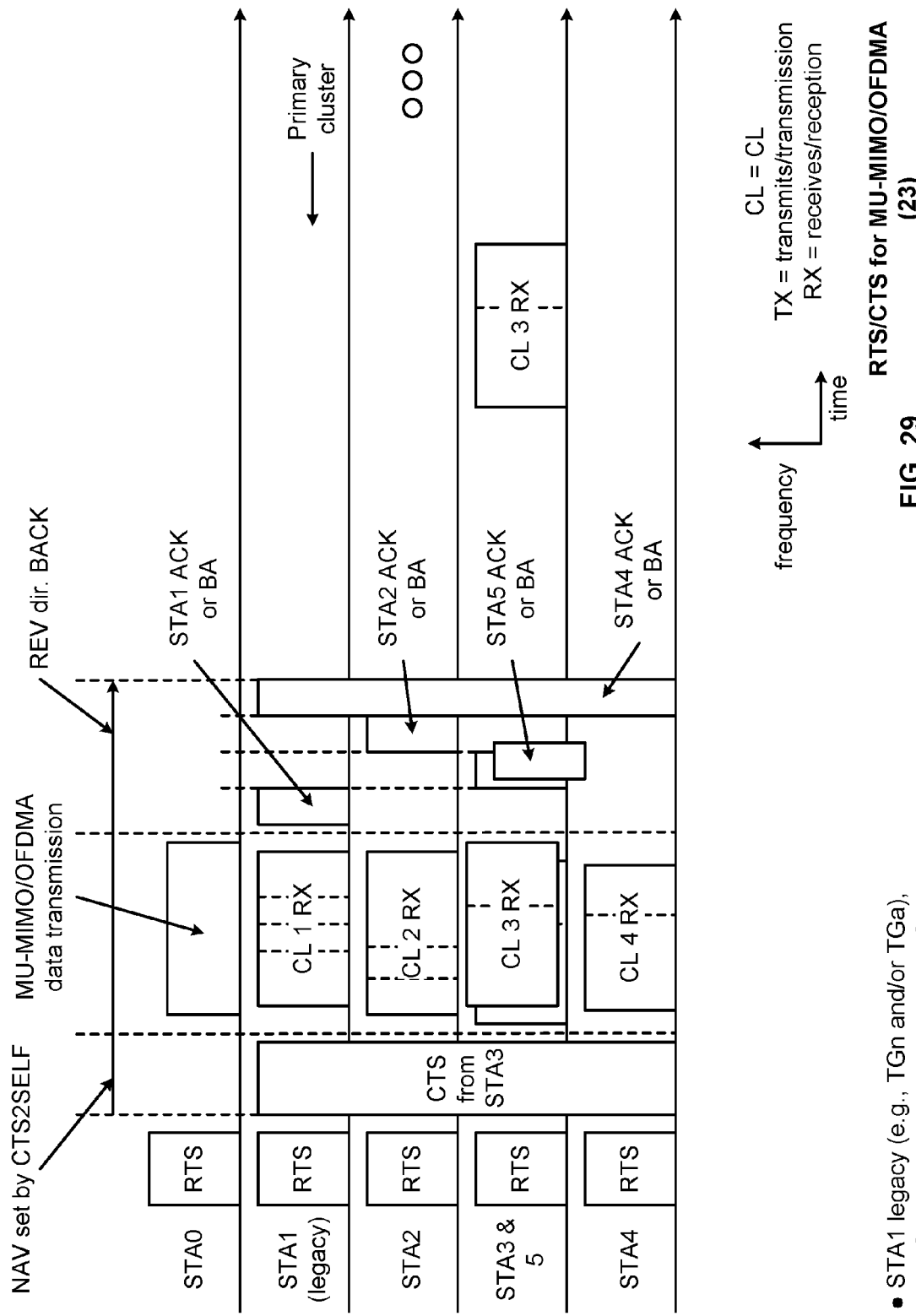
FIG. 29 is a diagram illustrating an embodiment of RTS/CTS exchanges between a transmitting wireless communication device (e.g., an AP), being operable in accordance with OFDMA/MU-MIMO, and various wireless communication devices corresponding to various capabilities.

FIG. 29 is a diagram illustrating an embodiment of RTS/CTS exchanges between a transmitting wireless communication device (e.g., an AP), being operable in accordance with OFDMA/MU-MIMO, and various wireless communication devices corresponding to various capabilities. This diagram also shows an RTS being provided to all STA1, STA2, STA3, STA4, and STA5 on all clusters 1-4. In this diagram, STA3 is selected as being the one that sends the CTS back to the transmitting wireless communication device, STA0 (e.g., a MU-MIMO/OFDMA transmitter) on the clusters 1-4. After completion of the RTS/CTS exchanges, a MU-MIMO/OFDMA data transmission is sent from the transmitting wireless communication device, STA0 (e.g., a MU-MIMO/OFDMA transmitter) to the various STAs1-5; STA3 and STA5 both receive on cluster 3 (e.g., with MU-MIMO separation). STA1 receives and transmits on cluster 1. STA3 and STA5 both receive and transmit on cluster 3. STA2 receives and transmits on cluster 2. STA4 receives on cluster 4 and transmits on clusters 1-4.

Figure 30:
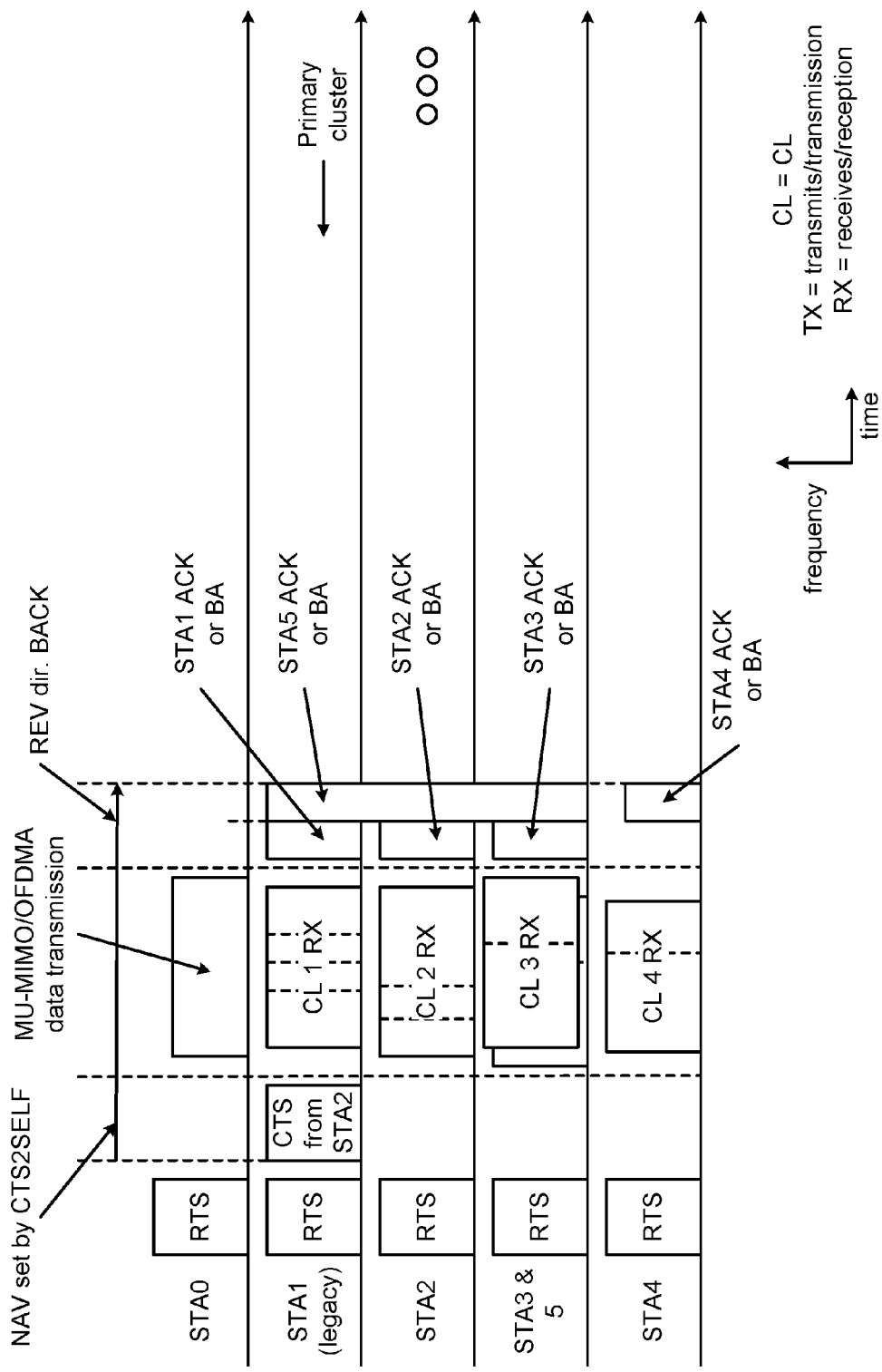
FIG. 30 is a diagram illustrating an embodiment of RTS/CTS exchanges between a transmitting wireless communication device (e.g., an AP), being operable in accordance with OFDMA/MU-MIMO and including 3 parallel front ends, and various wireless communication devices corresponding to various capabilities.

FIG. 30 is a diagram illustrating an embodiment of RTS/CTS exchanges between a transmitting wireless communication device (e.g., an AP), being operable in accordance with OFDMA/MU-MIMO and including 3 parallel front ends, and various wireless communication devices corresponding to various capabilities.

This diagram also shows an RTS being provided to all STA1, STA2, STA3, STA4, and STA5 on all clusters 1-4. In this diagram, STA2 is selected as being the one that sends the CTS back to the transmitting wireless communication device, STA0 (e.g., a MU-MIMO/OFDMA transmitter) on the cluster 1. After completion of the RTS/CTS exchanges, a MU-MIMO/OFDMA data transmission is sent from the transmitting wireless communication device, STA0 (e.g., a MU-MIMO/OFDMA transmitter) to the various STAs1-5; STA3 and STA5 both receive on cluster 3 (e.g., with MU-MIMO separation). STA1 receives and transmits on cluster 1. STA3 and STA5 both receive on cluster 3; STA3 transmits on cluster 3, and STA5 transmits on clusters 1-3.

STA2 receives and transmits on cluster 2. STA4 receives on cluster 4 and transmits on cluster 4.

As can be seen with respect to many of the embodiments presented herein that effectuate RTS/CTS exchanges between a transmitting wireless communication device (e.g., an AP), being operable in accordance with OFDMA/MU-MIMO, and various wireless communication devices, such RTS/CTS exchanges include cluster 1 (primary cluster) in a preferred embodiment to ensure that any wireless communication devices that operate in accordance with a first capability (e.g., legacy, TGn and/or TGa) as described herein will be able to detect such RTS/CTS exchanges. When such wireless communication devices can detect such RTS/CTS exchanges, it may be ensured that such wireless communication devices can obey the NAV.

Figure 31:
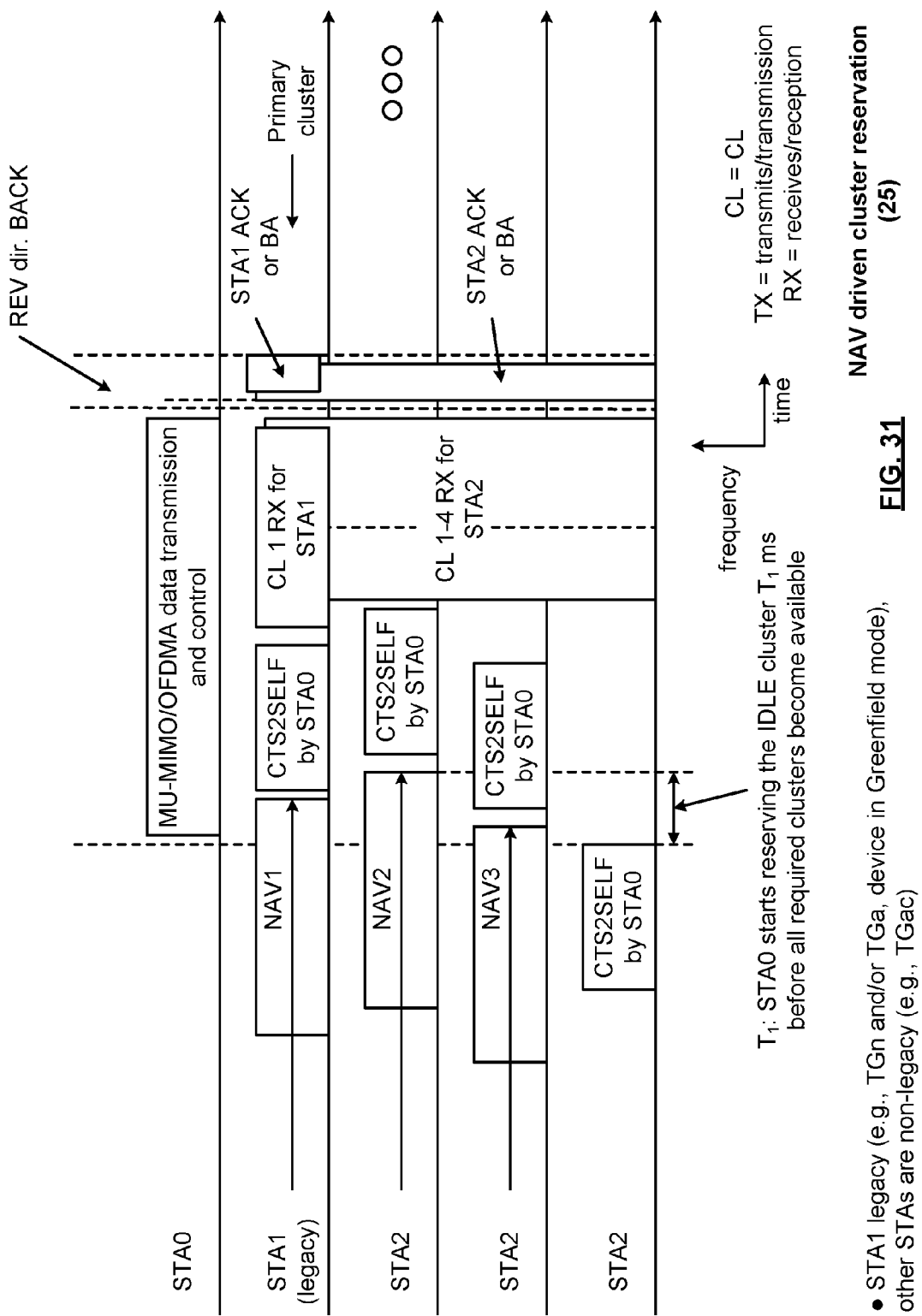
FIG. 31 is a diagram illustrating an embodiment of NAV driven cluster reservation.

FIG. 31 is a diagram illustrating an embodiment of NAV driven cluster reservation. As can be seen in this diagram, respective NAVs are set on each of clusters 1, 2, and 3 (e.g., by STA0, the transmitting wireless communication device). The NAV is not set on cluster 4, and as such, the transmitting wireless communication device, STA0 (e.g., a MU-MIMO/OFDMA transmitter) is able to begin reserving the idle cluster 4 a period of time (e.g., $T_1$) before all of the required clusters become available. STA1 is a legacy, for example, TGn and/or TGa wireless communication device operating in Greenfield mode, and the STA2 receives on clusters 1-4, and also transmits on cluster 2. STA1 receives and transmits on the cluster 1.

Various embodiments described below are variations of performing time division for medium access in accordance with aspects of case 3 as described elsewhere herein. Such a communication system can include wireless communication devices having each of a first capability and a second capability (and/or third capability, etc.). These wireless communication devices are granted medium access in accordance with any combination of the case 1 and case 2 described herein. For example, the air time or medium access may be divided into a mixed device interval and one or more other intervals operable respectively for only those wireless communication devices having a first capability (e.g., legacy, TGn and/or TGa) and for only those wireless communication devices having a second capability (e.g., TGac).

For example, a first interval may be for operation in accordance with mixed mode operation such that wireless communication devices having both a first capability (e.g., legacy, TGn and/or TGa) and a second capability (e.g., TGac) (and/or additional capabilities) may be concurrently operational. A second interval may be for operation in accordance with only those wireless communication devices having a first capability (e.g., legacy, TGn and/or TGa) or only those wireless communication devices having a second capability (e.g., TGac), and/or one other type of capability.

Alternatively, a first interval may be for operation in accordance with mixed mode operation such that wireless communication devices having both a first, second, and/or third, etc. capability (e.g., first capability: legacy, TGn and/or TGa; second capability: TGac, etc.) may be concurrently operational. A second interval may be for operation in accordance with only those wireless communication devices having the first capability (e.g., legacy, TGn and/or TGa), and a third interval may be for operation in accordance with only those wireless communication devices having the second capability (e.g., TGac).

Figure 32:
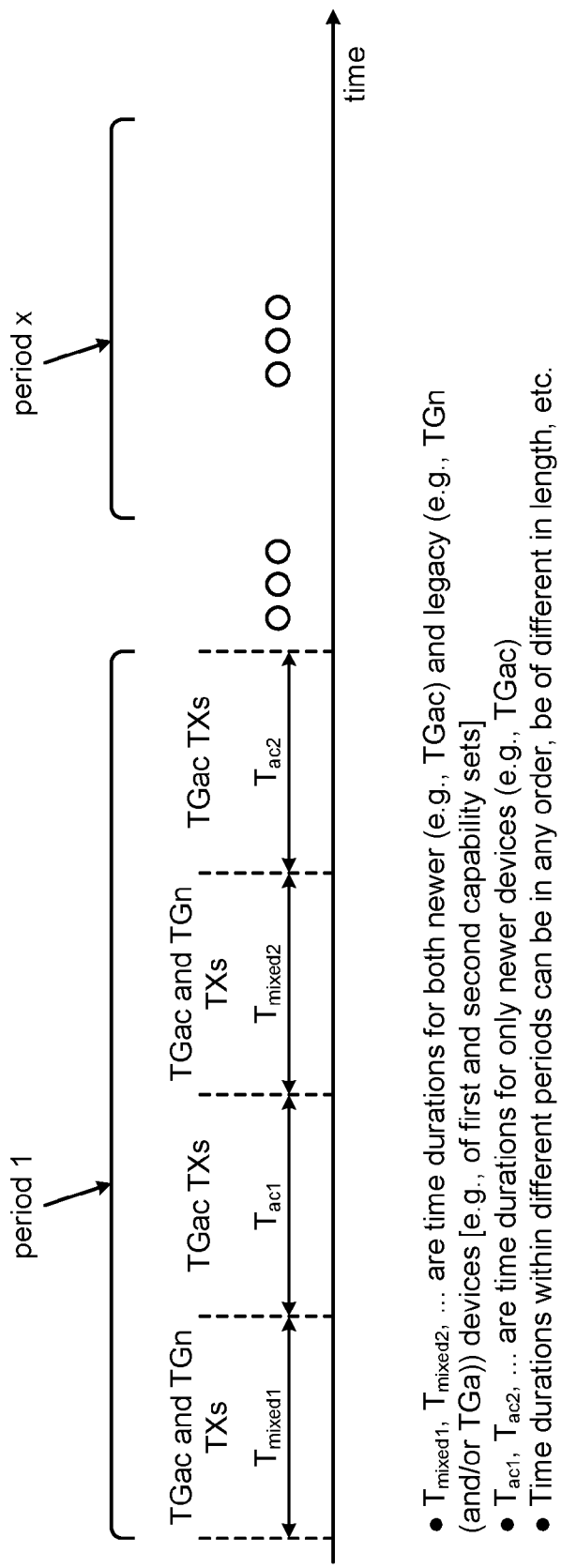
FIG. 32, FIG. 33, and FIG. 34 are diagrams illustrating embodiments of combination of time division of medium access for various wireless communication devices corresponding to various capabilities and including simultaneous supporting medium access to wireless communication devices of at least two different capabilities.
Figure 33:
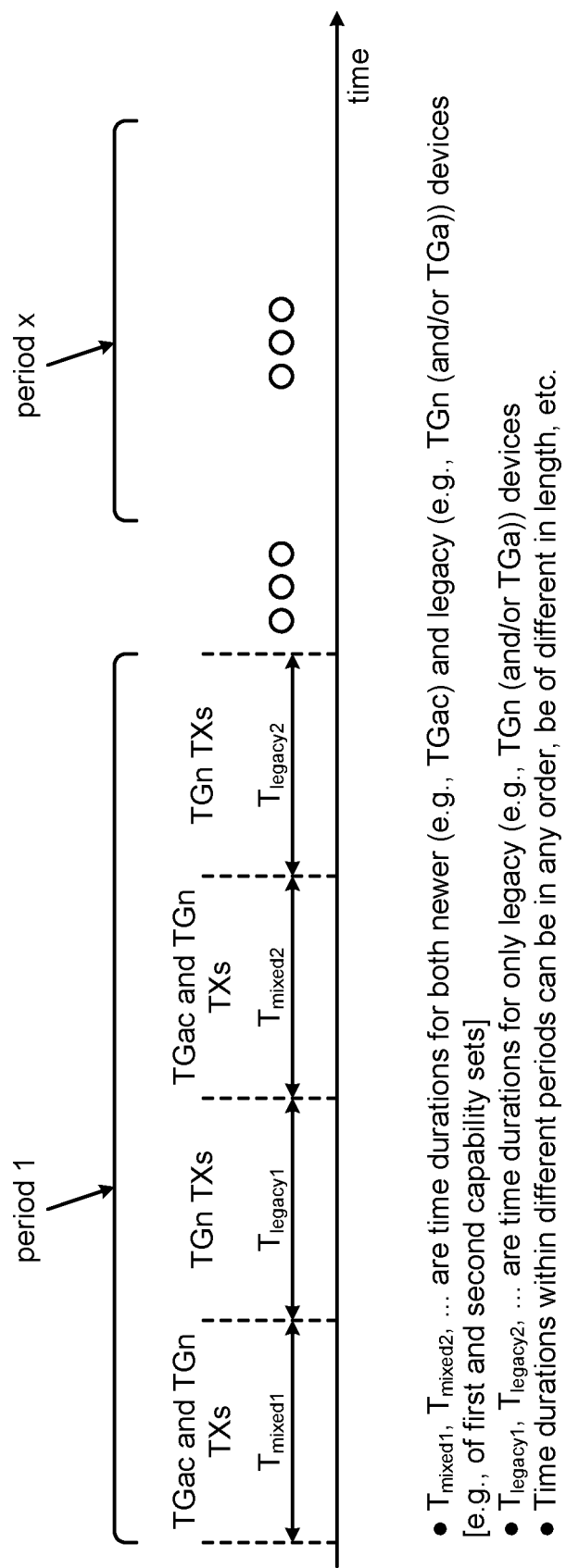
Figure 34:
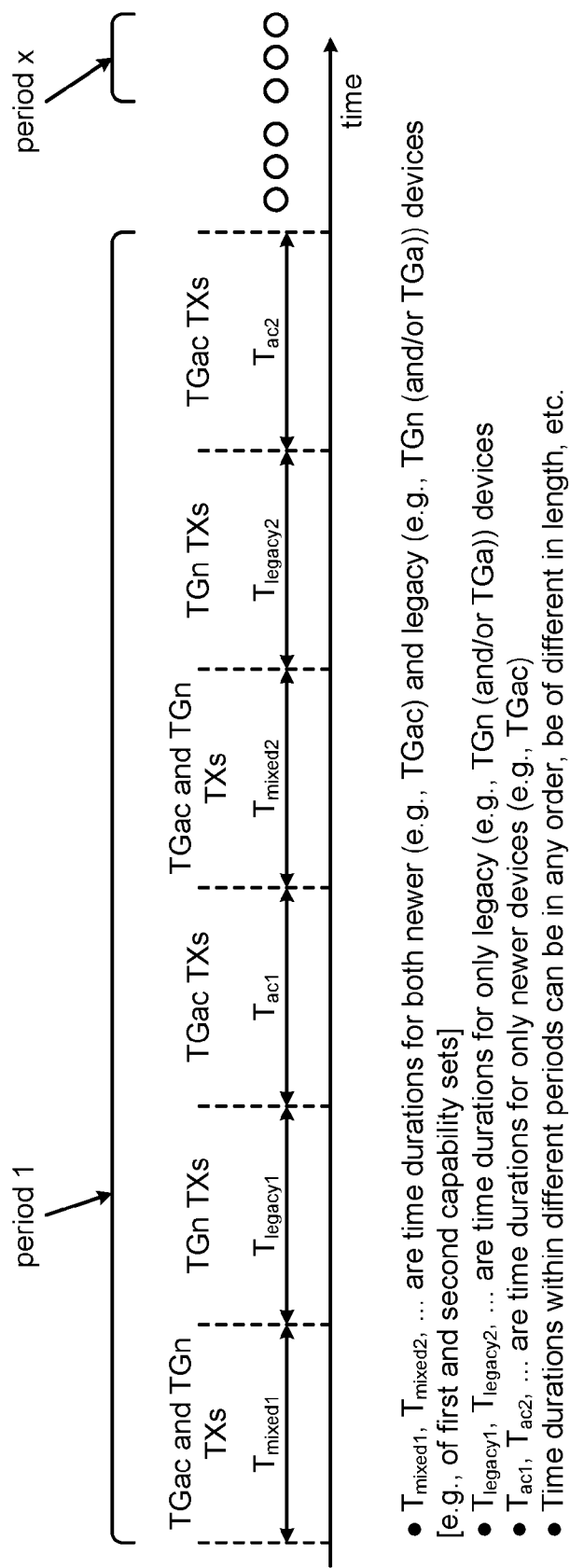

"FIG. 32, FIG. 33, and FIG. 34 are diagrams illustrating embodiments of combination of time division of medium access for various wireless communication devices corresponding to various capabilities and including simultaneous supporting medium access to wireless communication devices of at least two different capabilities. FIG. 32, FIG. 33, and FIG. 34 show different respective combinations (shown as Combination A, Combination B, and Combination C in the different respective diagrams) by which such communication medium access is provided to wireless communication devices of at least two different capabilities."

Referring to FIG. 32, in this diagram, $T_{mixed1}$ and $T_{mixed2}$ are the time intervals or durations for operating wireless communication devices that operate in accordance with both a first capability (e.g., legacy, TGn and/or TGa) and a second capability (e.g., TGac). The time intervals or durations $T_{ac1}$ and $T_{ac2}$ are for operating wireless communication devices that only operate in accordance with the second capability (e.g., TGac). It is of course noted that this embodiment is exemplary, and time duration or intervals within different periods can be in any order, of any desired length, etc.

Referring to FIG. 33, in this diagram, $T_{mixed1}$ and $T_{mixed2}$ are the time intervals or durations for operating wireless communication devices that operate in accordance with both a first capability (e.g., legacy, TGn and/or TGa) and a second capability (e.g., TGac). The time intervals or durations $T_{legacy1}$ and $T_{legacy2}$ are for operating wireless communication devices that only operate in accordance with the first capability (e.g., legacy, TGn and/or TGa). It is of course noted that this embodiment is exemplary, and time duration or intervals within different periods can be in any order, of any desired length, etc.

Referring to FIG. 34, in this diagram, $T_{mixed1}$ and $T_{mixed2}$ are the time intervals or durations for operating wireless communication devices that operate in accordance with both a first capability (e.g., legacy, TGn and/or TGa) and a second capability (e.g., TGac). The time intervals or durations $T_{legacy1}$ and $T_{legacy2}$ are for operating wireless communication devices that only operate in accordance with the first capability (e.g., legacy, TGn and/or TGa). The time intervals or durations $T_{ac1}$ and $T_{ac2}$ are for operating wireless communication devices that only operate in accordance with the second capability (e.g., TGac).

As with respect to other embodiments, a great degree of flexibility is provided in which any of the period durations, the order of intervals within respective periods, the duration of respective intervals within respective periods, etc. may be modified as desired in various applications. For example, while each of the FIG. 31, FIG. 32, and FIG. 33 are exemplary, the order of the respective time durations or intervals (e.g., $T_{mixed1}$, $T_{mixed2}$, etc., $T_{legacy1}$, $T_{legacy2}$, etc., $T_{ac1}$, $T_{ac2}$, etc.) can be in any desired order, the durations of the respective time durations or intervals need not be the same, etc.

FIG. 35, FIG. 36, FIG. 37, and FIG. 38 are diagrams illustrating embodiments of NAV driven cluster reservation in instances where the various wireless communication devices all have newer/updated capabilities (e.g., TGac).

Figure 35:
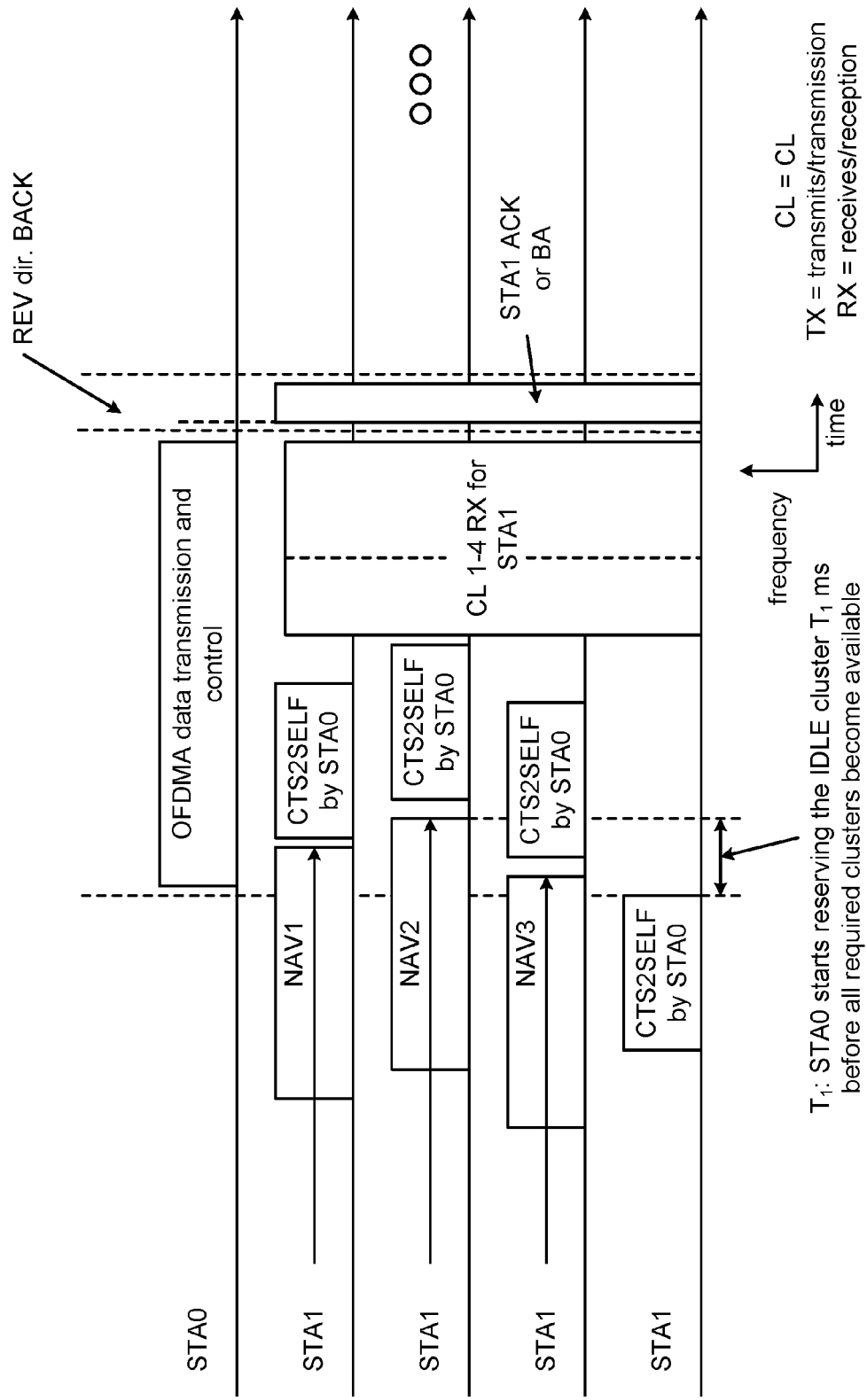
FIG. 35, FIG. 36, FIG. 37, and FIG. 38 are diagrams illustrating embodiments of NAV driven cluster reservation in instances where the various wireless communication devices all have newer/updated capabilities (e.g., TGac).

Referring to FIG. 35, this diagram shows two wireless communication devices operating therein, a transmitting wireless communication device, STA0 (e.g., a MU-MIMO/OFDMA transmitter or AP) and a receiving wireless communication device (STA1). As can be seen in this diagram, respective NAVs are set on each of clusters 1-3 (by STA0, the transmitting wireless communication device). The NAV is not set on cluster 4, and as such, the transmitting wireless communication device, STA0 (e.g., a MU-MIMO/OFDMA transmitter) is able to begin reserving the idle cluster 4 a period of time (e.g., $T_1$) before all of the required clusters become available. STA1 receives and transmits on clusters 1-4. This embodiment may be viewed as operating in accordance with either case 1 or case 3 as described elsewhere herein.

Figure 36:
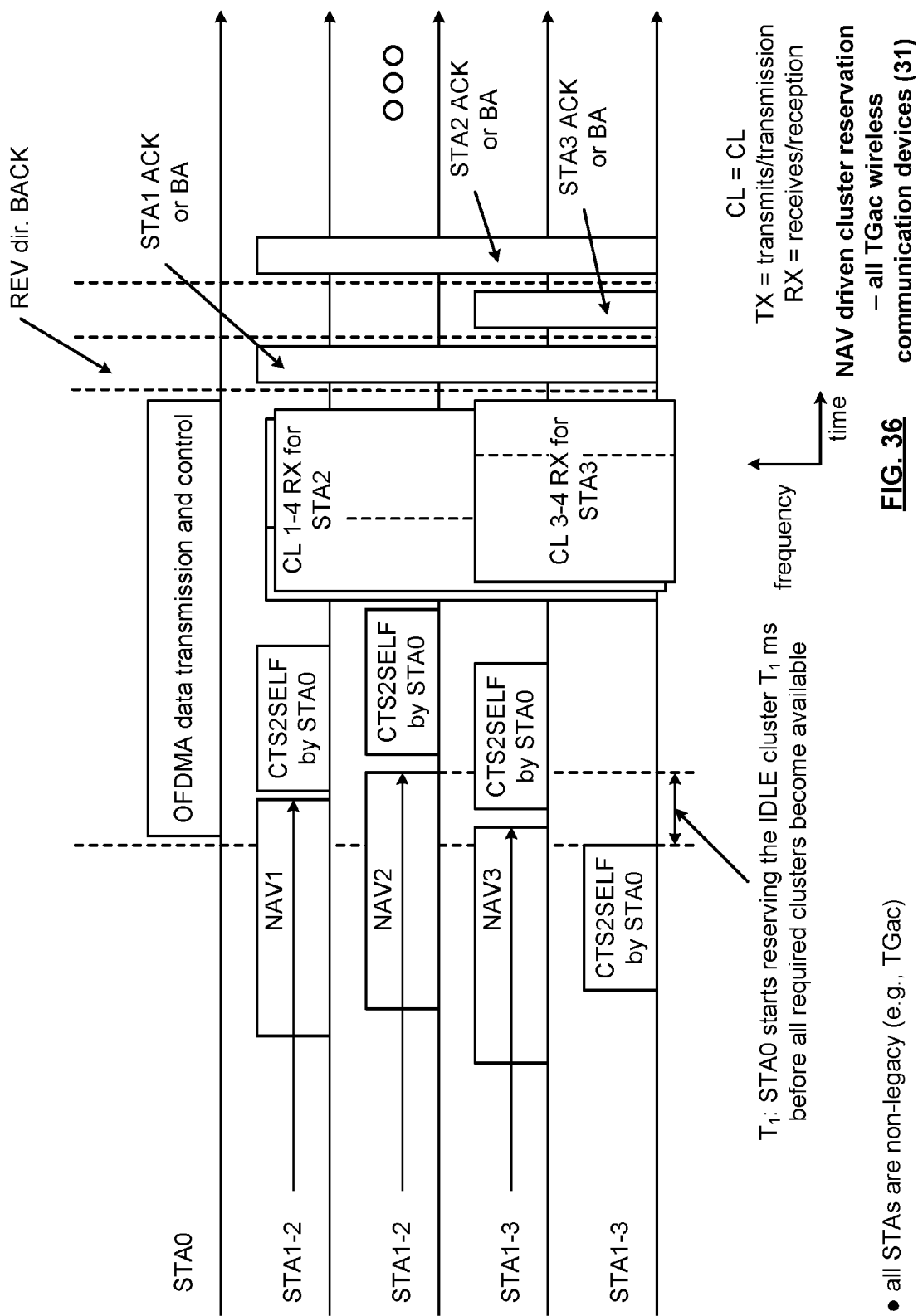

Referring to FIG. 36, this diagram is somewhat similar to the previous embodiment with at least one difference being that STA1 and STA2 each receive on clusters 1-4, STA3 receives on clusters 3-4. Also, STA1 transmits on clusters 1-4, STA3 transmits on clusters 3-4, and STA2 transmits on clusters 1-4.

Figure 37:
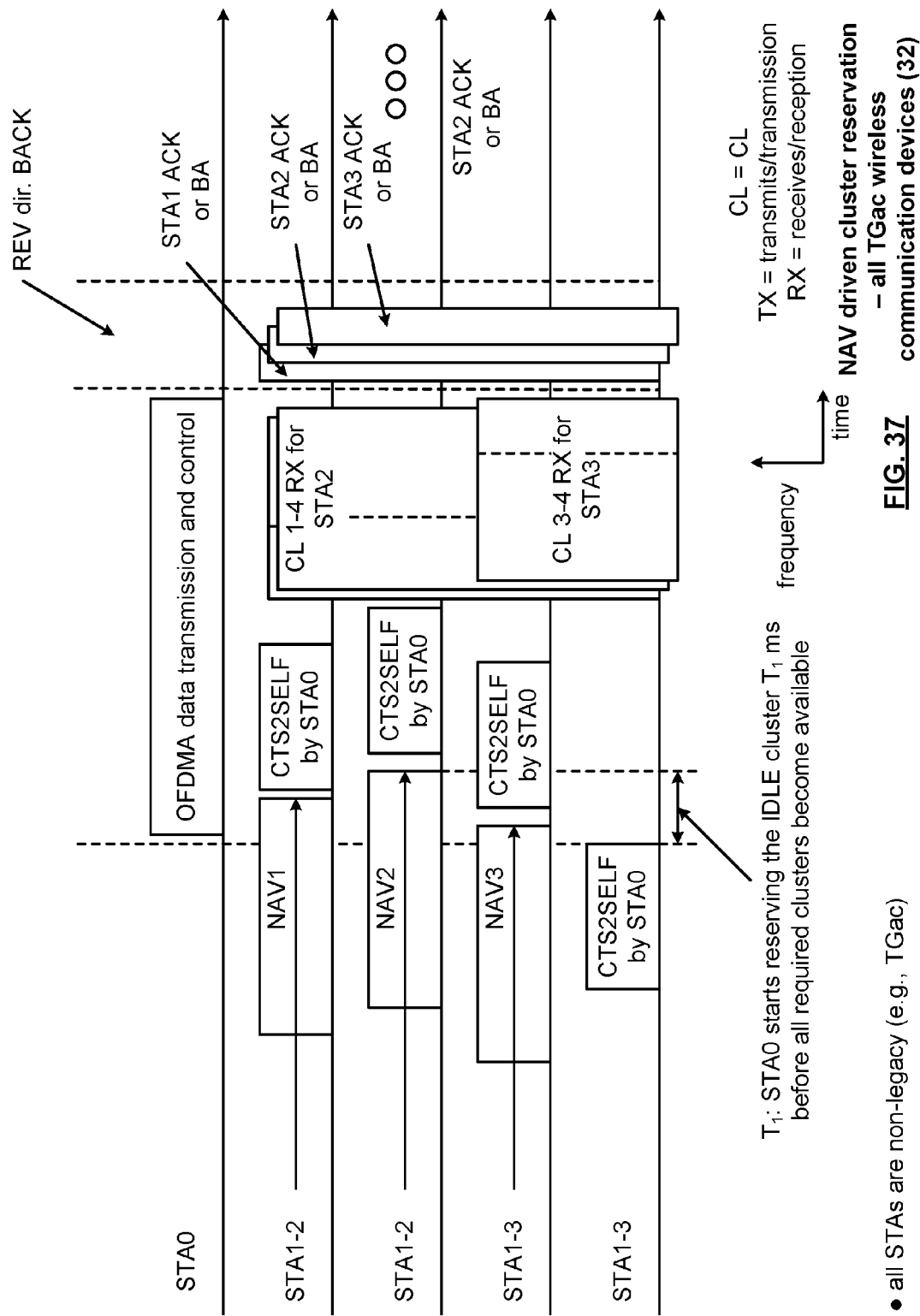

Referring to FIG. 37, this diagram is somewhat similar to the previous embodiment with at least one difference being that each of STA1, STA1, and STA3 all receive on clusters 1-4.

Figure 38:
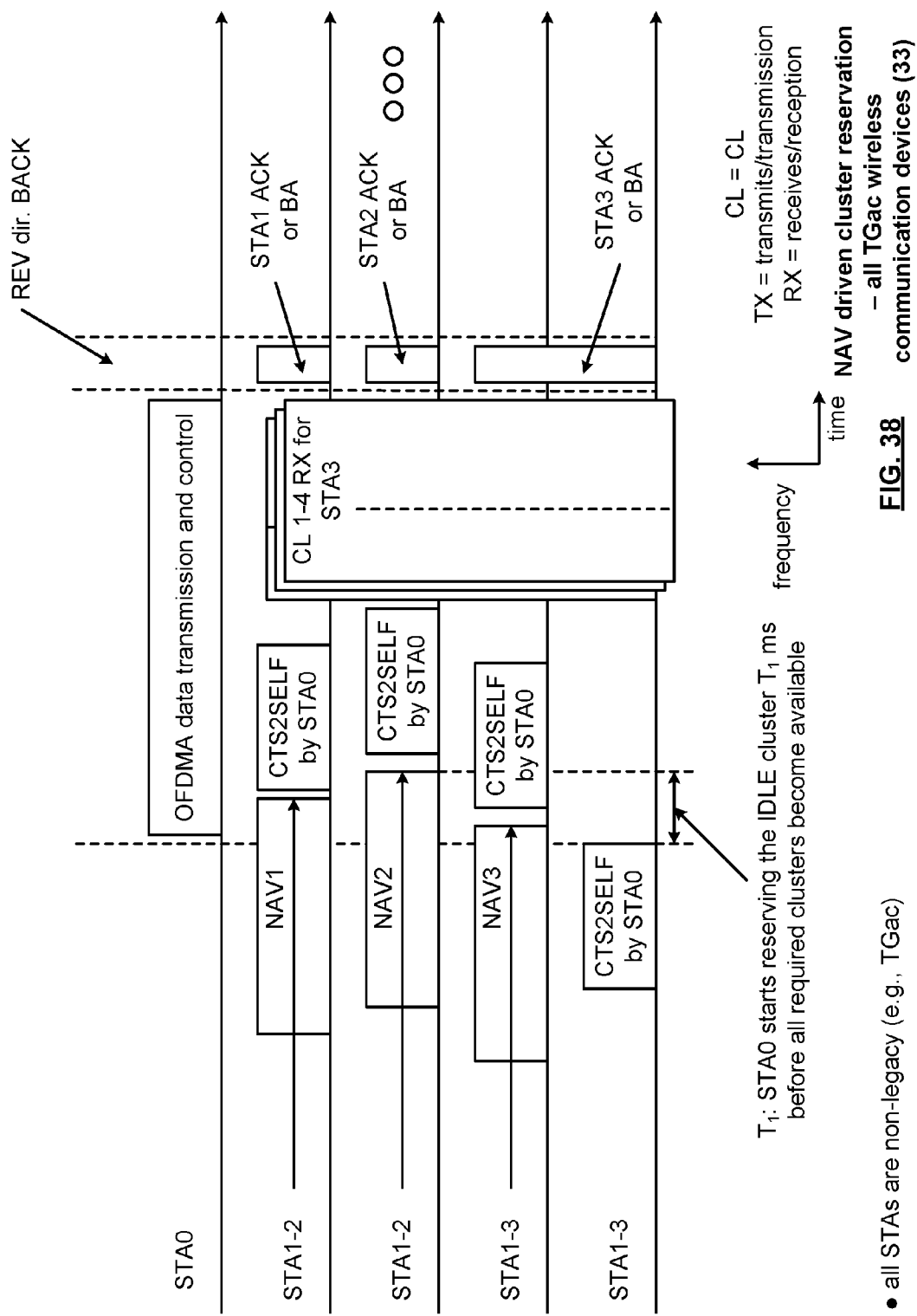

Referring to FIG. 38, in this diagram, each of STA1, STA1, and STA3 receive on clusters 1-4. STA1 transmits on clusters 1-4, STA2 transmits on cluster 2, and STA3 transmits on clusters 3-4.

Various methods are presented below by which one or more wireless communication devices may operate in accordance with various aspects of the invention. In certain of the embodiments, a respective method may be performed by a transmitting wireless communication device, STA0 (e.g., a MU-MIMO/OFDMA transmitter, an AP, etc.) In other embodiments, a respective method may be performed by receiving wireless communication device (e.g., a STA). In even other embodiments, a respective method is performed by multiple wireless communication devices within a communication system (e.g., MU-MIMO/OFDMA transmitter or AP in conjunction with one or more STAs).

FIG. 39A, FIG. 39B, FIG. 40A, FIG. 40B, FIG. 41A, FIG. 41B, and FIG. 42 are diagrams illustrating various embodiments of methods for operating one or more wireless communication devices.

Referring to method 3900 of FIG. 39A, the method 3900 begins by coordinating operation and medium access of a plurality of wireless communication devices having at least two different capabilities (e.g., 2+ capability sets—e.g., TGn and/or TGa, TGac, etc.), as shown in a block 3910. During a first time period, the method 3900 continues by allocating medium access to one or more (1+) wireless communication devices having a first capability, as shown in a block 3920. During a second time period, the method 3900 then operates by allocating medium access to 1+ wireless communication devices having a second capability, as shown in a block 3930. In some instances, there may be more than wireless communication devices having more than two different types of capabilities, and the method 3900 may continue in such instances by allocating medium access to 1+ wireless communication devices having an $n^{th}$ capability during an $n^{th}$ time period, as shown in a block 3940.

Referring to method 3901 of FIG. 39B, the method 3901 begins by coordinating operation and medium access of a plurality of wireless communication devices having at least two different capabilities (e.g., 2+ capability sets—e.g., TGn and/or TGa, TGac, etc.), as shown in a block 3911. During a first time period, the method 3901 then operates by allocating medium access to 1+ wireless communication devices having a first capability and 1+ wireless communication devices having a second capability for operating only in accordance with first capability (e.g., all operative wireless communication devices operating only in accordance with first capability), as shown in a block 3921.

During a second time period, the method 3901 continues by allocating medium access to 1+ wireless communication devices having the second capability, as shown in a block 3931.

As within other embodiments, in some instances, there may be more than wireless communication devices having more than two different types of capabilities, and the method 3901 may continue in such instances by allocating medium access to 1+ wireless communication devices having an $n^{th}$ capability during an $n^{th}$ time period, as shown in a block 3941.

Referring to method 4000 of FIG. 40A, the method 4000 begins by coordinating operation and medium access of a plurality of wireless communication devices having at least two different capabilities (e.g., 2+ capability sets—e.g., TGn and/or TGa, TGac (MU-MIMO, OFDMA, etc.), etc.), as shown in a block 4010. During a first time period, the method 4000 continues by allocating medium access to 1+ wireless communication devices having legacy (e.g., TGn and/or TGa) capability, as shown in a block 4020. During a second time period, the method 4000 then operates by allocating medium access to 1+ wireless communication devices having OFDMA capability, as shown in a block 4030.

During a third time period, the method 4000 continues by allocating medium access to 1+ wireless communication devices having MU-MIMO capability, as shown in a block 4040. During a fourth time period, the method 4000 continues by allocating medium access to 1+ wireless communication devices having OFDMA and MU-MIMO capability, as shown in a block 4050.

Referring to method 4001 of FIG. 40B, the method 4001 begins by coordinating operation and medium access of a plurality of wireless communication devices having at least two different capabilities (e.g., 2+ capability sets—e.g., TGn and/or TGa, TGac, etc.), as shown in a block 4011.

During a first time period, the method 4001 then operates by allocating medium access to 1+ wireless communication devices having a first capability (e.g., TGn and/or TGa), as shown in a block 4021.

After completion of the first time period, the method 4001 continues by removing the 1+ wireless communication devices having the first capability (e.g., TGn and/or TGa) from medium access, as shown in a block 4031. In certain embodiments, the method 4001 performs the operation of the block 4031 by employing contention free, scheduled access, and/or quiet period (e.g., multi-user super-frame (MU-SF)) for granting medium access to 1+ wireless communication devices having a second capability (e.g., TGac), as shown in a block 4033. In other embodiments, the method 4001 performs the operation of the block 4031 by employing RTS/CTS, scheduled CTS, and/or CTS2SELF for granting medium access to 1+ wireless communication devices having a second capability (e.g., TGac), as shown in a block 4035.

In even other embodiments, the method 4001 performs the operations of the block 4031 by performing some combination of the operations shown in the blocks 4033 and 4035, as shown in a block 4037.

Figure 41A:
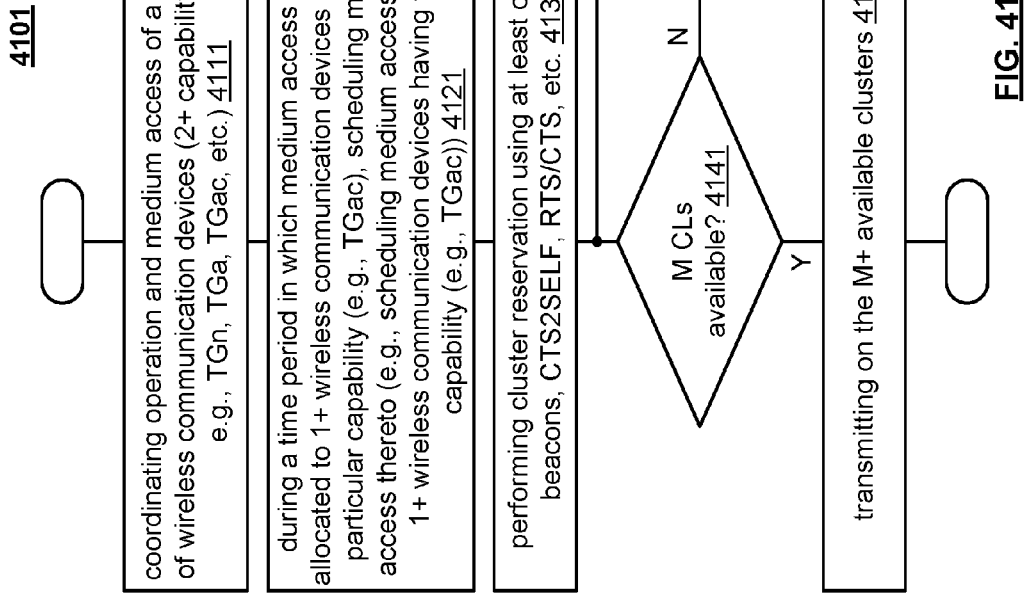

Referring to method 4100 of FIG. 41A, the method 4100 begins by coordinating operation and medium access of a plurality of wireless communication devices having at least two different capabilities (e.g., 2+ capability sets—e.g., TGn and/or TGa, TGac, etc.), as shown in a block 4110.

In some instances, the method 4100 proceeds directly from the block 4110 to the block 4120. Alternatively, in other embodiments, operations of the blocks 4112 and/or 4114 are performed after performing the operation of the block 4110 and before proceeding to the block 4120. For example, in some instances, the method 4100 continues by determining respective traffic of wireless communication devices having a first capability, a second capability, etc., as shown in a block 4112.

In certain other instances, the method 4100 continues by determining respective numbers of wireless communication devices having a first capability, a second capability, etc., as shown in a block 4114.

The method 4100 continues by assigning 1+ primary clusters (e.g., lower cluster) for use by 1+ wireless communication devices having the first capability, as shown in a block 4120. In some instances, the operations of the block 4120 are made as a function of number, traffic, etc. of 1+ wireless communication devices having the first capability, as shown in a block 4122.

The method 4100 then operates by assigning 1+ non-primary clusters for use by 1+ wireless communication device having the second capability, as shown in a block 4130. In some instances, the operations of the block 4130 are made as a function of number, traffic, etc. of 1+ wireless communication devices having the second capability, as shown in a block 4132.

Figure 41B:
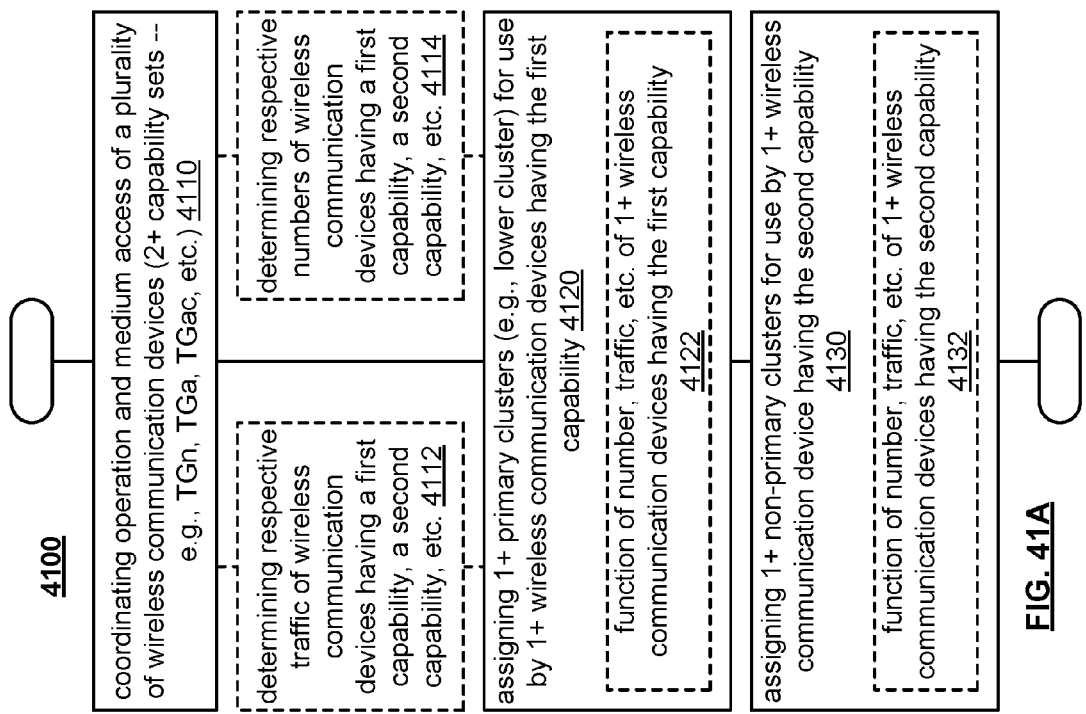

Referring to method 4101 of FIG. 41B, the method 4101 begins by coordinating operation and medium access of a plurality of wireless communication devices having at least two different capabilities (e.g., 2+ capability sets—e.g., TGn and/or TGa, TGac, etc.), as shown in a block 4111.

During a time period in which medium access being allocated to 1+ wireless communication devices having a particular capability (e.g., TGac), the method 4101 then operates by scheduling medium access thereto (e.g., scheduling medium access for the 1+ wireless communication devices having that capability (e.g., TGac)), as shown in a block 4121.

The method 4101 continues by performing cluster reservation using at least one of beacons, CTS2SELF, RTS/CTS, etc., as shown in a block 4131. If at least M clusters are determined as being available, as shown in a decision block 4141, then method 4101 then operates by transmitting on the M+ available clusters, as shown in a block 4151.

Alternatively, if fewer than M clusters are determined as being available (e.g., an insufficient number of clusters are available), as shown in a decision block 4141, then method 4101 then continues to monitor until at least M clusters are determined as being available.

Figure 42:
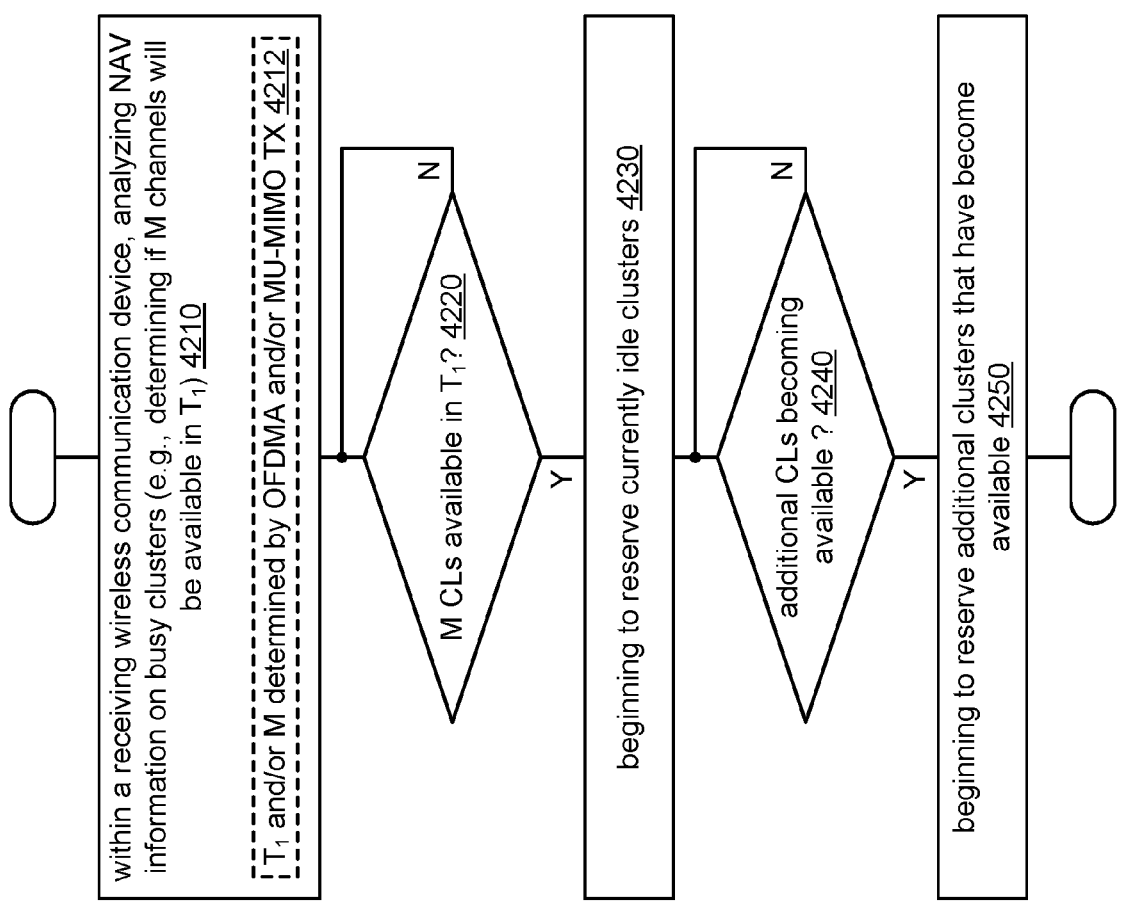

Referring to method 4200 of FIG. 42, within a receiving wireless communication device, the method 4200 begins by analyzing NAV information on busy clusters (e.g., determining if M channels will be available in a particular period of time, such as $T_1$, which may be predetermined, adaptively set, etc.), as shown in a block 4210. In some instances, the values of $T_1$ and/or M determined by OFDMA and/or MU-MIMO transmitting wireless communication device, as shown in a block 4212.

If fewer than M clusters are determined as being available (e.g., an insufficient number of clusters are available) within the time period $T_1$, as shown in a decision block 4220, then method 4200 then continues to monitor until at least M clusters are determined as being available.

Alternatively, if at least M clusters are determined as being available within the time period $T_1$, as shown in a decision block 4220, then method 4200 then operates by beginning to reserve currently idle clusters, as shown in a block 4230.

The method 4200 continues by monitoring if additional clusters become available as a function of time (e.g., as more time elapses). If additional clusters are determined as not becoming available (e.g., which, in certain embodiments, may be determined as being within a second period of time, $T_2$, or the same period of time as employed previously, $T_1$), as shown in a decision block 4240, then method 4200 then continues to monitor if additional clusters are becoming (e.g., expected to become after some period of time) or have become available. Alternatively, if at least M clusters are determined as being available within the time period $T_1$, as shown in a decision block 4220, then method 4200 then operates by beginning to reserve additional clusters that have become available, as shown in a block 4250.

It is noted that, while various and multiple embodiments of methods for performing operations in accordance with various aspects of the invention have been presented for effectuating coordination and medium access among various wireless communication devices, such as in a mixed mode environment, these specific examples and embodiments are not exhaustive, and the principles described herein may be adapted to accommodate any desired configuration and manner of performing operation in accordance with such a mixed mode environment in accordance with a number of selectable principles (e.g., time division of medium access, scheduled access for newer capable [e.g., TGac] wireless communication devices, etc.).

Any of the functionality and/or methods described herein may be implemented and/or performed within a wireless communication device that includes, among other elements/components, a baseband processing module and one or more antennae (multiple antennae in a preferred embodiment). Such a baseband processing module (e.g., such as in accordance with FIG. 2), may be implemented for generating a plurality of control signals corresponding to medium access of a number of wireless communication devices. These wireless communication devices can include a first wireless communication device having a first capability and a second wireless communication device having a second capability. Each respective wireless communication device can operate in accordance with at least one respective operational mode (e.g., a first wireless communication device can operate in accordance with a first operational mode, a second wireless communication device can operate in accordance with a second operational mode, etc.). The control signals generated by the baseband processing module are operative to direct the manner of medium access among the various wireless communication devices. Such control signals are transmitted to the various wireless communication devices via the antenna or antennae.

One exemplary operational mode includes a first operational mode that effectuates medium access in accordance with time division between the first wireless communication device and the second wireless communication device. Another exemplary operational mode includes assigning at least one primary cluster for use by the first wireless communication device and assigning at least one non-primary cluster for use by the second wireless communication device for supporting simultaneous operation of the first wireless communication device and the second wireless communication device. Yet another exemplary operational mode includes effectuating time dividing medium access between simultaneous operation of both the first wireless communication device and the second wireless communication device and operation of only either the first wireless communication device or the second wireless communication device.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |

TABLE 1-continued 2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a processing circuitry configured to:
generate an orthogonal frequency division multiple access (OFDMA) frame that includes information that specifies:
a first time period for simultaneous communication medium access by a first other wireless communication device and a second other wireless communication device that both have a first capability based on a first communication protocol and a second capability based on a second communication protocol, a first cluster that includes a first set of OFDMA tones for use by a first other wireless communication within the first time period, and a second cluster that includes a second set of OFDMA tones for use by a second other wireless communication within the first time period; and
a second time period for communication access based on carrier sense multiple access/collision avoidance (CSMA/CA) by a third other wireless communication device that has the second capability based on the second communication protocol;
transmit the OFDMA frame to the first other wireless communication device, the second other wireless communication device, and the third other wireless communication device;
receive, during the first time period, first data from the first other wireless communication device that is transmitted via the first cluster that includes the first set of OFDMA tones and second data from the second other wireless communication device that is transmitted via the second cluster that includes the second set of OFDMA tones based on respective time intervals as specified in the OFDMA frame;
receive, during the second time period, third data from the third other wireless communication device, wherein the information of the OFDMA frame further specifies a first time interval within the first time period for the first other wireless communication device to transmit the first data to the wireless communication device via the first cluster that includes the first set of OFDMA tones and a second time interval within the first time period for the second other wireless communication device to transmit the second data to the wireless communication device via the second cluster that includes the second set of OFDMA tones; and
receive, during the first time interval within the first time period, the first data from the first other wireless communication device that is transmitted via the first cluster that includes the first set of OFDMA tones and to receive, during the second time interval within the first time period, the second data from the second other wireless communication device that is transmitted via the second cluster that includes the second set of OFDMA tones.

2. The wireless communication device of claim 1 further comprising:
a cellular telephone, two-way radio, personal digital assistant (PDA), personal computer (PC), laptop computer, or home entertainment equipment.

3. The wireless communication device of claim 1, wherein:
the information of the OFDMA frame further specifies a time interval within the first time period for the first other wireless communication device to transmit the first data to the wireless communication device via the first cluster that includes the first set of OFDMA tones and for the second other wireless communication device to transmit simultaneously the second data to the wireless communication device via the second cluster that includes the second set of OFDMA tones; and
the processing circuitry is further configured to receive, during the time interval within the first time period, another OFDMA frame that includes both the first data from the first other wireless communication device that is transmitted via the first cluster that includes the first set of OFDMA tones and the second data from the second other wireless communication device that is simultaneously transmitted via the second cluster that includes the second set of OFDMA tones.

4. The wireless communication device of claim 1, wherein the first communication protocol is a first IEEE 802.11 communication protocol, and the second communication protocol is a second IEEE 802.11 communication protocol that is a legacy IEEE 802.11 communication protocol to the first IEEE 802.11 communication protocol.

5. The wireless communication device of claim 1 further comprising:
a single front-end communication interface, coupled to the processing circuitry, that is configured to support communications within at least one of a wireless communication system or a mobile communication system; and
the processing circuitry configured to at least one of transmit the OFDMA frame, receive the first data, receive the second data, or receive the third data via the single front-end communication interface.

6. The wireless communication device of claim 1 further comprising:
a first front-end communication interface and a second front-end communication interface, both coupled to the processing circuitry, that are configured to support communications within at least one of a wireless communication system or a mobile communication system; and
the processing circuitry configured to receive the first data via the first front-end communication interface and to receive the second data via the second front-end communication interface.

7. The wireless communication device of claim 1 further comprising:
an access point (AP), wherein at least one of the first other wireless communication device, the second other wireless communication device, or the third other wireless communication device includes a wireless station (STA).

8. A wireless communication device comprising:
a processing circuitry configured to:
generate a first orthogonal frequency division multiple access (OFDMA) frame that includes information that specifies:
a first time period for simultaneous communication medium access by a first other wireless communication device and a second other wireless communication device that both have a first capability based on a first communication protocol and a second capability based on a second communication protocol, a first cluster that includes a first set of OFDMA tones for use by a first other wireless communication within the first time period, and a second cluster that includes a second set of OFDMA tones for use by a second other wireless communication within the first time period; and
a second time period for communication access based on carrier sense multiple access/collision avoidance (CSMA/CA) by a third other wireless communication device that has the second capability based on the second communication protocol;
transmit the first OFDMA frame to the first other wireless communication device, the second other wireless communication device, and the third other wireless communication device;

receive, during the first time period, a second OFDMA frame that includes both first data from the first other wireless communication device that is transmitted via the first cluster that includes the first set of OFDMA tones and second data from the second other wireless communication device that is simultaneously transmitted via the second cluster that includes the second set of OFDMA tones; and
receive, during the second time period, third data from the third other wireless communication device, wherein the information of the OFDMA frame further specifies a time interval within the first time period for the first other wireless communication device to transmit the first data to the wireless communication device via the first cluster that includes the first set of OFDMA tones and for the second other wireless communication device to transmit simultaneously the second data to the wireless communication device via the second cluster that includes the second set of OFDMA tones within the second OFDMA frame; and
to receive, during the time interval within the first time period, the second OFDMA frame.

9. The wireless communication device of claim 8, wherein the first communication protocol is a first IEEE 802.11 communication protocol, and the second communication protocol is a second IEEE 802.11 communication protocol that is a legacy IEEE 802.11communication protocol to the first IEEE 802.11 communication protocol.

10. The wireless communication device of claim 8 further comprising:
a single front-end communication interface, coupled to the processing circuitry, that is configured to support communications within at least one of a wireless communication system or a mobile communication system; and
the processing circuitry configured to at least one of transmit the first OFDMA frame, receive the second OFDMA frame, or receive the third data via the single front-end communication interface.

11. The wireless communication device of claim 8 further comprising:
an access point (AP), wherein at least one of the first other wireless communication device, the second other wireless communication device, or the third other wireless communication device includes a wireless station (STA).

12. A method for execution by a wireless communication device, the method comprising:
generating an orthogonal frequency division multiple access (OFDMA) frame that includes information that specifies:
a first time period for simultaneous communication medium access by a first other wireless communication device and a second other wireless communication device that both have a first capability based on a first communication protocol and a second capability based on a second communication protocol, a first cluster that includes a first set of OFDMA tones for use by a first other wireless communication within the first time period, and a second cluster that includes a second set of OFDMA tones for use by a second other wireless communication within the first time period; and
a second time period for communication access based on carrier sense multiple access/collision avoidance (CSMA/CA) by a third other wireless communication device that has the second capability based on the second communication protocol;

transmitting, via a communication interface of the wireless communication device, the OFDMA frame to the first other wireless communication device, the second other wireless communication device, and the third other wireless communication device;

receiving, via the communication interface of the wireless communication device and during the first time period, first data from the first other wireless communication device that is transmitted via the first cluster that includes the first set of OFDMA tones and second data from the second other wireless communication device that is transmitted via the second cluster that includes the second set of OFDMA tones;

receiving, via the communication interface of the wireless communication device and during the second time period, third data from the third other wireless communication device, wherein the information of the OFDMA frame further specifies a time interval within the first time period for the first other wireless communication device to transmit the first data to the wireless communication device via the first cluster that includes the first set of OFDMA tones and for the second other wireless communication device to transmit simultaneously the second data to the wireless communication device via the second cluster that includes the second set of OFDMA tones; and receiving, via the communication interface of the wireless communication device and during the time interval within the first time period, another OFDMA frame that includes both the first data from the first other wireless communication device that is transmitted via the first cluster that includes the first set of OFDMA tones and the second data from the second other wireless communication device that is simultaneously transmitted via the second cluster that includes the second set of OFDMA tones.

13. The method of claim 12, wherein the information of the OFDMA frame further specifies a first time interval within the first time period for the first other wireless communication device to transmit the first data to the wireless communication device via the first cluster that includes the first set of OFDMA tones and a second time interval within the first time period for the second other wireless communication device to transmit the second data to the wireless communication device via the second cluster that includes the second set of OFDMA tones; and further comprising:

receiving, via the communication interface of the wireless communication device and during the first time interval within the first time period, the first data from the first other wireless communication device that is transmitted via the first cluster that includes the first set of OFDMA tones and to receive, during the second time interval within the first time period, the second data from the second other wireless communication device that is transmitted via the second cluster that includes the second set of OFDMA tones.

14. The method of claim 12, wherein the wireless communication device includes a cellular telephone, two-way radio, personal digital assistant (PDA), personal computer (PC), laptop computer, or home entertainment equipment.

15. The method of claim 12, wherein the information of the OFDMA frame further specifies a first time interval within the second time period for the third other wireless communication device that has the second capability based on the second communication protocol to perform communication access based on CSMA/CA and a second time interval within the second time period for a fourth other wireless communication device to perform communication access based on CSMA/CA; and further comprising:

receiving, via the communication interface of the wireless communication device and during the first time interval within the second time period, the third data from the third other wireless communication device; and receiving, via the communication interface of the wireless communication device and during the second time interval within the second time period, fourth data from the fourth other wireless communication device.

16. The method of claim 12, wherein the first communication protocol is a first IEEE 802.11 communication protocol, and the second communication protocol is a second IEEE 802.11 communication protocol that is a legacy IEEE 802.11 communication protocol to the first IEEE 802.11 communication protocol.

17. The method of claim 12 further comprising:

operating a single front-end communication interface of the wireless communication device to support communications within at least one of a wireless communication system or a mobile communication system; and at least one of transmitting the OFDMA frame, receiving the first data, receiving the second data, or receiving the third data via the single front-end communication interface.

18. The method of claim 12, wherein the wireless communication device includes an access point (AP), and at least one of the first other wireless communication device, the second other wireless communication device, or the third other wireless communication device includes a wireless station (STA).

19. A wireless communication device comprising:

a processing circuitry configured to:

generate an orthogonal frequency division multiple access (OFDMA) frame that includes information that specifies:

a first time period for simultaneous communication medium access by a first other wireless communication device and a second other wireless communication device that both have a first capability based on a first communication protocol and a second capability based on a second communication protocol, a first cluster that includes a first set of OFDMA tones for use by a first other wireless communication within the first time period, and a second cluster that includes a second set of OFDMA tones for use by a second other wireless communication within the first time period; and a second time period for communication access based on carrier sense multiple access/collision avoidance (CSMA/CA) by a third other wireless communication device that has the second capability based on the second communication protocol;

transmit the OFDMA frame to the first other wireless communication device, the second other wireless communication device, and the third other wireless communication device;

receive, during the first time period, first data from the first other wireless communication device that is transmitted via the first cluster that includes the first set of OFDMA tones and second data from the second other wireless communication device that is transmitted via the second cluster that includes the second set of OFDMA tones based on respective time intervals as specified in the OFDMA frame;

receive, during the second time period, third data from the third other wireless communication device, wherein the information of the OFDMA frame further specifies a first time interval within the second time period for the third other wireless communication device that has the second capability based on the second communication protocol to perform communication access based on CSMA/CA and a second time interval within the second time period for a fourth other wireless communication device to perform communication access based on CSMA/CA; and the processing circuitry is further configured to receive, during the first time interval within the second time period, the third data from the third other wireless communication device and configured to receive, during the second time interval within the second time period, fourth data from the fourth other wireless communication device.

* * * * *